(12) United States Patent
Rosenshine

(10) Patent No.: US 12,413,547 B2
(45) Date of Patent: *Sep. 9, 2025

(54) SYSTEM FOR ASSOCIATING OFFLINE DATA WITH ONLINE ACTIVITY

(71) Applicant: Dorin Rosenshine, Great Neck, NY (US)

(72) Inventor: Dorin Rosenshine, Great Neck, NY (US)

(73) Assignee: Outleads Inc., Great Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,415

(22) Filed: Mar. 28, 2024

(65) Prior Publication Data

US 2024/0244027 A1 Jul. 18, 2024

Related U.S. Application Data

(60) Continuation of application No. 18/330,179, filed on Jun. 6, 2023, which is a continuation of application
(Continued)

(51) Int. Cl.
*H04L 51/52* (2022.01)
*G06Q 10/10* (2023.01)
(Continued)

(52) U.S. Cl.
CPC .............. *H04L 51/52* (2022.05); *G06Q 10/10* (2013.01); *G06Q 10/107* (2013.01);
(Continued)

(58) Field of Classification Search
CPC ......... H04M 3/42382; H04M 3/42042; H04M 2203/551; H04M 2203/10; G06Q 30/0255; G06Q 30/0246; G06Q 30/0277; H04L 51/32; H04L 67/22; H04L 67/1044; H04L 67/306
See application file for complete search history.

(56) References Cited

U.S. PATENT DOCUMENTS

| | | | |
|---|---|---|---|
| 2005/0187823 A1* | 8/2005 | Howes | G06Q 30/02 705/14.66 |
| 2007/0073585 A1* | 3/2007 | Apple | G06Q 30/0247 705/14.46 |

(Continued)

*Primary Examiner* — Phung-Hoang J Nguyen
(74) *Attorney, Agent, or Firm* — Michael L. Greenberg, Esq.; Greenberg & Lieberman, LLC

(57) ABSTRACT

A system for collecting and indexing data by associating a unique identifier (generated by and provided from an external computer system) with a data file. The data file is acquired from a user operated computer system. The system comprising a series of computers provided in signal communication with one another via a network. The data file could include data collected by a form provided by a website hosted by a web server. Additional data collected from other sources (stored as a record), such as a computer system operated by an agent, would be associated with the collected data file by an inquiry management company. The collected data and associated records are forwarded to a computer system that tracks online users/visitors. The process can marry computer collected data (other than the data file) about website activity with activities independent of the website.

30 Claims, 39 Drawing Sheets

Related U.S. Application Data

No. 17/064,394, filed on Oct. 6, 2020, now Pat. No. 11,671,397, which is a division of application No. 16/730,959, filed on Dec. 30, 2019, now Pat. No. 10,798,046, which is a division of application No. 16/286,460, filed on Feb. 26, 2019, now Pat. No. 10,523,627, which is a division of application No. 15/698,922, filed on Sep. 8, 2017, now Pat. No. 10,218,666, which is a division of application No. 15/346,519, filed on Nov. 8, 2016, now Pat. No. 9,762,529.

(51) Int. Cl.

| | | |
|---|---|---|
| *G06Q 10/107* | (2023.01) | |
| *G06Q 30/0241* | (2023.01) | |
| *G06Q 30/0242* | (2023.01) | |
| *G06Q 30/0251* | (2023.01) | |
| *H04L 67/104* | (2022.01) | |
| *H04L 67/306* | (2022.01) | |
| *H04L 67/50* | (2022.01) | |
| *H04M 3/42* | (2006.01) | |

(52) U.S. Cl.
CPC ..... *G06Q 30/0246* (2013.01); *G06Q 30/0255* (2013.01); *G06Q 30/0277* (2013.01); *H04L 67/1044* (2013.01); *H04L 67/535* (2022.05); *H04M 3/42042* (2013.01); *H04M 3/42382* (2013.01); *H04L 67/306* (2013.01); *H04M 2203/10* (2013.01); *H04M 2203/551* (2013.01)

(56) References Cited

U.S. PATENT DOCUMENTS

| | | | | |
|---|---|---|---|---|
| 2007/0127650 | A1* | 6/2007 | Altberg | G06Q 30/0246 379/114.13 |
| 2009/0017805 | A1* | 1/2009 | Sarukkai | H04W 28/06 455/414.3 |
| 2012/0029983 | A1* | 2/2012 | Rodriguez | G06Q 30/02 705/14.4 |
| 2012/0323704 | A1* | 12/2012 | Steelberg | G06Q 30/02 709/204 |
| 2013/0212188 | A1* | 8/2013 | Duterque | H04L 67/146 709/224 |
| 2014/0316848 | A1* | 10/2014 | Fuchs | G06Q 30/02 705/7.29 |
| 2014/0358521 | A1* | 12/2014 | Mikutel | G06F 40/205 704/9 |

\* cited by examiner

SYSTEM FOR ASSOCIATING OFFLINE DATA WITH ONLINE ACTIVITY

CROSS REFERENCE TO RELATED APPLICATIONS

This United States Non-Provisional Utility Patent Application is:
(A) a Divisional Patent Application claiming the benefit of:
United States Non-Provisional Utility application Ser. No. 16/730,959, filed on Dec. 30, 2019 (scheduled to issue as U.S. Pat. No. 10,798,046 on Oct. 6, 2020), wherein Ser. No. 16/730,959 is a Divisional Patent Application claiming the benefit of United States Non-Provisional Utility application Ser. No. 16/286,460, filed on Feb. 6, 2019 (now issued as U.S. Pat. No. 10,523,627 on Dec. 31, 2019),
wherein United States Non-Provisional Utility application Ser. No. 16/286,460 is a Divisional Application claiming the benefit of United States Non-Provisional Utility application Ser. No. 15/698,922, filed on Sep. 8, 2017 (now issued as U.S. Pat. No. 10,218,666, issued on Feb. 26, 2019),
wherein United States Non-Provisional Utility application Ser. No. 15/698,922 is a Divisional Applications claiming the benefit of United States Non-Provisional Utility application Ser. No. 15/346,519, filed on Nov. 8, 2016 (now issued as U.S. Pat. No. 9,762,529 on Sep. 12, 2017),
wherein United States Non-Provisional Utility application Ser. No. 15/346,519 is a Divisional Applications claiming the benefit of United States Non-Provisional Utility application Ser. No. 14/973,639, filed on Dec. 17, 2015 (now issued as U.S. Pat. No. 9,491,249 on Nov. 8, 2016),
(B) in a first branch:
United States Non-Provisional Utility application Ser. No. 14/973,639 is a Continuation-In-Part claiming the benefit of United States Non-Provisional Utility application Ser. No. 14/854,204, filed on Sep. 15, 2015 (now issued as U.S. Pat. No. 9,342,843, issued on May 17, 2016),
wherein United States Non-Provisional Utility application Ser. No. 14/854,204 is a Divisional Patent Applications claiming the benefit of United States Non-Provisional Utility application Ser. No. 14/524,949, filed on Oct. 27, 2014 (now issued as U.S. Pat. No. 9,137,360, issued on Sep. 15, 2015), which claims the benefit of each of:
wherein United States Non-Provisional Utility application Ser. No. 14/524,949 is a Non-Provisional Applications claiming the benefit of U.S. Provisional Patent Application 62/041,779, filed on Aug. 26, 2014;
wherein United States Non-Provisional Utility application Ser. No. 14/524,949 is a Non-Provisional Applications claiming the benefit of U.S. Provisional Patent Application 62/008,031, filed on Jun. 5, 2014;
wherein United States Non-Provisional Utility application Ser. No. 14/524,949 is a Non-Provisional Applications claiming the benefit of U.S. Provisional Patent Application 61/974,600, filed on Apr. 3, 2014; and
wherein United States Non-Provisional Utility application Ser. No. 14/524,949 is a Non-Provisional Applications claiming the benefit of U.S. Provisional Patent Application 61/895,544, filed on Oct. 25, 2013; and
(C) in a second branch:
United States Non-Provisional Utility application Ser. No. 14/973,639, filed on Dec. 17, 2015 (now issued as U.S. Pat. No. 9,491,249, issued on Nov. 8, 2016) is a Non-Provisional Applications claiming the benefit of U.S. Provisional Patent Application 62/094,259, filed on Dec. 19, 2014;
each of which are incorporated by reference herein in their entireties.

FIELD OF THE PRESENT INVENTION

The present disclosure generally relates to a method for voice call and leads tracking and management, and more particularly, to a method for recording information related to voice calls and form submissions that are triggered or initiated from network-based content and associating the recorded information with information collected by external systems—such as web analytics software, advertising platforms, or phone systems—about the caller or sender, and managing said information.

BACKGROUND OF THE PRESENT INVENTION

Businesses commonly advertise through many different media in order to attract customers. Ads reach customers via a variety of modalities including, for example, online websites, printed publications, radio and television broadcasts, direct mailings, emails, and other mediums in which customers are likely to view the ads.

Increasingly, businesses are focusing their advertising efforts on online or Internet ads. As online advertising spending continues to climb, there is a strong interest in being able to attribute customer actions to a particular advertisement or marketing channel. Actions that occur during a visit to a website, such as for example submitting an inquiry form or downloading a file, can be tracked and associated with other visitor information including, for example, a visitor source channel or a searched keyword term. However, offline actions, such as phone calls, cannot typically be tracked in the same manner.

Current methods for associating phone calls with visitor data involve assigning a unique phone number to each ad created. In that case, if a caller contacts a business via a particular phone number, it can be assumed that the caller viewed the ad that displayed that phone number. This method of associating a phone call with a website visit is inefficient, because it requires a business to purchase a large number of phone numbers such that each ad can be associated with its own phone number.

Another alternative involves dynamically assigning forwarding phone numbers for each visit and/or page-view. This method creates increasing uncertainty when the number of visitors and page-views increases and/or when tracked details are more refined, e.g., tracking keywords vs. merely tracking all visits from organic searches. This is because a finite number of phone numbers are spread, and recycled, through an increasing number of possible visit information combinations.

For instance, if an interior design company merely tracked visitor source, all visits from organic searches would be assigned the same phone number. However, to track each keyword searched, a unique phone number would be assigned to each phrase. Thus, "sofa upholstery" and "couch upholstery" would require different phone numbers. Since the business owns a finite pool of phone numbers, which are dynamically assigned and reused, this increases the likelihood that identical phone numbers would be reused frequently enough to render the system error-prone.

Additionally, if the phone number is displayed on multiple areas on the page, this method would not be capable of disclosing which phone number a visitor looked or clicked at to call. Such data would be important for a business attempting to understand which area of a web page attracts the attention of visitors. To accomplish this with the current method, a business would need to feature different phone numbers on the same page, which would be impractical.

Furthermore, the current method for associating a phone call with a website visit uses analytics collected by the call tracking system independently and does not connect the tracking to the website's existing web analytics system. This approach limits the availability of data, since the website's analytics system specializes in collecting a wide array of visitor data. By connecting phone calls and call information to the analytics system, the disclosed method unleashes a stream of opportunities for improved analytics and operations of a business.

Current tracking methods also interfere with the branding efforts of businesses, as it may be desirable for customers to associate a particular business with a particular or memorable phone number.

Furthermore, traditional call tracking methods involve passing a call through the mentioned tracking numbers, which incurs charges based on the usage of the network associated with these numbers (for instance, per minute of talking time). For a business with substantial call volume, the cost associated with such a setup is significant.

Lastly, the transition to offline, via either a phone call or form submission, introduces challenges in optimizing online advertising. As businesses are increasingly interested in improving ad spend ROI, there is growing interest to target online advertising by intercepting additional data about a user, such as profile and activity. Thus, tracking a user's web activity and using the data to predict interest and guide advertising display decisions is commonplace. However, the utilized data is restricted to online browsing behavior. Since phone calls and form submissions generate offline activity, and given the sheer volume of activity, the ability to utilize this information to target online advertising is extremely valuable. The present disclosure enables information other than online browsing behavior to be utilized in the same manner as online browsing behavior in targeting online advertising.

BRIEF SUMMARY OF THE PRESENT INVENTION

In one variant of the present invention, various systems and methods are adapted towards form submissions and leads tracking and management, including a system and method for bringing form submissions and ensuing offline activity into an online context, enabling the association of this activity with online data. In an embodiment, when a user visits a web property, a tracking entity intercepts a variable that has been generated by an online system (such as an online advertising system, content optimization system, and the like) to identify that user. In general, the variable is generated for the purpose of tracking the user's web activity. When the user submits a form from that web property, the tracking entity invisibly appends said variable to the form submission. The form submission automatically turns into a record in any inquiry tracking system (a commonplace practice in systems for leads management, customer service, and the like). As additional information is entered into the record about the user's ensuing activity—usually by an agent of the entity with which the user is interacting as a follow up to the form submission—the tracking entity uses the variable and communicates the entered information to the online system.

The tracking entity translates the information into a format that the online system can parse, and because it is accompanied by the variable that the online system has generated, the online system automatically appends the information to the user associated with that variable. This results in richer data sets about users that can be used to better target online experiences, including advertising, content, and the like. Since the offline information is communicated in the same manner as online activity (despite it not being online activity), it can be used with the same power and flexibility, as well as in real-time, and anonymously. Essentially, the tracking entity extends the capabilities of the online systems.

In a second variant of the present invention, various systems and methods are adapted for phone call and leads tracking and management, including a system and method for bringing phone calls into an online context, enabling the association of phone calls with online data. This can be accomplished by tracking phone calls in the same manner as on-website events, such as form submissions. The terms "leads" and "prospects" generally refer to prospective customers herein. The methods and systems described herein may facilitate tracking, recording, and associating data about the online, phone call, and offline activities of leads or prospective customers. Advantageously, the methods described herein can utilize a single phone number, which can be an existing phone number belonging to or maintained by or for the target business.

In some embodiments, such a method involves the following actions:

a. Placing "Call" buttons or links on a website of a target business (hereinafter simply "business").

b. When a visitor ("User") clicks the "Call" button or link on the website, a request is sent to a remote database of a tracking entity ("Tracker").

c. After verifying that the request is authentic, Tracker creates a new record in the database and generates an identifier (ID).

d. Tracker sends, or instructs the visitor's browser to send, a tracking request labeled with the new record ID to the website's analytics system.

e. Based on the new record ID, Tracker generates a network resource locator, such as a uniform resource locator (URL) as henceforth assumed herein to facilitate description. Note, however, that other embodiments of the technology introduced here may use a different kind of network locator for the same or a similar purpose as the URL in the embodiments described herein.

f. Phone connection is facilitated through a provider ("Communications Provider"), and the call is forwarded to the business.

g. Following call hang-up, details about call are posted to the URL, and are thereby associated with the new record ID in the database.

h. The site's analytics system is queried for visit details associated with the record ID.

The specific details, which involve repeated communications between a user's browser, website analytics system, and leads database, are more fully described below.

In an embodiment, phone calls are tracked by associating activities of a User on a website to a placed phone call or call session. For example, a visit to a link or a click on a website can result in a phone number and an extension being displayed. When that phone number is dialed and that extension is entered during a call session, it can be determined that particular visitor activities resulted in that phone call being initiated.

In an embodiment, a method of tracking calls and/or leads is disclosed, in which a User visits or enters a website, triggering a request to be sent to a database. The authenticity of the request to the database is verified, and a new record in the database is created. The new record may include a code such as a numeric code, and can be sent back to the browser and displayed as a phone extension. As the visitor navigates the website, the current page URL associated with the extension may be updated. When the visitor calls the business, the visitor may be prompted for the extension. The entered extension may be used to retrieve the information that has been associated with that extension, and a new record having a record ID may be recorded in the database. Using visit-specific details collected by the analytics system, a request to label the website activities with a code corresponding to the record ID may be sent to the analytics system. A URL may be generated based on the record ID. Once a phone call is analyzed (e.g., associating the phone call with a particular extension or recorded data about a website visit), the call may be forwarded to the business.

Following a hang-up or disconnection of the call, details about the call may be posted to the URL and may be associated with the new record ID in the database. The website may have an analytics system, which may be queried for visit details associated with the record ID. Following the phone call, the associated extension may be deleted and made available for re-use. The method may be implemented as a system including one or more servers providing data related to the website and the database, wherein each server comprises at least one computing system having at least one data processor.

In an embodiment, a method for tracking a phone call and associating the call with a visit to a website may include receiving a request sent to a database stored on a computer readable medium in response to an activity on the website. A record may be created in response to the request. A code associated with the record may be generated. A call extension corresponding to the code such that the call extension is associated with the record may be assigned. A URL of a viewed page of the website may be associated with the call extension. The method may include tracking website visitor information relating to one or more viewed pages, and may also include updating the database with the visitor information.

A caller may be prompted to enter the call extension in response to establishing a call connection. The information in the record associated with the call extension may be retrieved, and a record ID may be created including such information. The record ID may be associated with both the call connection and the activity on the website.

A request may be sent to a website data analytics system to create a label such that the activity on the website and any data regarding visitor details (e.g., any user information that may be collected or known) are labeled with an ID that corresponds to the record ID. A URL based on the ID that corresponds to the record ID may be generated. Details about the call connection may be posted to the URL following disconnection of the call connection. An analytics system may be queried for visit details associated with the label.

A request may be sent to create a bridge and a call ID of an incoming call may be placed in the bridge. At least one call creation request to initiate a call may be sent to a Communications Provider. The call creation request may include a bridge ID that is associated with the bridge in a callback URL. When answered, the call initiated by the Communications Provider may then be added to the bridge. A hang-up request may be sent for any call ID that is not in the bridge. Any phone number that is associated with the call ID of an incoming call that has not already been stored in the database may be stored.

Following termination of a call connection, an SMS may be initiated which prompts or requests a reply containing any additional details about the call connection. Any such additional details may be associated with the record ID.

In an embodiment, phone calls may be tracked by associating a visitor's activities on a website with a placed phone call or call session. For example, a visit to a link or a click on a website may result in a "call now" or similar link being displayed. Upon entering the website or when the link is clicked, a request is sent to a server, which responds with a phone number and extension. When the phone number is dialed and that extension is entered during a call session, it may be determined that particular visitor activities resulted in that phone call being initiated, and data from and after the call may be associated with the visitor activities. Advantageously, the methods described herein may preserve the original call flow and deliver detailed analytics, including which number on a page was clicked, while utilizing a single phone number, which may be an existing phone number belonging to or maintained by or for the business.

In an embodiment, a method of associating calls, as well as financial transactions resulting from such phone calls, with Internet activities is disclosed. In particular, a User or visitor may visit or enter a website and see a "call now" link. When the link is clicked, a request may be sent to a database, and a new record in the database may be created. The new record may be associated with a code such as a numeric code, and may be sent back to the browser and appended to the phone number as a phone extension. When the visitor calls the business, the extension may be automatically dialed. The entered extension may be used to retrieve the information that has been associated with that extension, including the record's record ID.

Using visit-specific details collected by the analytics system, a request to label the website activities with a code corresponding to the record ID may be sent to the analytics system. A URL may be generated based on the record ID. Once a phone call is analyzed (e.g., associating the phone call with a particular extension and/or recorded data about a website visit), the call may be forwarded to the business.

Following a hang-up or disconnection of the call, details about the call may be posted to the URL and may be associated with the new record ID in the database. The website may have an analytics system, which may receive a request to associate the visitor details and website activities with an offline transaction. Some details of the transaction, such as revenue, may be manually keyed in to a computer system by a phone operator, while other information, such as the call cost, may be automatically calculated based on a pre-defined cost variable and the call length. Following the phone call, the associated extension may be deleted and made available for re-use. The method may be implemented as a system including one or more servers providing data related to the website and the database, wherein each server comprises at least one computing system having at least one data processor.

In an embodiment, a method of associating calls, as well as financial transactions resulting from such phone calls, with Internet activities using SMS is disclosed. In this embodiment, details about the financial transactions may be typed in a text message according to a predefined format, and sent to a central system, which may further interpret the message into a format that can be sent to a web analytics system for recording a financial transaction associated with the Internet activities. Thus, following termination of a call connection, an SMS may be initiated which prompts or requests a reply containing any additional details about the call connection. Any such additional details may be associated with the record ID. The other steps in this embodiment are identical, or substantially similar, to the previously described embodiment.

In an embodiment, a method for tracking a phone call and associating the call with a visit to a website and clicked HTML element may include receiving a request sent to a database stored on a computer readable medium in response to an activity on the website. The request may include an identifying attribute of the clicked element. A record may be created in response to the request. An identifying attribute of a clicked HTML element on the page of the website may be associated with the record. A record ID associated with the record may be generated. A call extension corresponding to the code such that the call extension is associated with the record may be assigned.

A caller may be prompted to enter the call extension in response to establishing a call connection. The information in the record associated with the call extension may be retrieved. The record ID may be associated with both the call connection and the activity on the website, including the identifying attribute of the clicked HTML element.

A request may be sent to a website data analytics system to create a label such that the activity on the website and any data regarding visitor details (e.g., any User information that may be collected or known) are labeled with an ID that corresponds to the record ID. A URL based on the ID that corresponds to the record ID may be generated. Details about the call connection may be posted to the URL following disconnection of the call connection. An analytics system may be queried for visit details associated with the label.

In an embodiment, a method of associating calls with Internet activities is disclosed. In particular, a User or visitor may visit or enter a website and see a "call now" link. When the link is clicked, a request may be sent to a database, and a new record in the database may be created. The new record may be associated with a code, such as a numeric code, which may be sent back to the browser and appended to the phone number as a phone extension. When the visitor calls the business, the extension may be automatically dialed. The entered extension may be used to retrieve the information that has been associated with that extension, including the record ID.

The website may have an analytics system, which may collect visit-specific details. A request to label the website activities with a code corresponding to the record ID may be sent to the analytics system using these visit-specific details. The phone call may be routed to the business, which communicates with a remote system about the dialed extension. This facilitates analysis of the phone call (e.g., associating the phone call with a particular extension and/or recorded data about a website visit).

During the communication, the extension is swapped for a record ID, which is used in later communications to send and receive data about the call record. Following a hang-up or disconnection of the call, each system may send or receive details about the call, along with the call record ID, and may associate such details with the record ID in its database. Following the phone call, the associated extension may be deleted and made available for re-use. The method may be implemented as a system including one or more servers providing data related to the website and the database, wherein each server comprises at least one computing system having at least one data processor.

In another disclosed embodiment of a method of associating calls with Internet activities, a visit to a link or a click on a website may result in a phone number and an extension being displayed. When that phone number is dialed and that extension is entered during a call session, it may be determined that particular visitor activities resulted in that phone call being initiated. In particular, a User or visitor may visit or enter a website and send a request to a database. A new record in the database may be created. The new record may include a code such as a numeric code, and may be sent back to the browser and displayed as a phone extension. As the visitor navigates the website, the current page URL associated with the extension may be updated. When the visitor calls the business, the visitor may be prompted for the extension. The other steps in this embodiment are identical, or substantially similar, to the previously described embodiment.

In another embodiment, a method for tracking a phone call and associating the call with a visit to a remote website may include receiving a request sent to a database stored on a computer readable medium in response to an activity on the website. The request may include an identifying attribute of the remote website. A record may be created in response to the request. An identifying attribute of a remote website may be associated with the record. A record ID associated with the record may be generated. A call extension corresponding to the code such that the call extension is associated with the record may be assigned and may be sent back to the browser and appended to the phone number as a phone extension. The other steps in this embodiment are identical, or substantially similar, to the previously described embodiment.

Systems for tracking calls and/or leads are disclosed herein. The system may include one or more non-transitory computer readable storage mediums storing instructions that, when executed by a computing system, cause the computing system to perform a method to track calls by associating the calls with online Internet activities. The method executed by the computing system may include the steps discussed with respect to any or all of the above-described methods of tracking calls.

In addition, the system encourages each business to manage all follow-ups and continue updating the lead record beyond the initial phone call via the system dashboard. By doing so, eventually attaching to the record a figure value, the business can attribute revenues directly to each marketing effort. This "lead management" often involves repeated e-mail communications where either side—the business or the lead—may need to include file attachments. Currently accepted methods involve the leads tracking system provider storing such attachments on its own servers, compelling it to charge for such storage.

The present disclosure leverages a business' hosting platform—which usually has ample unused data storage space—to solve this issue while maintaining file privacy. In certain embodiments, the method can involve:

a. Creating a folder to store all file attachments on the business' hosting platform (e.g., "attachments").
b. Storing a message representing e-mail communication in the leads management system database, along with the original filename; a message ID is created.
c. Generating a hash for each file attachment based on the filename paired with a salt value created from a combination of the filename and a constant ID of the business/user.
d. Naming the file with the hash value, and storing it in the "attachments" folder from step 1, preceded by the message ID; this prevents files with the same name sent by different users within the same business and/or in different messages from being overwritten.
e. When the message is later retrieved on the system, the links to download the files are generated from the filename and ID (constant).

To access any of the files, an external hacker would need to either guess a long, random string, or know the exact filename, message ID, as well as the business' ID; neither scenario is likely.

These and other features of the present disclosure and the specific details will be more fully described with reference to the accompanying figures.

BRIEF DESCRIPTION OF THE DRAWINGS

By way of description only, embodiments of the present disclosure will be described herein with reference to the accompanying drawings.

DETAILED DESCRIPTION OF THE PRESENT INVENTION

Figure 1:
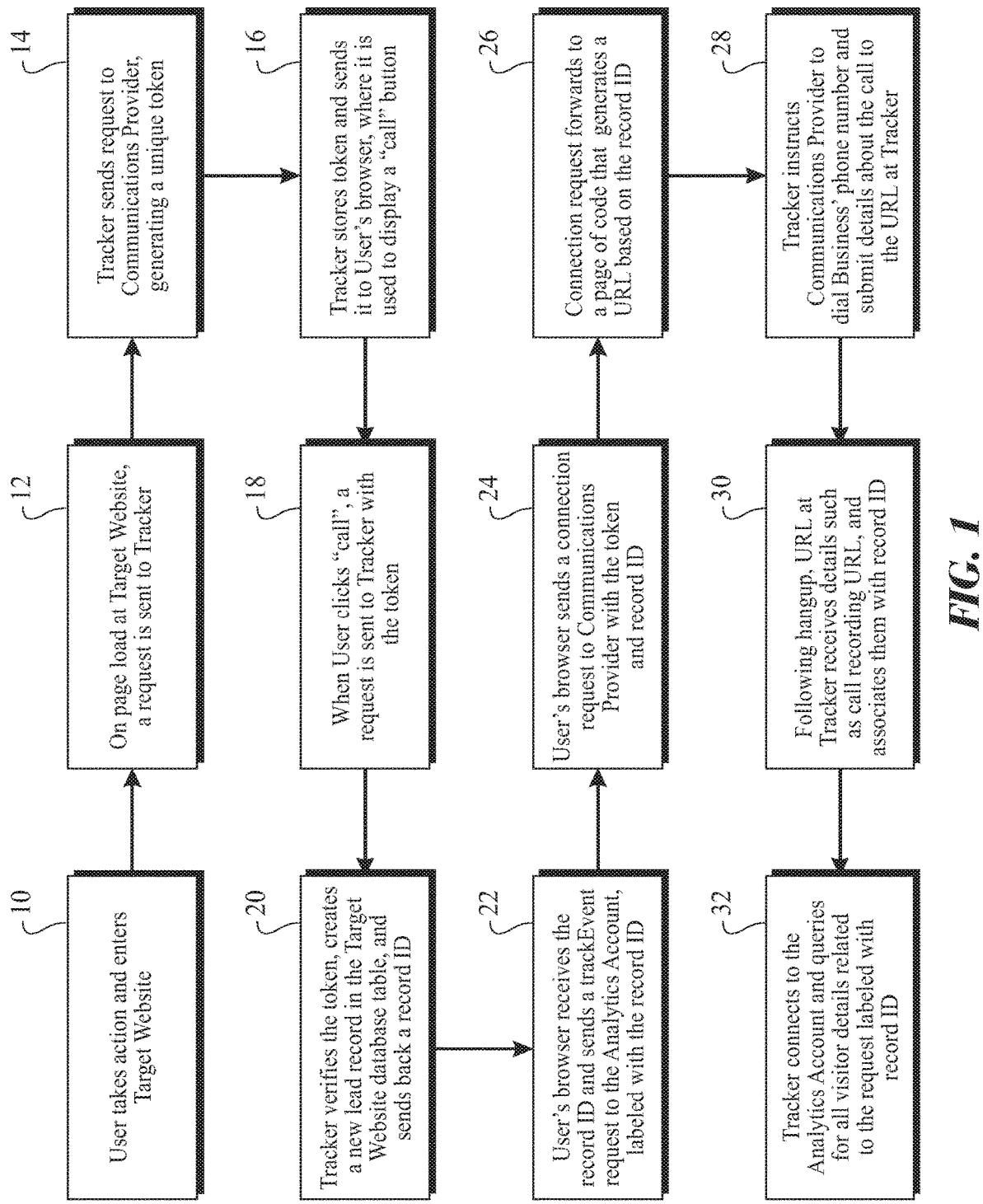
FIG. 1 presents a flowchart illustrating an embodiment of the method with a single user, where a phone call is completed through a browser, and call recording is enabled.

The following description with reference to the accompanying drawings is provided to assist in a comprehensive understanding of the exemplary embodiments. It includes various specific details to assist in that understanding but these are to be regarded as merely exemplary. The terms and words used in the following description and claims are not limited to bibliographical meanings or any extrinsic dictionary definition, but are merely used by the inventor to enable a clear and consistent understanding of the disclosure. The terms used herein must be understood based on the descriptions made herein, and are defined herein according to the functions of the present disclosure. Those of ordinary skill in the art will recognize that various changes and modifications of the embodiments described herein can be made without departing from the scope and spirit of the disclosure. Descriptions of well-known functions and constructions may be omitted for clarity and conciseness.

The following terms are used throughout this description with the following meanings:

A "Business" is a person, establishment or other entity that advertises to attract phone calls.

A "Target Website" is a website that a Business maintains on one or more server computers. A Target Website may display a phone number and/or extension such that a visitor to the Target Website can contact the Business via the phone number and/or extension displayed on the Target Website.

A "User" is a person who visits a Target Website or accesses any other network-based content (e.g., marketing property) of a Business.

A "Tracker" is an entity and/or service, which is typically external to the Business, that tracks and associates data related to voice calls made to a Business with data related to website visits and/or other forms of accessing network-based content of a Business. In general, a Tracker can adapt to any external system or service that the Target Website selects, provided that such system has a public-facing application programming interface ("API") that allows for remote calls for retrieval, additions, recording, and/or alterations of data. In some embodiments a Tracker may also (or instead) associate data collected after a phone call by a User to a Business (e.g., data relating to a follow-on purchase) with data related to the User having accessed network-based content of a Business (e.g., a website). Tracker may communicate with other systems (e.g., a Communications Provider, Capable Entity, Lead Manager, Analytics Account, Advertising Account, or Foreign Domain) via, for example, HTTP POST requests, HTTP GET requests, or a combination thereof.

A "Lead Manager" is one example of an external service referred to above, e.g., a leads management system. Examples of suitable leads management systems may include those provided by FUTURE SIMPLE, SALESFORCE, and the like. A similar example may be that of a call management dashboard utilized by a call center, such as FIVE9.

A "Communications Provider" refers to a communications service that enables forwarding incoming phone calls to pages of code. Possible examples of a Communications Provider include TWILIO, PLIVO and BANDWIDTH.

A "Tracking Number" is a number that Business may maintain at Communications Provider. A Tracking Number may be a general number for online inquiries, and may be configured to generically forward calls if no extension is dialed. Alternatively, Target Website may maintain a phone number outside of Communications Provider, and may have all calls forwarded to a designated Tracking Number at Communications Provider.

An "Analytics Account" is an account of an analytics tool/system of Business, which is another example of an external service referred to above; and an example of such an analytics tool/system is GOOGLE ANALYTICS.

An "Advertising Account" is an account with an online advertising platform, which is another example of an external service referred to above; and an example of such an online advertising platform is GOOGLE ADWORDS. The advertising platform can be, for example, any advertising platform that can accept remote requests and/or imported conversions in the form of file uploads, for example. The advertising platform may also refer to a media-buying platform that incorporates information about a User's activity into its algorithms.

A "Tracking Cookie" is a cookie that may be used to track online activity. A Tracking Cookie may be associated with an analytics tool, such as that provided by GOOGLE ANALYTICS or the like, where the cookie can be the _utma or _utmb cookie utilized by GOOGLE ANALYTICS. The _utma cookie values are used to distinguish users and sessions and are created when a JAVASCRIPT library executes and no existing _utma cookies exist. The _utma cookie is updated every time data is sent to GOOGLE ANALYTICS. The _utmb cookie values are used to determine new sessions/visits and are created when the JAVASCRIPT library executes and no existing _utmb cookies exist. The _utmb cookie is updated every time data is sent to GOOGLE ANALYTICS. Alternatively, a Tracking Cookie may be associated with an advertising platform, such as that provided by GOOGLE ADWORDS or the like, where the cookie would be the globally unique tracking parameter or GOOGLE Click Identifier ("gclid") utilized by GOOGLE ADWORDS. A Tracking Cookie may have a Tracking Cookie value that may be used to distinguish among Users and sessions. Such cookies may be created when the JAVASCRIPT library executes and/or when no existing tracking cookies exist.

Note that, although the methods introduced here are described as using GOOGLE ANALYTICS, any other cookie-based analytics system that uses unique values to identify Users and visits and that can be queried for visitor details associated with a label could be substituted. The methods may also be modified to accommodate an analytics system that does not utilize cookies and instead relies on user-specific profile IDs or a similar unique variable to identify a user, provided that the profile ID can be retrieved and queried remotely and that subsequent information associated with the profile ID can be recorded remotely.

A "Remote Tracking Request" refers to a request sent from a server to the Analytics Account using the Tracking Cookie value.

An "Operator" is an employee or agent of a Business, whether real or virtual, handling lead management on behalf of the Business.

A "Foreign Domain" is an online property, other than Target Website, where Business may display a phone number, such as a classified ads website (e.g. Craigslist).

A "Scripted Inbox" is an e-mail account with a platform that allows listening for incoming e-mail communication and forwarding the communication to pages of code, commonly available with cloud computing services such as GOOGLE APP ENGINE.

An "Element ID" is an identifying attribute of a call-prompting button, link, or other HTML element.

A "Capable Entity" is Business with a system capable of collecting the sounds associated with strokes on a phone keypad (e.g., DTMF sounds), interpreting them into computer digits, and communicating the digits as well as other information to an external system via the Internet. Such a phone system may be managed internally by Business or outsourced to a provider of such systems. Note that certain Communications Providers may also qualify as Capable Entity.

Each computer comprising at least one microprocessor, a digital memory storage device, and a communication circuit.

Figure 36:
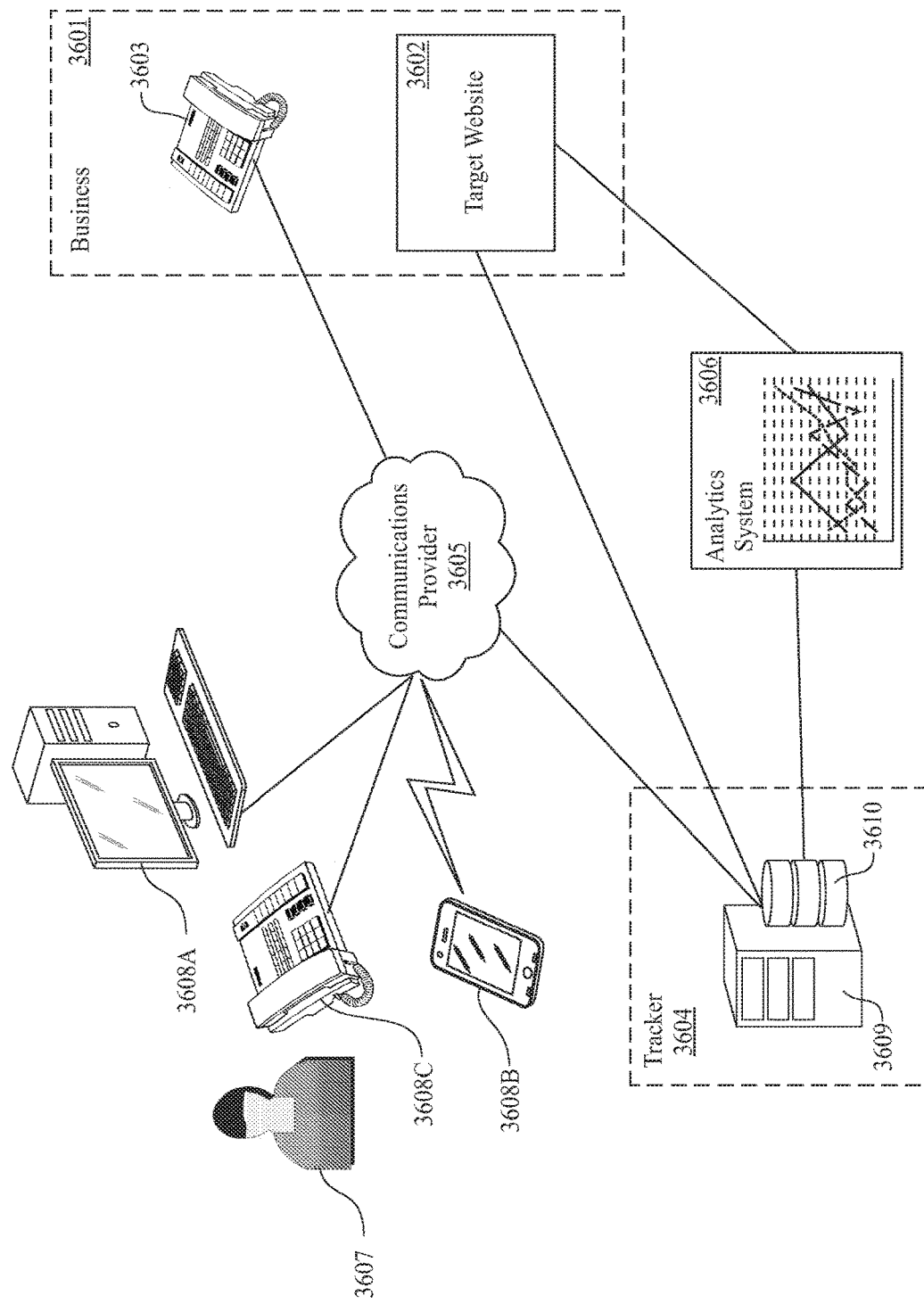
FIG. 36 shows a network environment in which the technology introduced here can be implemented.

Refer now to FIG. 36, which illustrates an environment in which the technology introduced here can be implemented. The environment includes a Business 3601, which has a website ("Target Website") 3602 and a telephone system 3603. Target Website 3602 and telephone system 3603 each can be, but is not necessarily, operated directly by the Business on a physical premises of the Business; note, however, that hosting of the website and/or operation of the telephone system may be contracted out by the Business to one or more third-parties. The environment further includes a tracking entity ("Tracker") 3604, a Communications Provider (e.g., TWILIO) 3605, and an analytics system (e.g., GOOGLE ANALYTICS) 3606.

In an illustrative usage scenario, a User 3607 accesses Target Website 3602 of Business 3601 by using, for example, a conventional end-user device 3608, such as a personal computer 3608A or a mobile device 3608B, such as a Smartphone or tablet computer. The User's access to Target Website 3602 may be provided through and by Communications Provider 3605. In this usage scenario, User 3607 is motivated by content on the Target Website 3602 to make a voice call to Business 3601, for example, to phone system 3603 of Business 3601, by using for example, his or her computer 3608A, mobile device 3608B (e.g., Smartphone or tablet), landline phone 3608C, or other end-user device. Note that in other embodiments, described further below, User's decision to make a voice call to Business 3601 may be motivated by network-based content other than a website that User accesses, such as an e-mail, video, or micro-blog entry (e.g., Tweet) from or associated with Business 3601. The voice call can be connected via Communications Provider 3605, which can be but is not necessarily the same communications provider through which User 3607 accessed Target Website 3602.

As described in greater detail below, the main functionality of Tracker 3604 is to associate data relating to User's accessing of Target Website 3602 (or other network-based content) to data related to User's voice call to Business 3601, or to facilitate such association of data. In some embodiments, Tracker 3604 associates information acquired or recorded after the call, with the data relating to User's accessing of Target Website 3602 (or other network-based content). ###Tracker 3604 includes and/or uses a server computer system 3609 to carry out the aforementioned functionality, and maintains a database 3610 to store the associated information. Additionally, Tracker 3604 can provide such data to the analytics system 3606, to enable subsequent search and retrieval of the associated information. The computer system 3609, and any other "computer system" referred to herein, can be any type of data processing device or system capable of performing the functions attributed to it in this description. Additionally, computer system 3609, and any other "computer system" referred to herein, can be embodied as a single device or as multiple devices acting in cooperation with each other. In the case of multiple devices acting in cooperation with each other, the devices can be connected to each other directly or through one or more data networks, such as a local area network (LAN), personal area network (PAN), or the like. Note also that database 3610 can be a part of computer system 3609, even though it is depicted separately in FIG. 36.

FIG. 1 shows a process by which a leads tracking system can operate in accordance with the technology introduced here. The process of FIG. 1 can be performed in an environment such as that illustrated in FIG. 36, described above. Likewise, unless indicated otherwise, each entity shown in FIG. 36 is an example of any entity referred to by the same term (e.g., "User," "Business," "Tracker" or "Communications Provider") anywhere in this description and associated drawings, even though the reference numerals for such entities may be omitted henceforth in this description. It can be assumed that all functions and operations attributed to a Tracker in this description are actually performed by one or more computer systems or other processing device(s) owned or operated by the Tracker (e.g., server computer system 3609 in FIG. 36), unless indicated otherwise.

In the illustrated embodiment of FIG. 1, User executes an action at step 10 that takes User to Target Website, such as clicking on an ad, clicking on a search link, or clicking on a referring link, etc. Next a request is sent to Tracker once Target Website has loaded at step 12. The request can be sent from User's browser to Tracker, using a JAVASCRIPT snippet that Business adds to Target Website's code. The JAVASCRIPT may reference code on Target Website or Tracker. Alternatively, Target Website may make a server-side request to Tracker as soon as User's browser sends a request to load pages from Target Website, before Target Website has actually loaded at User's browser.

Tracker then sends a request at step 14 to Communications Provider, which in turn generates a unique token. Tracker then stores the token at step 16 and sends it to User's browser, where it is used to display a "call" link or button that enables phone calls to be made through User's browser. If the communication provider used were TWILIO, the token would be used to initiate an instance of TWILIO Client, which enables phone calls to be made through User's browser, and would display a "call" link or button on the website page. User then clicks the "call" link at step 18 and a request is sent to Tracker with the token. At step 20, Tracker verifies that the token sent by User is valid and authentic. If the token is determined to be valid and authentic, Tracker creates a new lead record in the Target Website's leads database table and sends back a record identification code to User's browser. The record identification code (or call record ID) mentioned herein assists Tracker in uniquely identifying the record in its database. If the token is determined not to be valid and authentic, Tracker will ignore the request, as it is not associated with an actual visit to the website. The token is used to protect Business from unauthorized phone calls initiated by hackers or malicious software. User's browser receives the record identification code at step 22 and sends a request to the Analytics Account. If the Analytics Account used were GOOGLE ANALYTICS, the request may be a trackEvent request labeled with the record identification code. User's browser then sends a connection request with the token and record identification code to Communications Provider at step 24. This connection request forwards to a page of code at Tracker at step 26 that generates a uniform resource locator ("URL"), commonly called a web address, based on the record identification code (e.g., "www.tracker.com/call-hangup-script.php?recordID=35"). The code instructs Communications Provider at step 28 to dial Business' phone number (or connect to Business' softphone, such as a browser-based phone, wherein a softphone refers to a software program for making telephone calls over the Internet using a general purpose computer, rather than using dedicated hardware) and to submit details about the call following termination of the phone call to the URL at Tracker. Following phone call termination, the URL at Tracker receives details from Communications Provider at step 30, such as a call recording URL, and associates them with the record identification code. Finally, Tracker connects to the Analytics Account at step 32 and queries for all visitor details associated with the request labeled with the record identification code. Note that while the example of a URL is described here, other embodiments of the technology introduced here may use a different kind of network locator for the same or a similar purpose as the URL in the embodiments described herein.

There are several alternatives to sending the request referenced in steps 18-20. In one scenario, Tracker may utilize an identifier that has already been created. For instance, Tracker may collect a Tracking Cookie and use this value in lieu of generating Tracker's record identification code. Tracker may also generate the identification code on page load, in step 12.

Another possibility, which would also eliminate the requests referenced in steps 22 and 32, may involve submitting the tracking data together with the communication request at step 24. In addition to providing instructions on handling the call at steps 26-28, the code may populate the available data into a database of Tracker or another system, such as Lead Manager. Note that in this alternative, data related to accessing network-based content is limited to the information available and collected at the time of the connection request (e.g., information specific to the connection request cannot be collected later). This can be remedied by collecting and submitting a Tracking Cookie with the connection request, and later using the Tracking Cookie to send a Remote Tracking Request that incorporates a record identification code, which would then permit retrieving information specific to the record at the external system via another remote request. In this scenario, the URL may incorporate the data instead of the record ID, e.g., "www.tracker.com/call-hangup-script?source=google&keyword=flowers."

Yet another scenario may involve Tracker establishing its own tracking data, which may be submitted together with the connection request at step 24. This data may be associated with an identifier generated by Tracker, such as a Tracking Cookie, or a pre-specified identifier such as an IP address. If the data is associated with an identifier, Tracker may elect to send only the identifier at step 24, and use that identifier to retrieve the associated data later.

In any scenario where data is available prior to the connection request, Tracker may utilize the data to route the connection request. For instance, Tracker may decide to route a connection request associated with a visit from a web search to a certain destination (e.g., network locator), and a connection request associated with a visit from a banner ad to another destination (e.g., network locator).

Note that in all of these scenarios, Tracker may elect to use the data to assign records to a specific Operator. In this process, Tracker may follow rules pre-specified by Business. To further assist Operator in identifying a record corresponding to a phone call, Tracker may instruct Communications Provider to announce some or all of the data to Operator prior to connecting the call.

Figure 2:
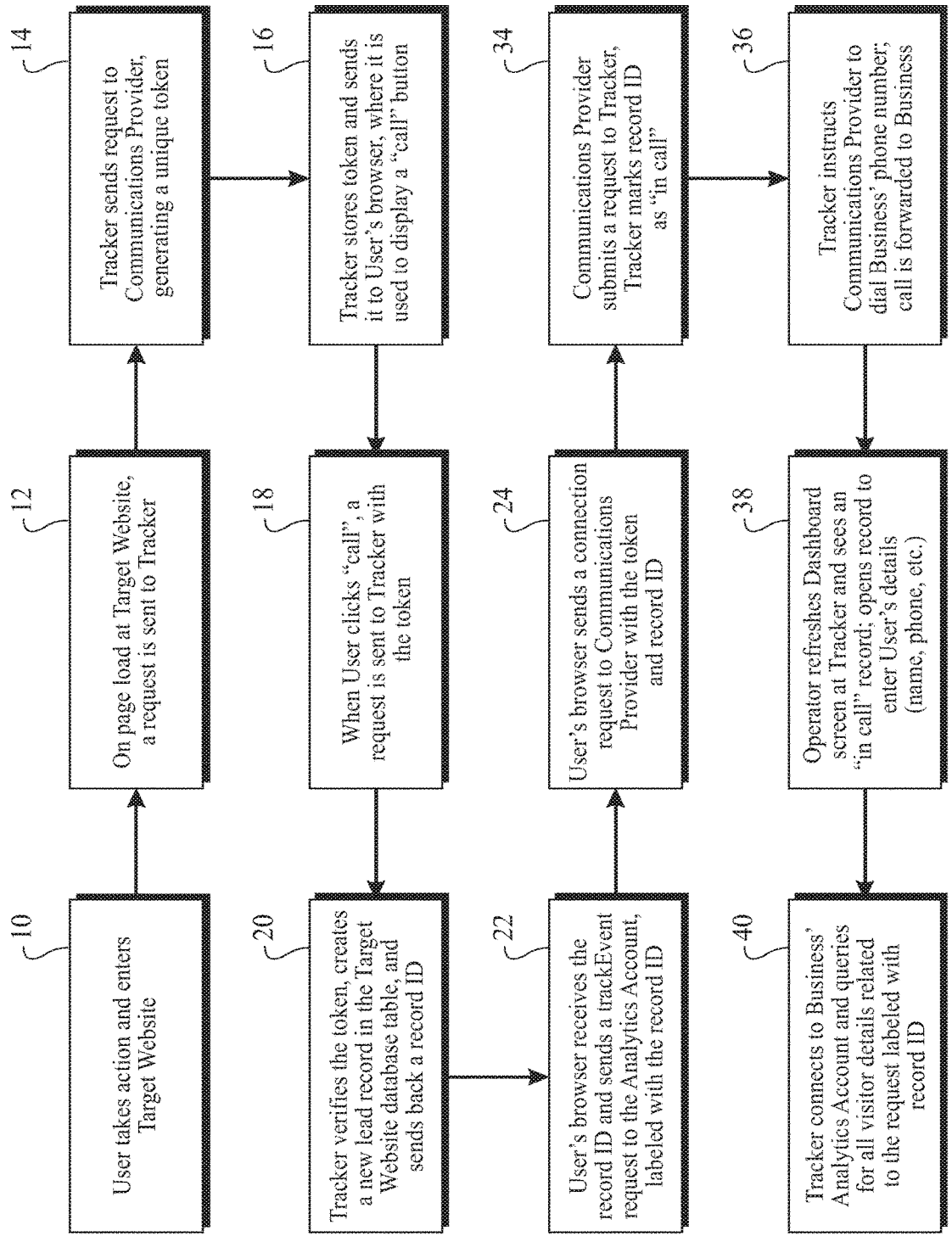
FIG. 2 presents a flowchart illustrating an embodiment of the method with a single user, where a phone call is completed through a browser, and call recording is disabled.

If Business does not receive simultaneous calls, or the likelihood of simultaneous calls is very low, and Operator is generally available throughout the day, call recording may not be necessary. In this embodiment, the system would follow the flow chart illustrated in FIG. 2. Steps 10 through 24 are the same in FIG. 2 as in FIG. 1. Then, at step 34 the connection request forwards to a page of code at Tracker that creates a new blank lead record associated with the record identification code and marks this record as "in call." This code replaces the instructions to record the call described in the previous scenario. The code then instructs Communications Provider at step 36 to dial Business' phone number and User's call is forwarded to Business' phone number. Operator answers the phone and refreshes the dashboard screen at Tracker at step 38. Upon refreshing, Operator sees an "in call" record—the one associated with the incoming phone call—and opens this record to enter User's details, such as name, phone number, etc. obtained during the call. At step 40, Tracker connects to the Analytics Account and queries for all visitor details associated with the request labeled with the record identification number.

In another embodiment, Tracker may maintain a single phone number for multiple Businesses. This allows Tracker to centralize all calls, eliminating each Business' need to hold a phone number with Communications Provider by Tracker holding a single phone number with Communications Provider, which processes and forwards the calls to the appropriate Business. This call forwarding may be done with or without call recording as described above in FIGS. 1 and 2, depending on each Business' individual preferences.

When the method is implemented in a "primary context" leads tracking system, such as in FIGS. 1 through 4, Tracker can provide added flexibility by maintaining a separate set of database tables for each Business, built around the fields of information that are unique to its needs. For example, Business A may want a database built around a customer's first and last name, a customer's company name, customer's phone number, and/or any other fields of information that may be relevant. This enables Business A to store first and last name in a single field, Business B to have a single phone number field (instead of home and mobile), and/or Business C to eliminate a "company" field, among other options. The table names in each such set may be prefixed with each Business' username, e.g. "businessA_leads", "businessA_leads_comments" and "businessB_leads", "businessB_leads_comments", and so forth. Since popular database systems—such as mySQL—allow a finite number of tables in any single database, scaling the system may require dozens of databases, with a single main database that holds each username and a reference to the database where all the tables relating to that username reside.

Figure 3:
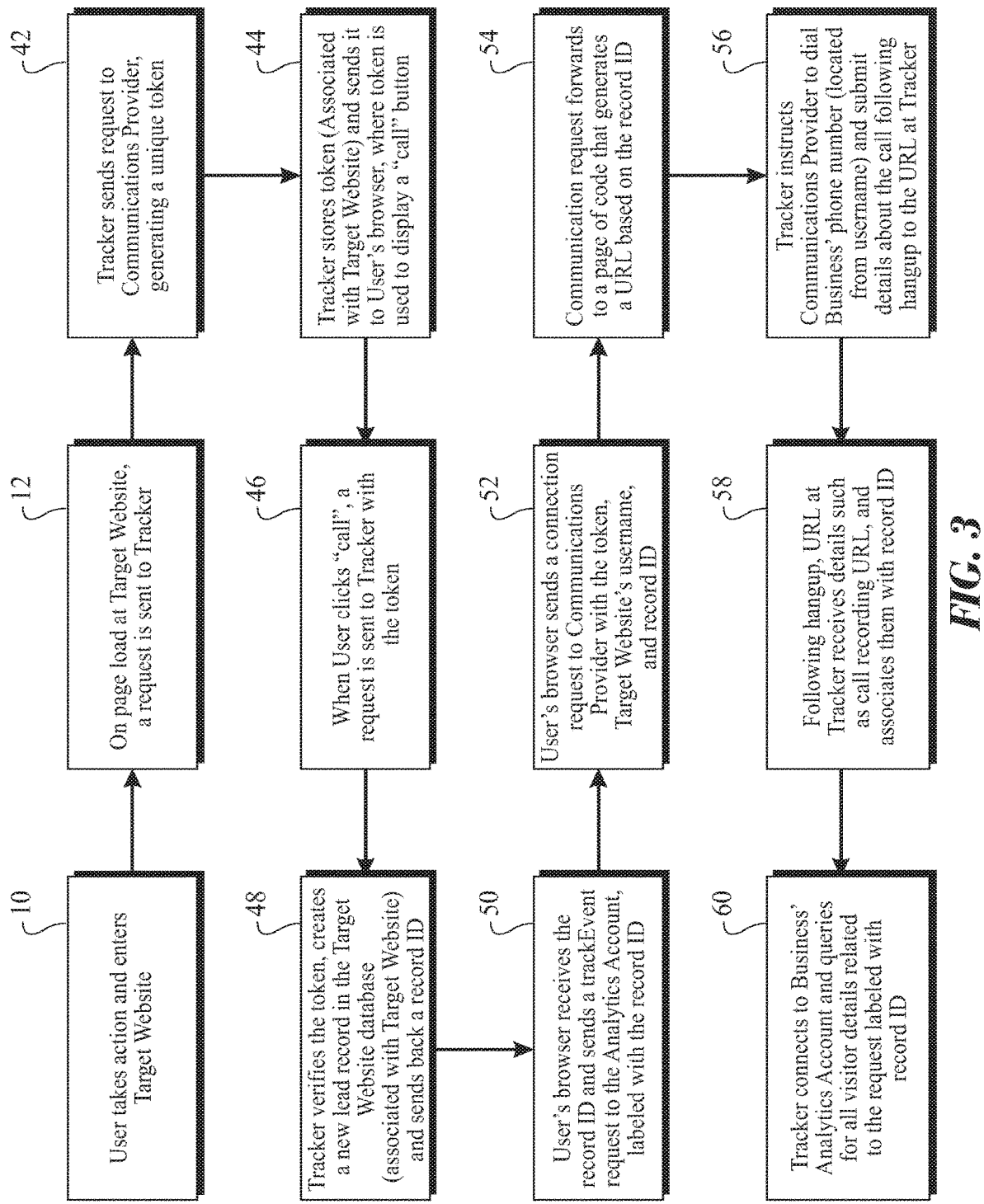
FIG. 3 presents a flowchart illustrating an embodiment of the method with multiple users, where a phone call is completed through a browser, and call recording is enabled.

In this embodiment, the system would follow the flow chart illustrated in FIG. 3. Steps 10 through 12 are the same in FIG. 3 as in FIG. 1. Tracker then sends a request at step 42 to Communications Provider, which in turn generates a unique token that is associated with Target Website. At step 44, Tracker stores the token associated with Target Website and sends it to User's browser, where it is used to display a "call" button or link. User then clicks the "call" link or button at step 46 and a request is sent to Tracker with the token associated with Target Website. At step 48, Tracker then verifies that the token associated with Target Website sent by User is valid and authentic. If the token is determined to be valid and authentic, Tracker creates a new lead record in Tracker's leads database table associated with Target Website and sends back a record identification code to User's browser. User's browser receives the record identification code at step 50 and sends a request to the Analytics Account, such as a trackEvent request to GOOGLE ANALYTICS, labeled with the record identification code. User's browser then sends a connection request with the token, Target Website's username, and the record identification code to Communications Provider at step 52. This connection request forwards to a page of code at Tracker at step 54 that generates a URL based on the record identification code. The code instructs Communications Provider at step 56 to dial Target Website's phone number, which is located in Tracker's database, and to submit details about the call following termination of the phone call to the URL at Tracker. Following phone call termination, the URL at Tracker receives details at step 58, such as call recording URL, and associates them with the record identification code. Finally, Tracker connects to the Analytics Account at step 60 and queries for all visitor details associated with the request labeled with the record identification code.

In a fourth embodiment of the technology introduced here, a User may use his/her mobile phone to communicate with Business. Currently, the ability to dial phone calls from browsers using plug-ins such as TWILIO Client relies on Adobe Flash or web real-time communication (WebRTC), which are not supported in most mobile browsers, including APPLE's iOS and most versions of GOOGLE's ANDROID. However, WebRTC is supported in a recent release of the GOOGLE web browser CHROME for ANDROID. It is contemplated that calls made from a mobile phone could still be tracked as in the embodiments discussed above, associating each incoming call with the most recent lead record created at Tracker. However, dropped calls and delays, which are associated with mobile phones, render such systems error-prone. The embodiment illustrated in FIG. 4 resolves this error-prone issue associated with mobile phones in a customer-friendly manner. At step 100, User executes an action that takes User to Target Website, such as clicking on an ad, clicking on a search link, or clicking on a referring link, etc. Next, a request is sent from the accessed web page to Tracker once Target Website has loaded at step 102. Tracker sends User's browser a token at step 104, which is visible to User as a "call now" link. This "call now" link remains empty—there is no phone number associated with it—until User clicks the link. User clicks the "call now" link at step 106 and a request is sent to Tracker along with the token. Tracker verifies that the token is valid and authentic at step 108. If Tracker determines that the token is valid and authentic, it creates a new lead record associated with Target Website and a record identification code in Tracker's database. In step 110 Tracker stores the record identification code in a temporary table and assigns to it an extension, which may be a single-digit such as "1." The record identification code, Tracking Number, and the extension are then sent to User's browser. User's browser receives the record identification code at step 112, and sends a request to the Analytics Account, such as a trackEvent request to GOOGLE ANALYTICS, labeled with the record identification code. Using JAVASCRIPT, User's browser dynamically populates the "call now" link with the Tracking Number and extension at step 114. A call alert then opens in a pop-up window on User's browser with the Tracking Number and extension. The User clicks "call" at step 116 and the call is placed to the Tracking Number, with the extension being automatically dialed. The call forwards to a page of code (e.g., a page in a server-side programming language, for example, PHP) at Tracker that instructs Communications Provider to gather the dialed extension at step 118 and submit it to a second page of code at Tracker, along with Target Website's username, which is identified by the dialed phone number. At step 120, the second page of code searches Tracker's database, specifically Target Website's temporary table, for the extension, retrieves the record identification code, adds User's phone number to the database, and generates a URL based on the record identification code. Tracker then instructs Communications Provider to dial Business' real phone number (not owned or forwarded to Communications Provider), which is located from Target Website's username, at step 122, and to submit details about the call following termination of the phone call to the URL at Tracker. Following hang-up at step 124, the URL at Tracker receives details such as call recording URL, and associates them with the record identification code. The record identification code and the extension are then deleted from the temporary table, and the extension is available for re-use by the system. Alternatively, Tracker may instruct Communications Provider to forward the call to a fixed URL, and when receiving details about the call from Communications Provider at step 124, Tracker may use the "From" number to search the database for the latest record with that phone number, which was added to the database in step 120 (note that in this scenario, an extension may not be necessary). Finally, at step 126, Tracker connects to the Analytics Account and queries for all visitor details related to the request labeled with the record identification code.

Figure 5:
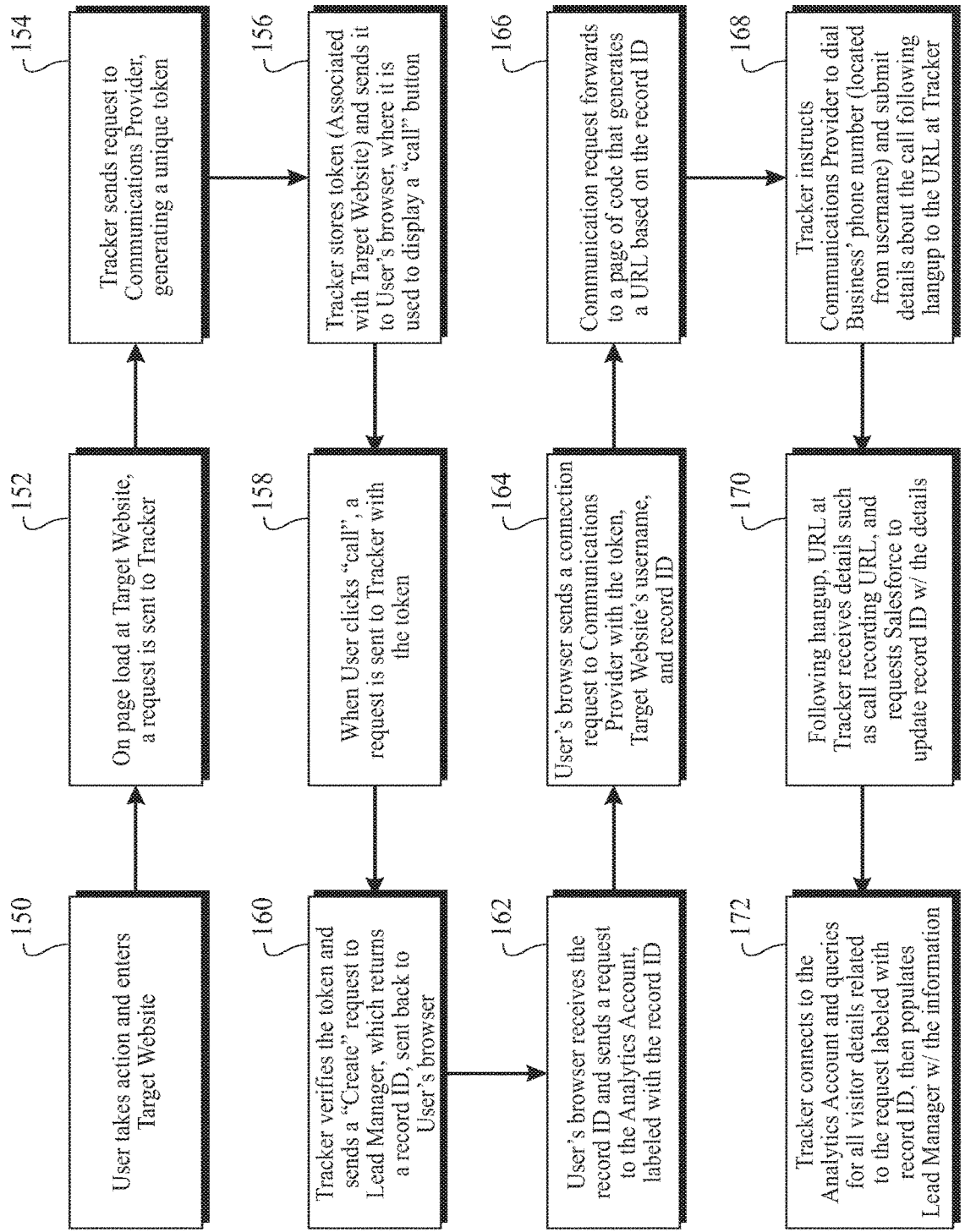
FIG. 5 presents a flowchart illustrating an embodiment of the method with an external leads management system, where a phone call is completed through the browser, and call recording is enabled.

In yet another embodiment, the method can be adapted to integrate with any Lead Manager. In at least one such embodiment, Tracker acts as an interpreter between Lead Manager, Communications Provider, and the Analytics Account. Tracker generates an ID or record identification code, sends the code to both Lead Manager and Analytics Account, and then forwards the call to Business. An example of such an embodiment is illustrated in FIG. 5. In the illustrated embodiment, User executes an action at step 150 that takes User to Target Website, such as clicking on an ad, clicking on a search link, or clicking on a referring link, etc. Next a request is sent to Tracker once Target Website has loaded at step 152. Tracker then sends a request at step 154 to Communications Provider which in turn generates a unique token that is associated with Target Website. At step 156, Tracker stores the token associated with Target Website and sends it to User's browser, where it is used to display a "call" link or button. User then clicks the "call" link or button at step 158 and a request is sent to Tracker with the token associated with Target Website. At step 160, Tracker verifies that the token associated with Target Website sent by User is valid and authentic. If the token is determined to be valid and authentic, Tracker sends a "create" request to Lead Manager, such as SALESFORCE, which returns a record identification code. This record identification code is then sent back to User's browser. User's browser receives the record identification code at step 162 and sends a request to the Analytics Account, such as a trackEvent request to GOOGLE ANALYTICS, labeled with the record identification code. User's browser then sends a connection request with the token, Target Website's username and the record identification code to Communications Provider at step 164. This connection request forwards to a page of code at Tracker at step 166 that generates a URL based on the record identification code. The code instructs the Communications Provider at step 168 to dial Business' phone number, which is located in Tracker's database, and to submit details about the call following termination of the phone call to the URL at Tracker. Following phone call termination, the URL at Tracker receives details at step 170, such as call recording URL, and requests Lead Manager to update the record of the identification code with said details. Finally, Tracker connects to the Analytics Account at step 172, queries for all visitor details related to the request labeled with the record identification code, and then populates Lead Manager. If Lead Manager were SALESFORCE, for example, Tracker would populate the "Campaign" object in SALESFORCE.

Figure 6:
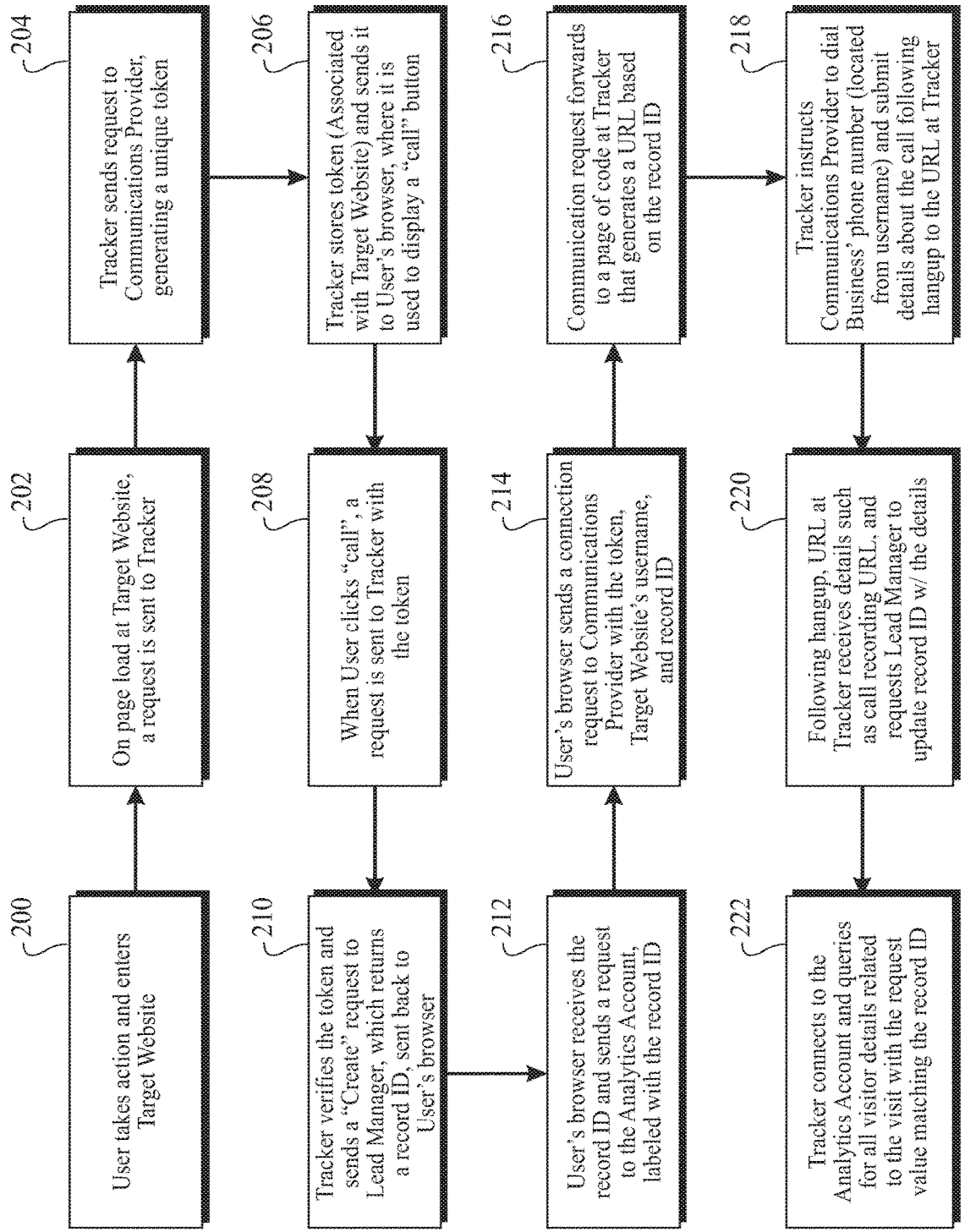
FIG. 6 presents a flowchart illustrating an embodiment of the method demonstrating an alternate way of distributing the identifier to the web analytics system, with multiple users, where a phone call is completed through the browser, and call recording is enabled.

Another embodiment of the technology introduced here is illustrated in FIG. 6. In this embodiment the method is substantially similar to the method illustrated in FIG. 5, except the method can be completed with or without call recording, or any number of variables, depending on Business' individual preferences. At step 200, a User executes an action that takes User to Target Website, such as clicking on an ad, clicking on a search link, or clicking on a referring link, etc. Next a request is sent to a Tracker once Target Website has loaded at step 202. Tracker then sends a request at step 204 to Communications Provider, which in turn generates a unique token that is associated with Target Website. At step 206, Tracker stores the token associated with Target Website and sends it to User's browser, where it is used to display a "call" link or button. User then clicks the "call" link or button at step 208 and a request is sent to Tracker with the token associated with Target Website. At step 210, Tracker verifies that the token associated with Target Website sent by User is valid and authentic. If the token is determined to be valid and authentic, Tracker sends a "create" request to Lead Manager, which returns a record identification code. This record identification code is then sent back to User's browser. User's browser receives the record identification code at step 212 and sends a request to the Analytics Account, such as a setCustomVar request to GOOGLE ANALYTICS, labeled with the record identification code. User's browser then sends a connection request with the token, Target Website's username and the record identification code to Communications Provider at step 214. This connection request forwards to a page of code at Tracker at step 216 that generates a URL based on the record identification code. The code instructs Communications Provider at step 218 to dial Business' phone number, which is located in Tracker's database, and to submit details about the call following termination of the phone call to the URL at Tracker. Following phone call termination, the URL at Tracker receives details at step 220, such as call recording URL, and requests Lead Manager to update the record of the identification code with said details. Finally, Tracker connects to the Analytics Account at step 222 and queries for all visitor details related to the visit with the request labeled with the record identification code.

Figure 7:
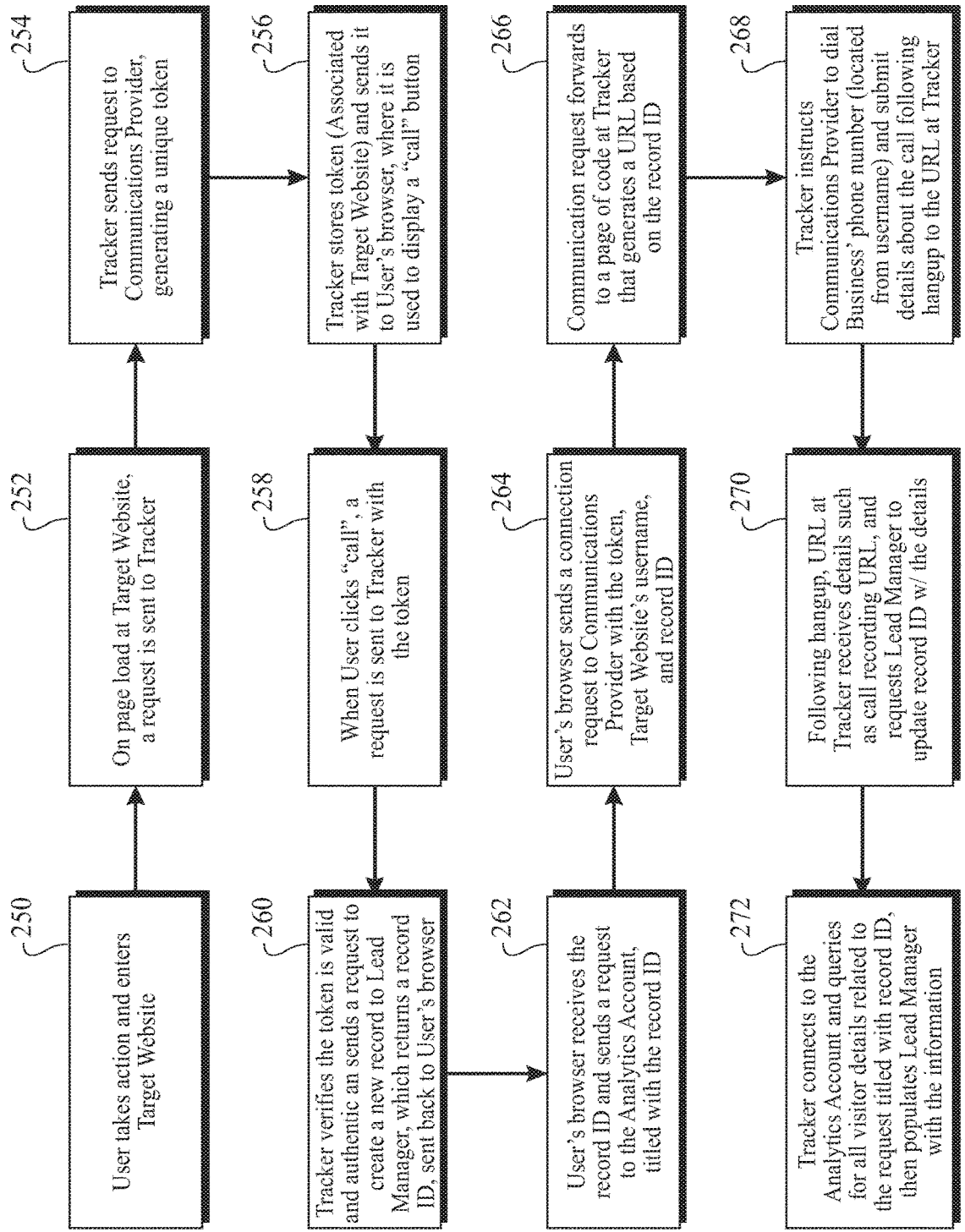
FIG. 7 presents a flowchart illustrating an embodiment of the method with an external leads management system, utilizing an alternate web analytics system, with multiple users, where a phone call is completed through the browser, and call recording is enabled.

Another embodiment of the technology introduced here is illustrated in FIG. 7. In this embodiment the method is illustrated as using alternate analytics software. Instead of using GOOGLE ANALYTICS as described above in FIG. 5, the method may use SALESFORCE as the Lead Manager and CLICKY ANALYTICS as the Analytics Account. In the illustrated embodiment, a User executes an action at step 250 that takes User to Target Website, such as clicking on an ad, clicking on a search link, or clicking on a referring link, etc. Next a request is sent to Tracker once Target Website has loaded at step 252. Tracker then sends a request at step 254 to Communications Provider, which in turn generates a unique token that is associated with Target Website. At step 256, Tracker stores the token associated with Target Website and sends it to User's browser, where it is used to display a "call" link or button. User then clicks the "call" link at step 258 and a request is sent to Tracker with the token associated with Target Website. At step 260, Tracker then verifies that the token associated with Target Website sent by User is valid and authentic. If the token is determined to be valid and authentic, Tracker sends a "create" request to Lead Manager, which returns a record identification code. This record identification code is then sent back to User's browser. User's browser receives the record identification code at step 262 and sends a request to the Analytics Account labeled with the identification code, such as a log request titled with the identification code to CLICKY ANALYTICS. User's browser then sends a connection request with the token, Target Website's username and the record identification code to Communications Provider at step 264. This connection request forwards to a page of code at Tracker at step 266 that generates a URL based on the record identification code. Tracker instructs Communications Provider at step 268 to dial Business' phone number, which is located in Tracker's database, and to submit details about the call following termination of the phone call to the URL at Tracker. Following phone call termination, the URL at Tracker receives details at step 270, such as call recording URL, and requests Lead Manager to update the record of the identification code with said details. Finally, Tracker connects to the Analytics Account, such as the CLICKY ANALYTICS account, at step 272 and queries for all visitor details related to the request labeled with the record code, such as the log titled with the record identification code, and then populates Lead Manager with the information. If the Lead Manager used were SALESFORCE, Tracker would populate the "Campaign" object in SALESFORCE.

Figure 8:
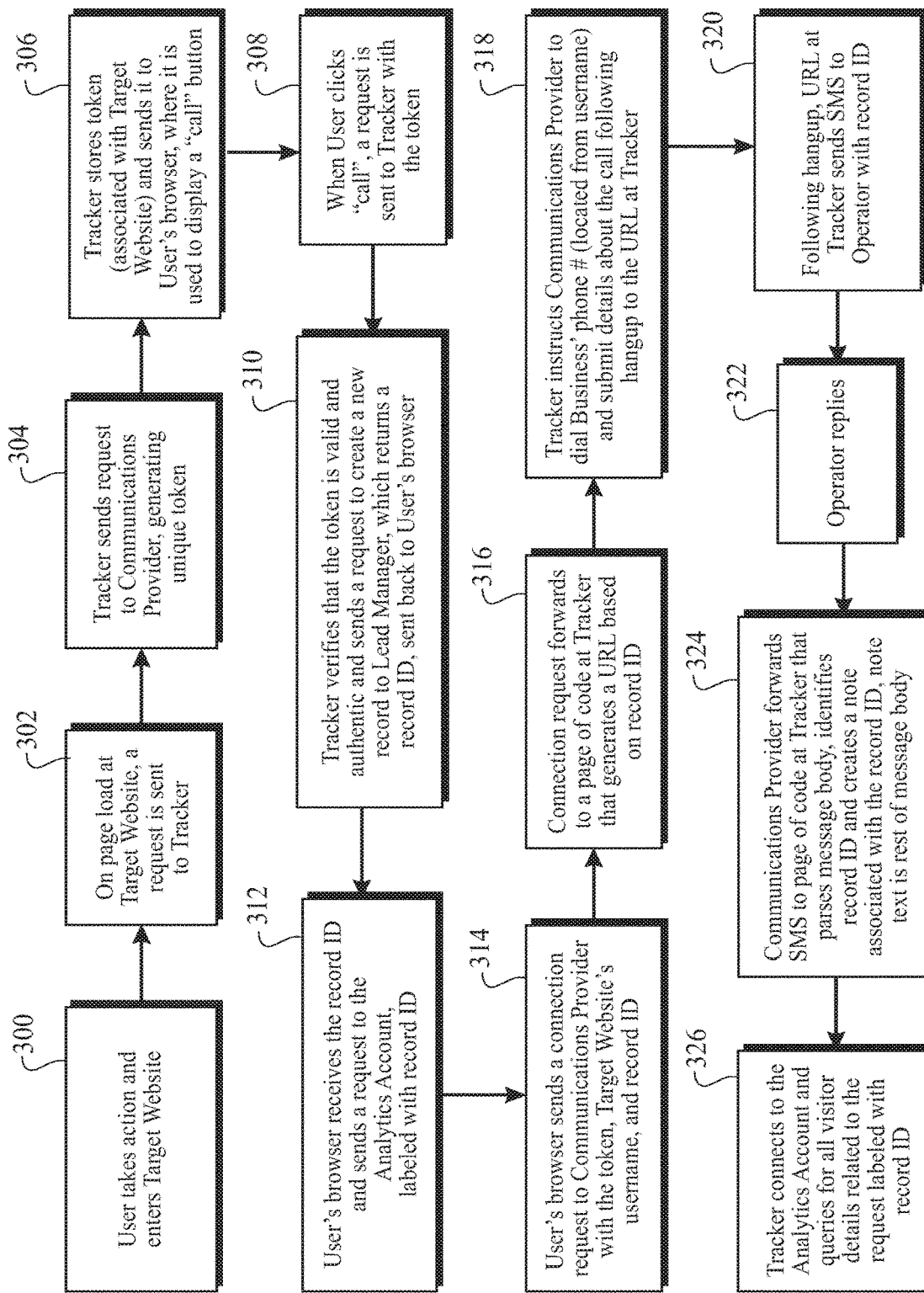
FIG. 8 presents a flowchart illustrating an embodiment of the method with multiple users, where a phone call is completed through the browser, and SMS as an alternate way of connecting the phone call content to other data.

In yet another embodiment of the technology introduced here, the method can be adapted to utilize short message service ("SMS"), also known as text messaging. SMS allows Business to associate a phone call with visitor data by communicating with Tracker via text messages. The same method can be used to send updates about a User record. This embodiment is illustrated in FIG. 8. At step 300, User executes an action that takes User to Target Website, such as clicking on an ad, clicking on a search link, or clicking on a referring link, etc. Next a request is sent to Tracker once the requested resource on Target Website has loaded by User's browser at step 302. Tracker then sends a request at step 304 to Communications Provider, which generates a unique token that is associated with Target Website. At step 306, Tracker stores the token associated with Target Website and sends it to User's browser, where it is used to display a "call" link. User then clicks the "call" link at step 308 and a request is sent to Tracker with the token associated with Target Website. At step 310, Tracker verifies that the token associated with Target Website sent by User is valid and authentic. If the token is determined to be valid and authentic, Tracker sends a "create" request to Lead Manager, which returns a record identification code. Tracker then sends this record identification code (or generate Tracker's own record ID) back to User's browser. User's browser receives the record identification code at step 312 and sends a request to the Analytics Account, such as a trackEvent request to GOOGLE ANALYTICS, labeled with the record identification code. User's browser then sends a connection request with the token, Target Website's username and the record identification code to Communications Provider at step 314. This connection request forwards to a page of code at Tracker at step 316 that generates a URL based on the record identification code. Tracker then instructs the Communications Provider at step 318 to dial Business' phone number, which is located in Tracker's database, and to submit details about the call following termination of the phone call to the URL at Tracker. Following phone call termination, the URL at Tracker instructs Communications Provider to send an SMS message to Operator with the record identification code. For example, the SMS may read, "reply with (record identification code) in beginning of SMS to add notes" at step 320. Operator then replies at step 322 to the SMS. For example, Operator may reply, "(record identification code) John Doe, JD Corp, johndoe@gmail.com, 212-555-7889, Brokerage Firm, Wants 500SF office, 3 months, Call back tomorrow to confirm appointment on Wednesday." Communications Provider forwards the SMS from Operator to a page of code at Tracker that parses the message body, separating the record identification code from the rest of the message. The code then identifies the record associated with the record identification code, and creates a note associated with the record, using the latter portion of the message—everything after the record identification code—for the note text at step 324. Finally, Tracker connects to the Analytics Account at step 326 and queries for all visitor details associated with the request labeled with the record identification code.

Figure 9:
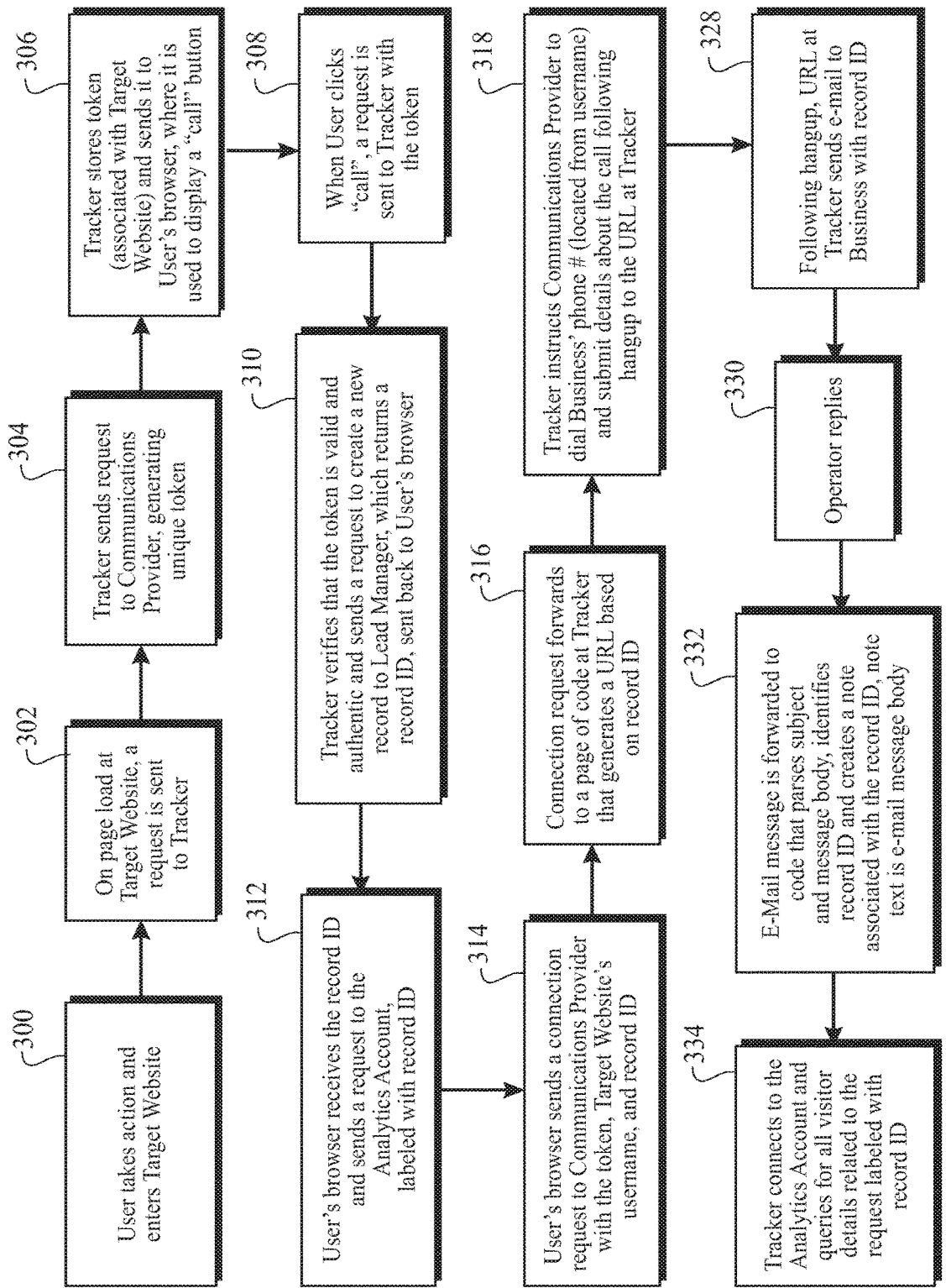
FIG. 9 presents a flowchart illustrating an embodiment of the method with multiple users, where a phone call is completed through the browser, and e-mail as an alternate way of connecting the phone call content to other data.

In yet another embodiment of the technology introduced here, the method can be adapted to utilize e-mail. Such an embodiment allows Business to associate a phone call with visitor data by communicating with Tracker via e-mail messages. The same method can be used to send updates about a User record. An example of such an embodiment is illustrated in FIG. 9. This method follows steps 300-318 as described above for FIG. 8. Following phone call termination, the URL at Tracker instructs a mail server to send an e-mail from Tracker's e-mail address to Operator with the record identification code at step 328. For example, the e-mail may say "reply with (record identification code) in subject of e-mail to add notes." Operator then replies at step 330 to the e-mail. For example, Operator may reply with message subject "(record identification code)" and body "John Doe, JD Corp, johndoe@gmail.com, 212-555-7889, Brokerage Firm, Wants 500SF office, 3 months, Call back tomorrow to confirm appointment on Wednesday." The message is sent to Scripted Inbox, which forwards all incoming messages to a page of code at Tracker that parses the message, identifies the record associated with the record identification code from the subject, and creates a note associated with the record, using the e-mail message body for the note text at step 332. Finally, Tracker connects to the Analytics Account at step 334 and queries for all visitor details associated with the request labeled with the record identification code.

Additionally, the system can be modified to enable sophisticated remarketing efforts. Specifically, Business may create remarketing lists associated with pre-specified criteria within its Analytics Account, such as event categories in GOOGLE ANALYTICS. Tracker stores the cookie values associated with the visit that triggers a phone call together with the new lead record, and uses those values to send a Remote Tracking Request to the Analytics Account at a later date, such as when Operator marks a lead record as "Converted" in Tracker's dashboard. Essentially, this allows Business to record information about leads, such as purchases, in a manner similar to e-commerce transactions, even if the actual sale occurs days, weeks or months later, and without any action taken by the lead. When the request registers, the lead's cookie information is automatically added to the pre-specified remarketing list, just as if the lead took a pre-specified action on Target Website. Using a combination of such lists, Business can then segment for targeted advertising the customers that called but never converted. An example of the details of the method is outlined in FIG. 10 for phone calls initiated through the browser, and FIG. 11 for mobile devices or softphones. The same process can be applied to contact or inquiry form submissions, as outlined in FIG. 12.

The system can be modified to include remarketing tags, which enable adding callers to lists, later used for more targeted marketing. For instance, events with different action categories can be added at different times throughout the call/sales process, e.g. when a call is initiated, a call is completed, etc. This adds the prospects to related lists, and enables targeting, for example, callers who attempted but never completed a call. Further, by storing a visitor's Tracking Cookie values, such as the _utma or _ga cookie values utilized by GOOGLE ANALYTICS, the system can also automatically add "Converted" events when Operator tags lead records as such, which in the Analytics Account would be associated with the original visits that triggered the call. Tracker may also send multiple Remote Tracking Requests throughout the phone call. These may be in response to notifications from Communications Provider. For instance, Tracker may send a "Dialed" event when receiving from Communications Provider the extension and identifying the call record ID. Tracker may also send a "Connected" event when receiving a notification that a call has connected to Operator, whether through Operator's actions or a system at Capable Entity. This would allow Business to segment for advertising callers that hung up before connecting to Operator, and/or connect online behavior patterns to abandoned calls, for instance.

Figure 10:
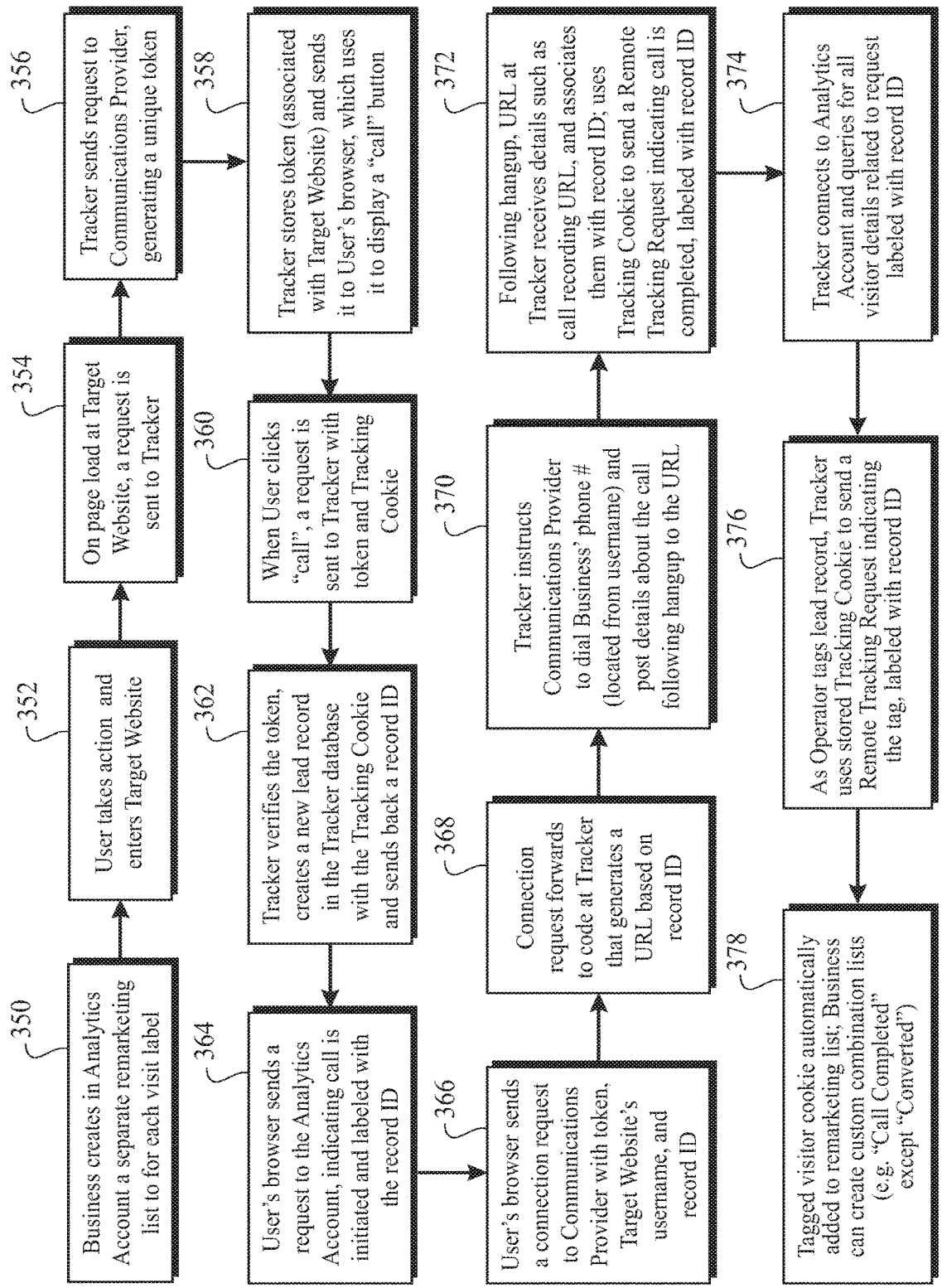
FIG. 10 presents a flowchart illustrating an embodiment of the method with multiple users, where a phone call is completed through the browser, and enabling adjustment of follow-on advertising based on caller behavior on the phone call and thereafter.

An embodiment of this method is illustrated in FIG. 10. At step 350, Business creates in the Analytics Account a separate remarketing list for each request type, for example, a separate remarketing list for each event category in GOOGLE ANALYTICS. User executes an action at step 352 that takes User to Target Website, such as clicking on an ad, clicking on a search link, or clicking on a referring link, etc. Next a request is sent to a Tracker once Target Website has loaded at step 354. Tracker then sends a request at step 356 to Communications Provider, which generates a unique token that is associated with Target Website. At step 358, Tracker stores the token associated with Target Website and sends it to User's browser, where it is used to display a "call" link or button. User then clicks the "call" link at step 360 and a request is sent to Tracker with the token associated with Target Website and the Tracking Cookie values. At step 362, Tracker verifies that the token associated with Target Website sent by User is valid and authentic. If the token is determined to be valid and authentic, Tracker creates a new lead record in Tracker's database and stores the Tracking Cookie values. Tracker then sends the new record's identification code back to User's browser. User's browser receives the record identification code at step 364 and sends a request to the Analytics Account, such as a trackEvent request to GOOGLE ANALYTICS categorized "Call Initiated" and labeled with the record identification code. User's browser then sends a connection request with the token, Target Website's username and the record identification code to Communications Provider at step 366. This connection request forwards to a page of code at Tracker at step 368 that generates a URL based on the record identification code. The code instructs the Communications Provider at step 370 to dial Business' phone number, which is located in Tracker's database, and to submit details about the call following termination of the phone call to the URL at Tracker. Following phone call termination, the URL at Tracker receives details such as call recording URL and associates them with the record identification code. Tracker then uses the stored Tracking Cookie values to send a Remote Tracking Request to the Analytics Account, labeled with the record identification code, at step 372. For example, Tracker may send as a server-side trackEvent request to GOOGLE ANALYTICS, categorized "Call Completed" and labeled with the record identification code. Note that the request at step 364 may alternatively occur as a server-side request, by collecting the Tracking Cookie value and sending it to Tracker along with the token. Tracker then connects to the Analytics Account at step 374 and queries for all visitor details related to the request labeled with the record identification code. When Operator later tags the lead record "Converted" in the Tracker dashboard, Tracker uses the stored Tracking Cookie to send another Remote Tracking Request at step 376, which may be labeled with the record identification code. For example, Tracker may send a server-side trackEvent request to GOOGLE ANALYTICS, categorized "Converted" and labeled with the record identification code. As with each of the previous tracking requests, this causes the visitor cookie to automatically be added to the associated remarketing list, at step 378. Using these lists, Business may then create new lists with custom combinations, e.g. "Call Completed" but not "Converted."

Figure 4:
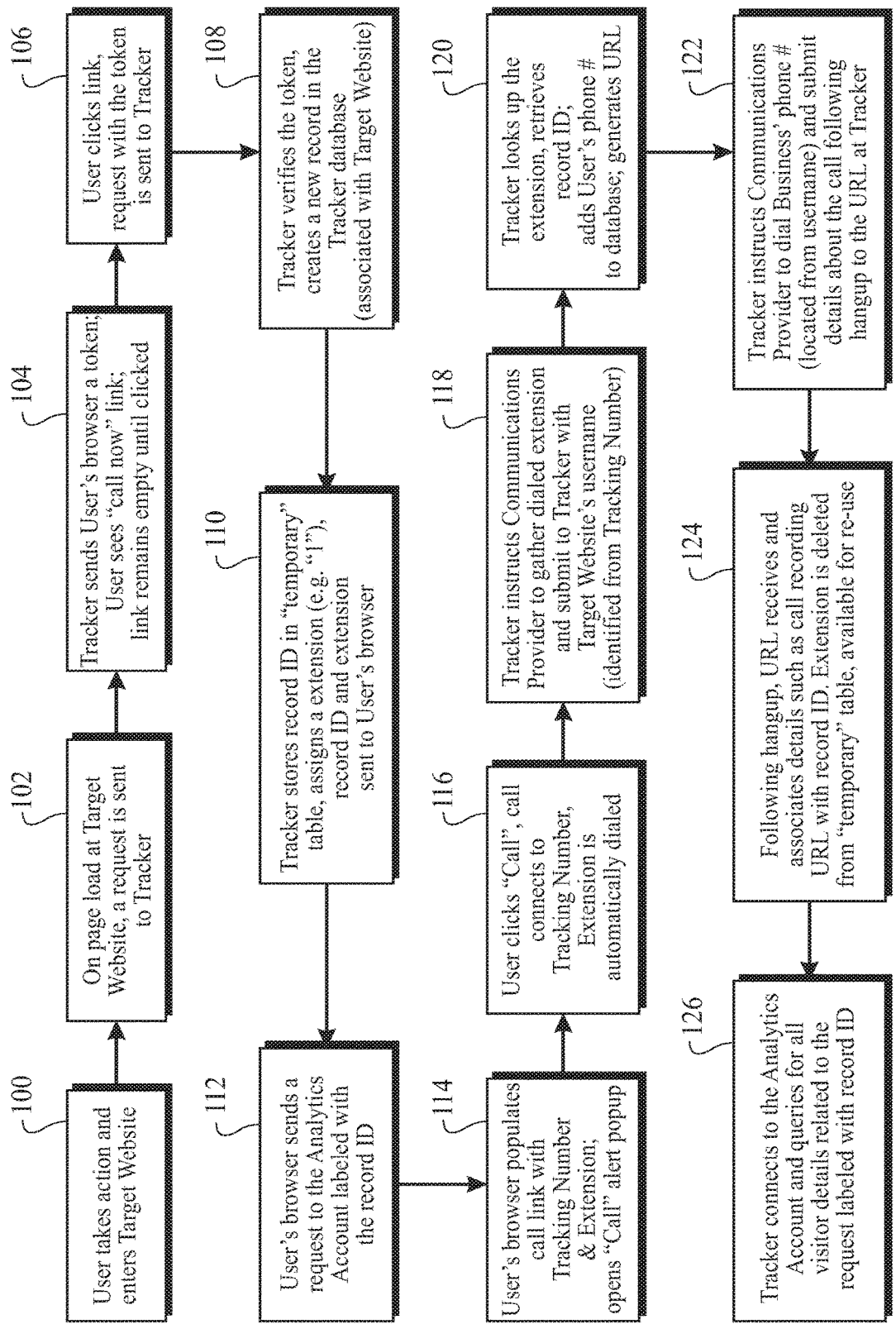
FIG. 4 presents a flowchart illustrating an embodiment of the method with multiple users, where a phone call is completed through a mobile device or softphone, and call recording is enabled.
Figure 11:
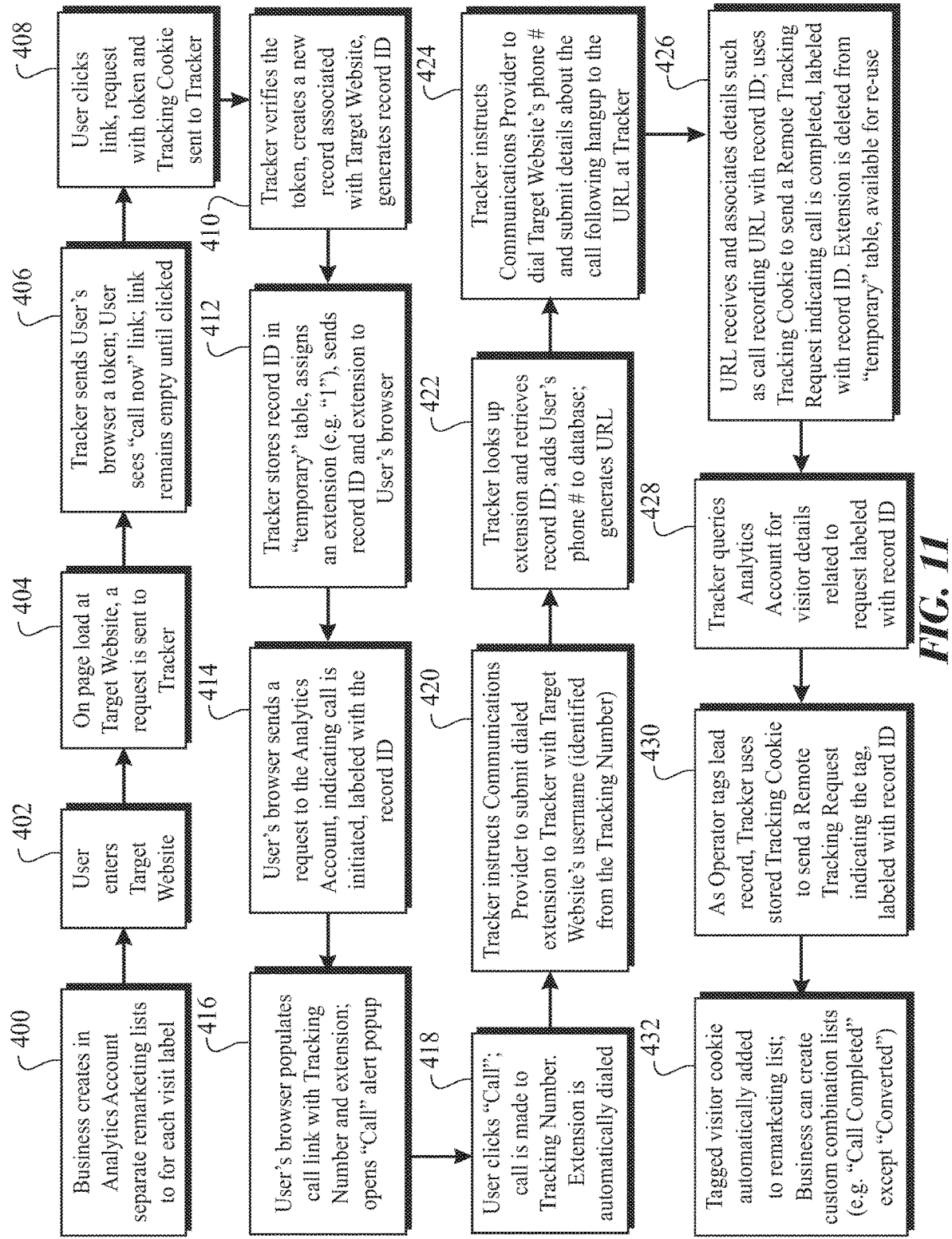
FIG. 11 presents a flowchart illustrating an embodiment of the method with multiple users, where a phone call is completed through a mobile device or softphone, and enabling adjustment of follow-on advertising based on caller behavior on the phone call and thereafter.

The remarketing method can also be adapted to the mobile devices tracking methodology as illustrated in FIG. 4. In this method Business maintains a Tracking Number. An embodiment of the technology introduced here is illustrated in FIG. 11. At step 400, Business creates in the Analytics Account separate remarketing lists for each request type, such as remarketing lists for each event category in GOOGLE ANALYTICS. User executes an action at step 402 that takes User to Target Website, such as clicking on an ad, clicking on a search link, or clicking on a referring link, etc. Next, a request is sent to Tracker once Target Website has loaded at step 404. Tracker sends User's browser a token at step 406, which is visible to User as a "call now" link. This "call now" link remains empty—there is no phone number associated with it—until User clicks the link. User clicks the "call now" link at step 408 and a request is sent to Tracker along with the token and Tracking Cookie value. Tracker verifies that the token is valid and authentic at step 410. If Tracker determines that the token is valid and authentic, Tracker creates a new lead record associated with Target Website and a record identification code in Tracker's database, and stores the Tracking Cookie value. If the token is determined not to be valid and authentic, Tracker will ignore the request, since the request is not associated with an actual visit to the website. If the token is valid and authentic, in step 412 Tracker stores the record identification code in Target Website's temporary table and assigns to it an extension, which can be a single-digit such as "1." The record identification code, Tracking Number, and the extension are then sent to User's browser. User's browser receives the record identification code at step 414, and sends a request to the Analytics Account labeled with the record identification code. For example, the browser may send a trackEvent request to GOOGLE ANALYTICS, categorized "Call Initiated" and labeled with the record identification code. User's browser populates the "call now" link with the Tracking Number and extension at step 416. A call alert then opens in a pop-up window in User's browser with the Tracking Number. The User clicks "call" at step 418 and the call is placed to the Tracking Number, with the extension being automatically dialed. The call forwards to a page of code at Tracker that gathers the dialed extension at step 420 and submits it to a second page of code at Tracker, along with Target Website's username, which is identified by the Tracking Number. At step 422, the second page of code searches Tracker's database, specifically Target Website's temporary table, for the extension, retrieves the record identification code, adds User's phone number to the database, and generates a URL based on the record identification code. The code then instructs Communications Provider to dial Business' real phone number, which is located from the Target Website's username, at step 424, and submit details about the call following termination of the phone call to the URL at Tracker. Following hang-up at step 426, the URL at Tracker receives details such as call recording URL, and associates them with the record identification code. Tracker then uses the stored Tracking Cookie values to send a Remote Tracking Request, which may be labeled with the record identification code. For example, Tracker may send a server-side trackEvent request categorized "Call Completed" and labeled with the record identification code, to GOOGLE ANALYTICS. Then the record and extension may be deleted from the temporary table, and the extension is available for re-use by the system (e.g., for another User). At step 428, Tracker connects to the Analytics Account, and queries for all visitor details related to the request labeled with the record identification code. When Operator later tags the lead record "Converted" in the Tracker dashboard, Tracker uses the stored Tracking Cookie to send a Remote Tracking Request at step 430, such as a server-side trackEvent request categorized "Converted" and labeled with the record identification code in GOOGLE ANALYTICS. This causes the visitor cookie to automatically be added to the remarketing list at step 432. Using these lists, Business may create new lists with custom combination, e.g. "Call Completed" but not "Converted."

Figure 12:
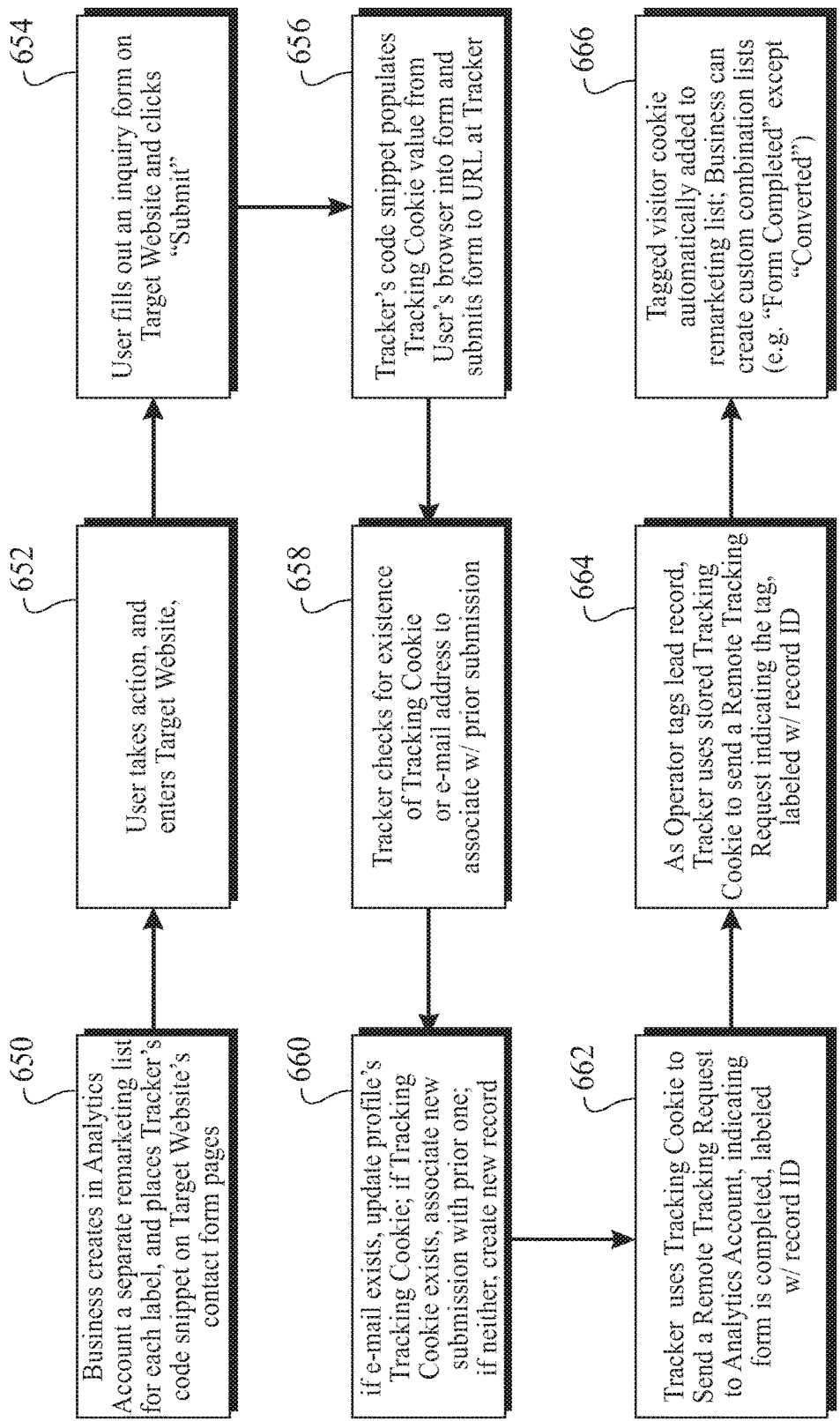
FIG. 12 presents a flowchart illustrating an embodiment of the method with multiple users, enabling adjustment of follow-on advertising based on a visitor's form submission.

The remarketing method described above in FIGS. 10 and 11 may also be adapted to contact form submissions as illustrated in FIG. 12. FIG. 12 illustrates such an embodiment. At step 650, Business creates in the Analytics Account a separate remarketing list for each request type, such as separate remarketing lists for each event category in GOOGLE ANALYTICS. Business also places a Tracker code snippet on Target Website's contact form pages. User executes an action at step 652 that takes User to Target Website, such as clicking on an ad, clicking on a search link, or clicking on a referring link, etc. User then fills out an inquiry form on Target Website and clicks a "submit" button at step 654. Tracker's code snippet populates the Tracking Cookie values from User's browser into the form and submits the form to a URL at Tracker at step 656. Tracker then checks for the existence of either identical Tracking Cookie values or e-mail address at step 658 to associate either with a prior submission by User. If the e-mails exist, Tracker updates the profile's Tracking Cookie values at step 660. If the Tracking Cookie value exists, Tracker associates the new submission with prior submission(s) also at step 660. Tracker then uses the existing record identification code. If neither the e-mail nor a Tracking Cookie value exists, Tracker creates a new record at step 660, generating a record identification code. Tracker then uses the Tracking Cookie to send a Remote Tracking Request to the Analytics Account, such as a server-side trackEvent request to GOOGLE ANALYTICS, categorized "Form Completed" and labeled with the record identification code. When Operator later tags a lead record "Converted," Tracker uses the Tracking Cookie to send a Remote Tracking Request, such as a server-side trackEvent request categorized "Converted" and labeled with the record identification code to GOOGLE ANALYTICS, at step 664. In step 666, this causes the visitor cookie to automatically be added to the remarketing list set up by Business. Using these lists, Business may then create new lists with custom combinations, such as "Form Completed" but not "Converted."

The remarketing method can be adapted to work with any Lead Manager. This may be done by creating a custom field for each lead record that stores the Tracking Cookie, along with a custom "Status" field that, when changed, will trigger Tracker to send to the Analytics Account a Remote Tracking Request. Alternatively, Tracker can query the external leads system in regular intervals (e.g., hourly or daily) and send a Remote Tracking Request for any updated or newly tagged records. Moreover, the method can be adapted to track information on attributes other than a lead's conversion status that Business may possess, such as indicated interests in a specific service category or demographic information. Furthermore, the method can be adapted to other types of user lists that involve a recordable action taken on a website, such as newsletter signups. Thus, Business may choose to track and create specialized advertising for leads that sign up for a sports newsletter and indicate a specific interest in soccer, using lists from its e-mail marketing software, such as MAILCHIMP. The method can also be adapted to record offline actions taken by leads, such as a meeting with Business. In all of these cases, sending the data to any external account, such as an Analytics Account or an Advertising Account, may assist in adjusting follow-on advertising, or simply facilitate Business' efforts in analyzing how online behavior correlates with offline activity.

The method can also be used for other purposes. For instance, when User revisits Target Website, Target Website can collect User's Tracking Cookie and send it to Tracker. Tracker would then search its database for a match, and communicate to Target Website information about User's previous calling activity, as well as any applied tags, sales, and other pertinent data. Target Website may then utilize the information as needed, whether to adjust content, communicate activity to other systems, and the like.

Note also that although the Remote Tracking Requests method is described here with systems that track phone calls using a single phone number, the same method can be deployed with systems that utilize multiple tracking numbers. Thus, Tracker may simply generate an ID to correspond to a phone number displayed on User's screen (rather than corresponding to the extension), and use the dialed phone number to associate the call details with said records. The remaining steps would be similar or identical to the method described above.

Furthermore, the method can also be adapted to an automated scenario that does not require direct user intervention in order to record information about callers. This would typically involve additional systems. For instance, using voice recognition technology, the method may automatically detect a caller's expressed interest in a specific product or service, and create and send tags based on this information. Alternatively, using machine learning or other algorithms, Tracker may automatically read information entered by Operator in a lead record, and create and send tags based on this information.

The system can be further adapted to record phone calls as conversions in an Advertising Account; the details differ depending on a visitor's device (FIGS. 12 through 14), as described below. Further, the phone extension codes can also be utilized in recording phone calls resulting from offline sources, such as magazine ads, by designating specific extensions for each ad, which would be printed in the ad graphics or incorporated into a Quick Response (QR) code. These extensions and associated ads can be saved in a separate database table. The system will exclude these "reserved" extensions from usage when recording online conversions, and compare any dialed extension against this table (in addition to the temporary table) to determine the call source. Note that this feature primarily applies to devices capable of scanning a QR code, such as mobile devices, since the phone calls are not generated through User's browser.

The system may be modified to record phone calls as conversions in Advertising Accounts by recording the corresponding Tracking Cookie, such as the globally unique tracking parameter or GOOGLE Click Identifier ("gclid") associated with GOOGLE ADWORDS. With GOOGLE ADWORDS, recording the gclid parameter enables the system to generate a MICROSOFT EXCEL, or similar spreadsheet software, file that can be imported as offline conversions into the GOOGLE ADWORDS account. In addition, the system can filter any records where Operator did not record additional data about the lead, which helps avoid counting failed phone connections. Also, prior to generating the file, Operator can manually delete within the system any phone records that do not qualify as conversions, such as sales calls or irrelevant opportunities. One such embodiment is illustrated in FIG. 13.

Figure 13:
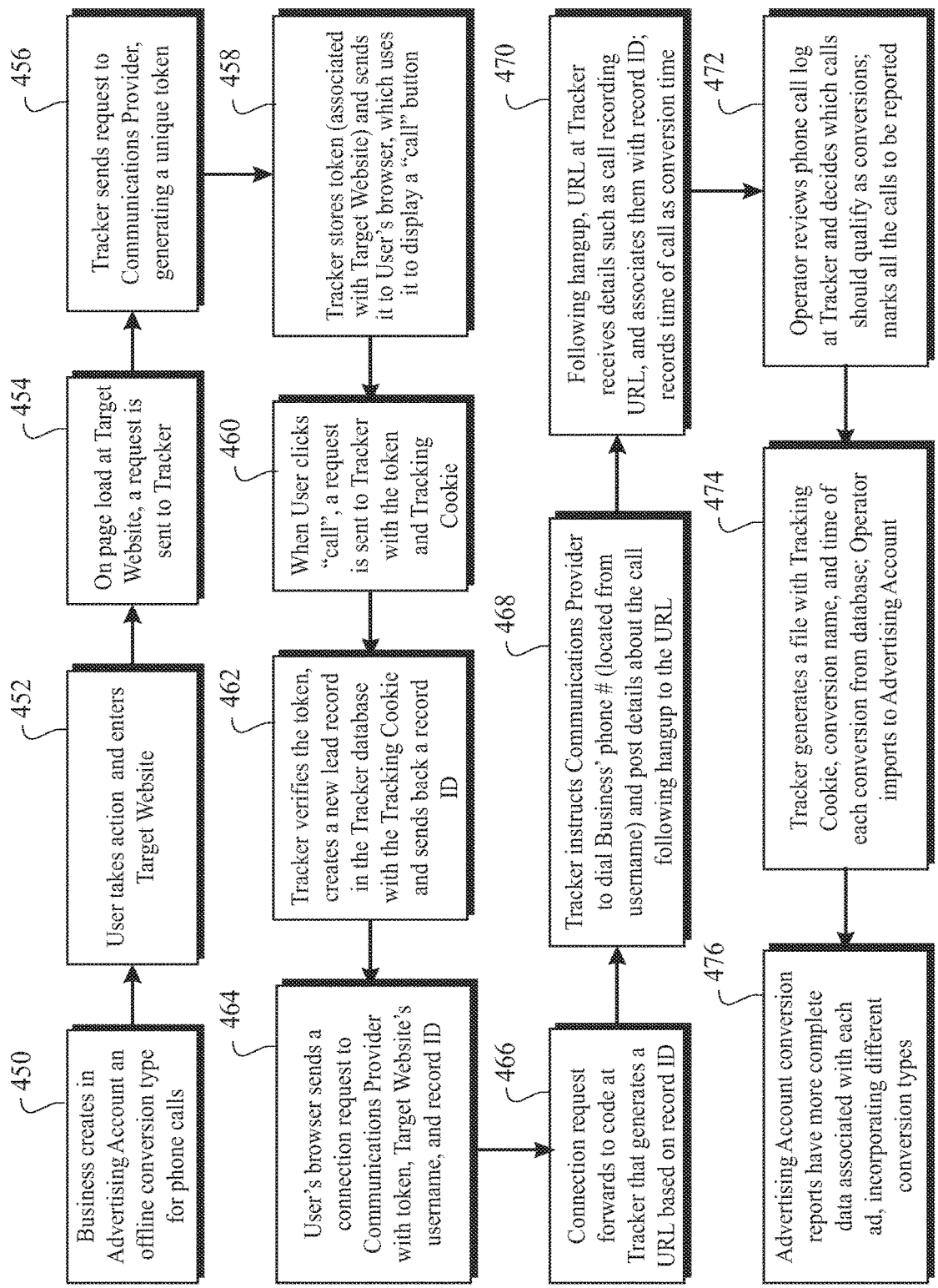
FIG. 13 presents a flowchart illustrating an embodiment of the method with multiple users, where a phone call is completed through the browser, and importing of call data to a remote system, such as an advertising platform.

At step 450 in FIG. 13, Business creates in Advertising Account a conversion for phone calls, such as an offline conversion type named "Phone Call" in GOOGLE ADWORDS. User executes an action at step 452 that takes User to Target Website, such as clicking on an ad, clicking on a search link, or clicking on a referring link, etc. Next at step 454 a request is sent to a Tracker once Target Website has been loaded by User's browser. Tracker then sends a request at step 456 to Communications Provider, which in turn generates a unique token that is associated with Target Website. At step 458, Tracker stores the token associated with Target Website and sends it to User's browser, where it is used to display a "call" link or button. User then clicks the "call" link at step 460 and a request is sent to Tracker with the token associated with Target Website and the Tracking Cookie. At step 462, Tracker then verifies that the token associated with Target Website sent by User is valid and authentic. If the token is determined to be valid and authentic, Tracker creates a new lead record in Tracker's leads database, stores the Tracking Cookie, and sends back a record identification code to User's browser. User's browser sends a connection request to Communications Provider at step 464 with the token, Target Website's username, and the record identification code. This connection request forwards to a page of code at Tracker at step 466 that generates a URL based on the record identification code. The page of code instructs the Communications Provider at step 468 to dial Business' phone number, which is located in Tracker's database, and to submit details about the call following termination of the phone call to the URL at Tracker. Following phone call termination, the URL at Tracker receives details at step 470, such as call recording URL, associates them with the record identification code, and records the time of call as conversion time. Operator reviews the phone call log at step 472, decides which calls should qualify as conversions, and marks all the calls to be reported. At step 474, Tracker generates a file that can be imported into the Advertising Account. In the case of GOOGLE ADWORDS, this may be an EXCEL file with the gclid, conversion name (e.g., "Phone Call") and time of each conversion from the database. Operator then imports the file into the Advertising Account, such as "offline conversions" in GOOGLE ADWORDS. This methodology results in step 476, with Advertising Account conversion reports having more complete data associated with each ad, incorporating different conversion types.

Figure 14:
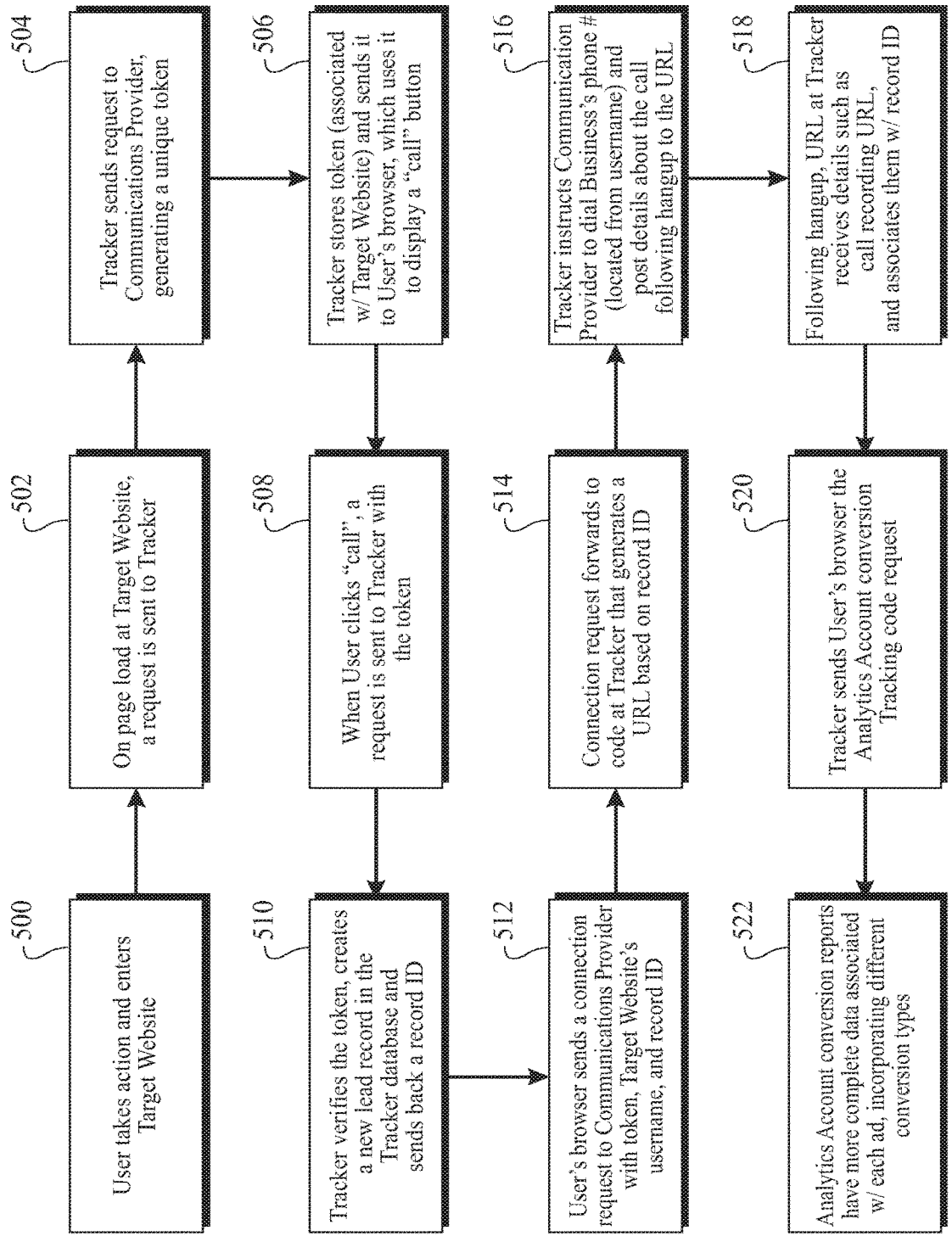
FIG. 14 presents a flowchart illustrating an embodiment of the method with multiple users, where a phone call is completed through the browser, and automatically sending notifications about call data to a remote system, such as an advertising platform.

A simpler method than the one presented in FIG. 13 is illustrated in FIG. 14. This simpler method involves sending the Advertising Account tracking code to User's browser upon completion of the phone call. This method is less accurate, since User may close the browser before tracking is recorded. Also, this method records all phone calls automatically, which does not provide the flexibility of filtering some conversions. An example of such an embodiment is illustrated in FIG. 14. At step 500, User executes an action that takes User to Target Website, such as clicking on an ad, clicking on a search link, or clicking on a referring link, etc. Next a request is sent to a Tracker once Target Website has loaded at step 502. Tracker then sends a request at step 504 to Communications Provider, which in turn generates a unique token that is associated with Target Website. At step 506, Tracker stores the token associated with Target Website and sends it to User's browser, where it is used to display a "call" link or button. User then clicks the "call" link at step 508 and a request is sent to Tracker with the token associated with Target Website. At step 510, Tracker verifies that the token associated with Target Website sent by User is valid and authentic. If the token is determined to be valid and authentic, Tracker creates a new lead record in Tracker's leads database and sends back a record identification code to User's browser. User's browser sends a connection request to Communications Provider at step 512 with the token, Target Website name, and the record identification code. This connection request forwards to a page of code at Tracker at step 514 that generates a URL based on the record identification code. The page of code instructs Communications Provider at step 516 to dial Business' phone number, which is located in Tracker's database and to submit details about the call following termination of the phone call to the URL at Tracker. Following phone call termination, the URL at Tracker receives details at step 518, such as call recording URL, and associates them with the record identification code. Tracker then sends User the Advertising Account tracking code request at step 520, or simulates the request from the Tracker server. This methodology results in step 522, with Advertising Account conversion reports having more complete data associated with each ad, incorporating different conversion types.

Figure 15:
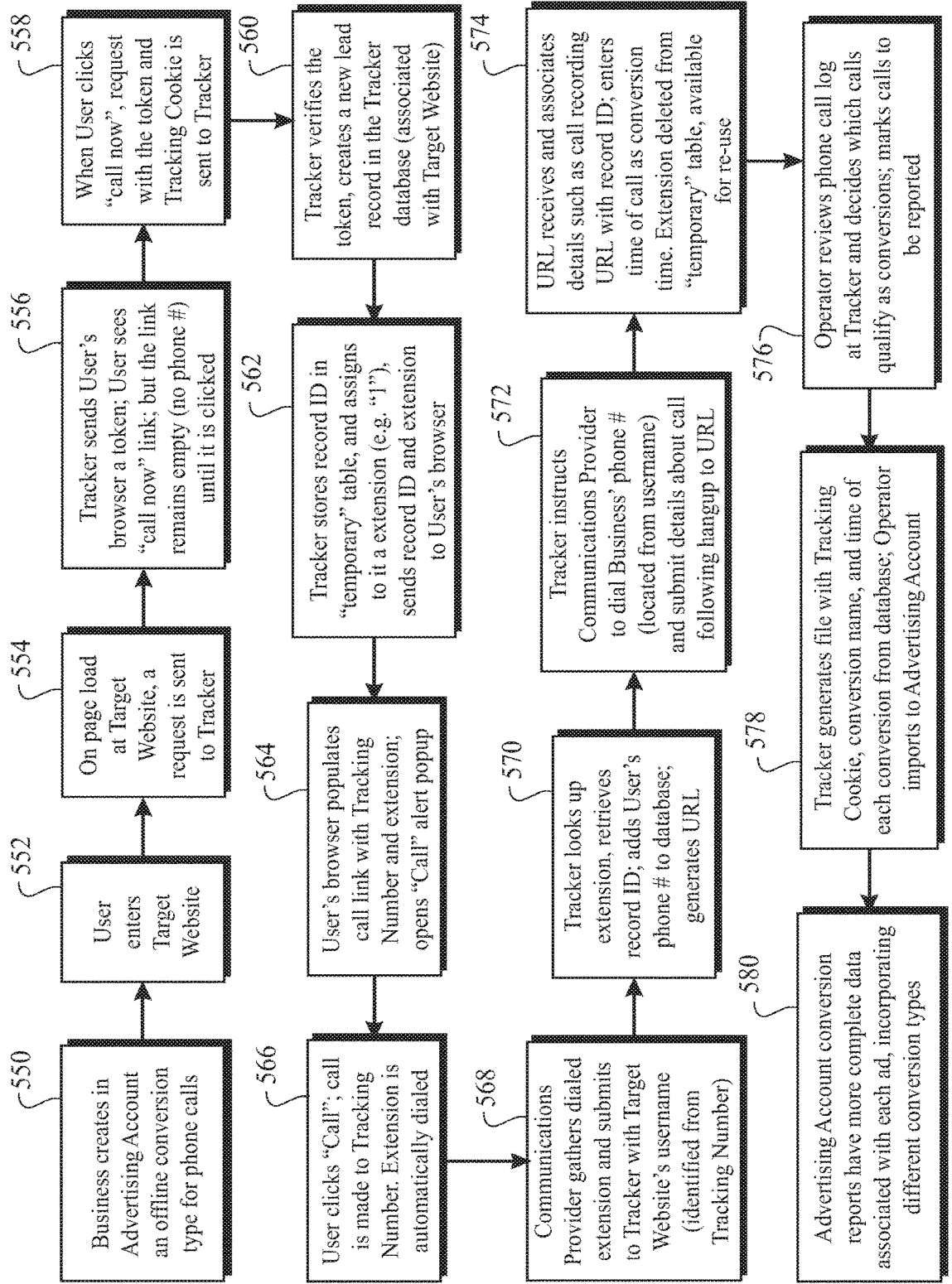
FIG. 15 presents a flowchart illustrating an embodiment of the method with multiple users, where a phone call is completed through a mobile device or softphone, and importing of call data to a remote system, such as an advertising platform.

The Advertising Account conversions feature can also be adapted to the mobile tracking methodology described in FIG. 4 above. This method requires Business to maintain a Tracking Number. An example of such an embodiment is illustrated in FIG. 15. At step 550, Business creates in Advertising Account a conversion for phone calls, such as an offline conversion type named "Phone Call" in GOOGLE ADWORDS. User executes an action at step 552 that takes User to Target Website, such as clicking on an ad, clicking on a search link, or clicking on a referring link, etc. Next, a request is sent to a Tracker once Target Website has loaded at step 554. Tracker then sends User's browser a token at step 556, which is visible to User as a "call now" link. This "call now" link remains empty—i.e., there is no phone number associated with it—until after User clicks the link. User clicks the "call now" link at step 558 and a request is sent to Tracker along with the token and Tracking Cookie. Tracker verifies that the token is valid and authentic at step 560. If Tracker determines that the token is valid and authentic, it creates a new lead record associated with Target Website with a record identification code in Tracker's database and stores the Tracking Cookie value. If the token is valid and authentic, in step 562 Tracker stores the record identification code in a temporary table and assigns to it an extension, such as a single-digit like "1." The record identification code, Tracking Number, and the extension are then sent to User's browser. User's browser populates the "call now" link with the Tracking Number and extension at step 564. A call alert then opens in a pop-up window on User's browser with the Tracking Number. User clicks "call" at step 566 and the call is placed to the Tracking Number, with the extension being automatically dialed. The call forwards to a page of code at Tracker that gathers the dialed extension at step 568 and submits it to a second page of code at Tracker along with Target Website's username, which is identified by the Tracking Number. At step 570, the second page of code looks into Tracker's database, specifically at Target Website's temporary table, for the extension, retrieves the record identification code, adds User's phone number to the database, and generates a URL based on the record identification code. The code then instructs Communications Provider to dial Business' phone number, which is located from the Target Website's username, at step 572, and to submit details about the call following termination of the phone call to the URL at Tracker. Following hang-up at step 574, the URL at Tracker receives details such as call recording URL, associates them with the record identification code, and records the time of call as conversion time. The record and extension are then deleted from the temporary table, and the extension is available for re-use by the system. Operator reviews the phone call log at step 576, decides which calls should qualify as conversions, and marks all the calls to be reported. At step 578, Tracker generates a file that can be imported to the Advertising Account, such as an Excel file for GOOGLE ADWORDS with the gclid, conversion name "Phone Call," and time of each conversion from the database. Business imports the file into its Advertising Account, for example, as "offline conversions" in GOOGLE ADWORDS. This methodology results in step 580, with the Advertising Account conversion reports having more complete data associated with each ad, incorporating different conversion types.

Further to the description of FIGS. 12 through 14, when displaying the sources of visits associated with phone calls and/or contact form submissions, Tracker may aggregate identical ads to provide a more insightful performance report. Specifically, Tracker queries the Advertising Account periodically, obtaining the ads' content and targeting metrics. These are matched against Tracker's existing information. Within Tracker's database, IDs of multiple ads with identical content and targeting metrics are given a single master ad ID, stored together with the ad content and targeting metrics. When Tracker retrieves visitor source information from external systems, each form submission or phone call record is associated with the master ad ID of the ad ID that was clicked (rather than the ad ID itself). A similar process is performed on the search queries entered by User that triggered the ad impressions: the system maintains a "phrases" table with an ID assigned to each phrase, and attempts to match new search queries obtained from the analytics system against these existing values. If a phrase matches an existing record, the existing phrase ID is associated with the record; otherwise, a new phrase record and ID are created. In addition to reducing duplication, pairing this indexing of ads and keywords with User tags helps discover revealing patterns, e.g. the ad-keyword combinations that are most likely to generate sales.

This method can also be adapted to a situation where the website visitor requests a call from Business. This method works with any device. In this case, User enters his phone number in a form at Target Website and clicks "Call Me". The form is posted to a server operated by Tracker that verifies the request is authentic, creates a new record in its database, sends a Remote Tracking Request labeled with the new record ID to the Analytics Account, generates a series of URLs based on the record ID, and initiates a call to the number entered by User. When User answers the phone, the call is forwarded to a page of code at Tracker that initiates a call to Operator while placing User's call in a queue labeled with the record ID. When Operator answers the phone, the Operator's call is forwarded to a page of code at Tracker that de-queues User's call, connecting the two parties. Following hang-up, details about call are posted to the URL, and are thus associated with the new record ID in the database; the Analytics Account is then queried for details associated with the record ID.

Figure 16:
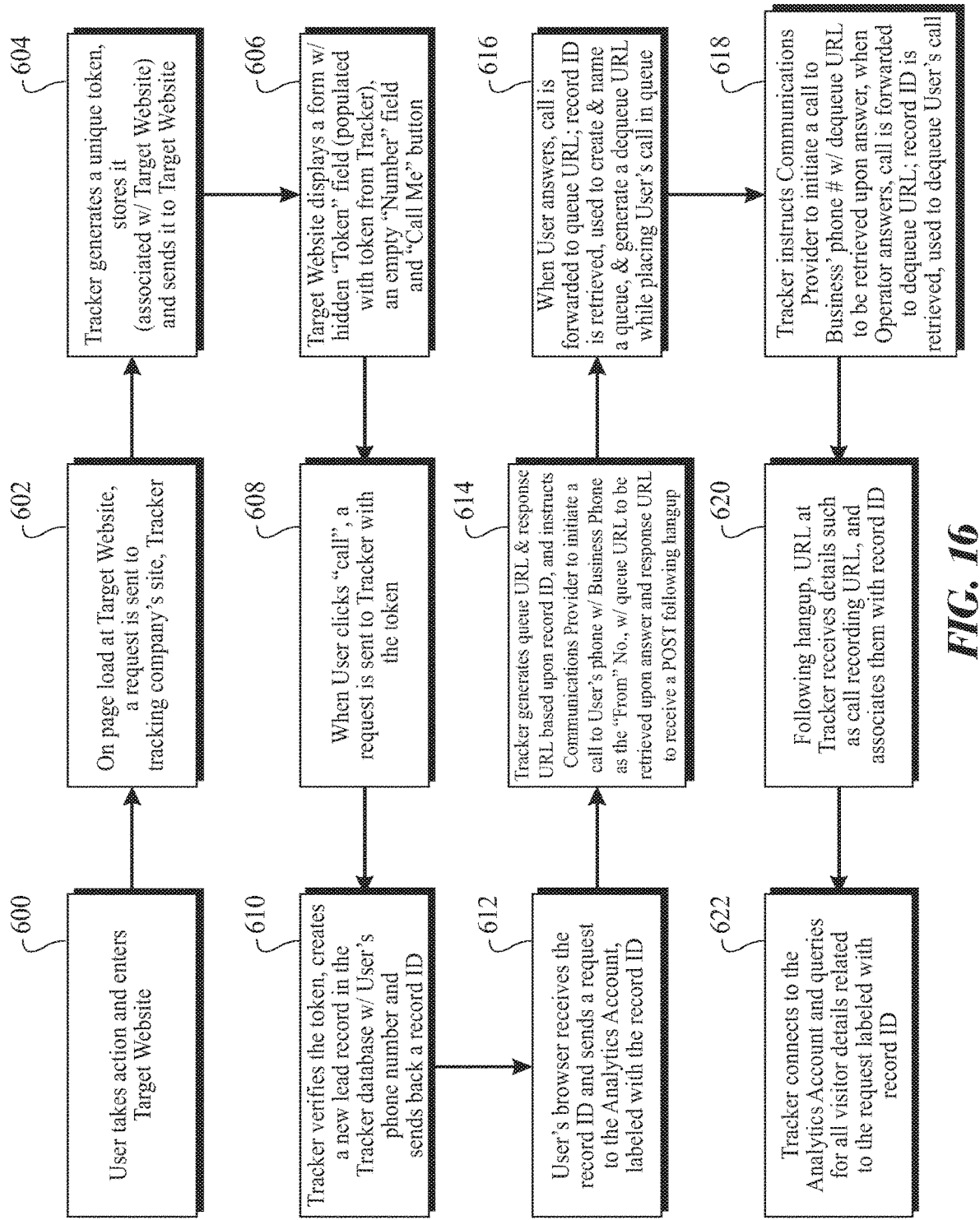
FIG. 16 presents a flowchart illustrating an embodiment of the method with multiple users, where a phone call connection is initiated in response to a form submission, and call recording is enabled.

An example of this embodiment is illustrated in FIG. 16. User executes an action at step 600 that takes User to Target Website, such as clicking on an ad, clicking on a search link, or clicking on a referring link, etc. Next, a request is sent to a Tracker once Target Website has loaded at step 602. Tracker then generates a unique token, stores it as associated with Target Website and sends it to Target Website at step 604. Target Website then displays a form with a hidden "token" field, which is populated with the token from Tracker, an empty "number" field, and a "call me" button. User enters his phone number and clicks the "call me" button at step 608, and the form is posted to Tracker. Tracker verifies that the token is valid and authentic at step 610. If Tracker determines that the token is valid and authentic, it creates a new lead record with User's phone number in Tracker database and sends back a record identification code. User's browser then receives the record identification code at step 612 and sends a request to the Analytics Account labeled with the record identification code, such as a trackEvent request to GOOGLE ANALYTICS labeled with the record identification code. Tracker then generates a queue URL and response URL based on the record identification code at step 614, and instructs Communications Provider to initiate a call to User's phone number with the Business' phone as the "from" number. When User answers, the queue URL is retrieved. The response URL receives a form POST following phone call termination. When User answers at step 616, the call is forwarded to the queue URL, and the record identification code is retrieved and used to create and name a queue, as well as to generate a de-queue URL while placing User's call in the said queue. The code then instructs Communications Provider to initiate a call to Operator at step 618, with the de-queue URL to be retrieved upon answer. When Operator answers, Operator's call is forwarded to the de-queue URL, and the record identification code is retrieved and used to de-queue User's call. Following phone call termination at step 620, the response URL at Tracker receives details such as call recording URL, and associates them with the record identification code. Lastly, Tracker connects to the Analytics Account and queries for all visitor details related to the request labeled with the record identification code.

Figure 17:
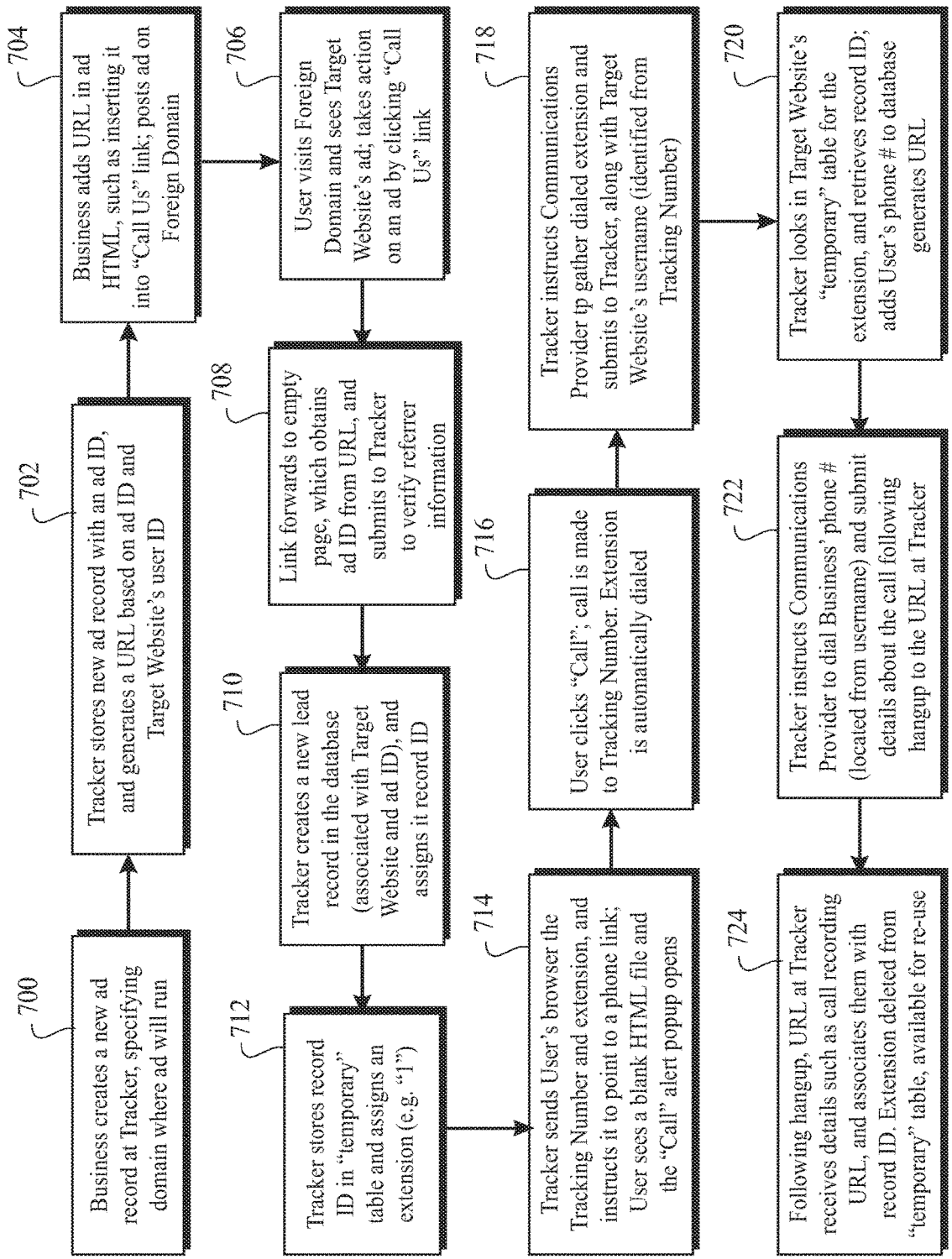
FIG. 17 presents a flowchart illustrating an embodiment of the method with multiple users, where a phone call originates in network content other than a business' website, the call being completed through a mobile device or softphone, and call recording is enabled.

Yet another embodiment enables tracking mobile phone calls that originate on Foreign Domain. An example of such an embodiment is illustrated in FIG. 17. This method is useful for analyzing activity from off-site marketing properties, by tracking phone calls originating in clicks on an ad placed in Foreign Domain, such as classifieds websites (e.g. Craigslist). Business creates a new ad record in a central database operated by Tracker at step 700, specifying the domain name on which the ad will run, e.g. craigslist.org. Tracker stores each ad at step 702, which has a record/ad ID with a corresponding URL that points to a web-page. The URL is based on the ad ID and Target Website's username. Business adds the URL in the ad HTML, such as inserting it into a "Call Us" link within the ad, and posts the ad on Foreign Domain, such as craigslist.org, at step 704. User visits the third party website, sees the ad, and takes action by clicking the "Call Us" link at step 706. The URL opens, and a JAVASCRIPT snippet intercepts the ad ID and Target Website's username. After verifying that the referrer information matches the domain entered by Business at step 708, a request with the ad ID and Target Website's username is sent to Tracker, which creates a new lead record associated with the ad ID and Target Website; the record is assigned a record identification number at step 710. Tracker then stores the identification code at step 712 in a temporary table, and assigns to it an extension, usually a single-digit, e.g. "1." Tracker sends to User's browser the Tracking Number and extension, and instructs User's browser to point to the Tracking Number, for example, using a "window.location=tel:" JAVASCRIPT command at step 714. User sees a blank page with a "Call" prompt.

When User clicks the button at step 706, Foreign Domain may also decide to forward to Tracker details related to the call, caller, or network-based content, which Tracker may store, communicate back to Foreign Domain, or otherwise process. For instance, if Foreign Domain is a local directory listings site, such as YELP, it may forward the listing category. At the end of the call, Tracker may communicate back to Foreign Domain, or any other external system, such as the Analytics Account, a confirmation that a call has been placed to the listing category. Tracker may also use this information to automatically apply tags to the call record.

After User clicks "Call", the call forwards to a page of code at Tracker that gathers the extension, which may be automatically dialed at step 716. The code submits the extension to a second page of code at Tracker, along with Target Website's username, which is identified by the dialed Tracking Number, at step 718. The second page of code looks into Tracker's database, specifically at Business' temporary table, for the extension, retrieves the record identification code, adds User's phone number to the database at step 720, and generates a URL based on the record identification code. At step 722, Tracker instructs Communications Provider to dial Business' real phone number, which is located from Target Website's username, and to submit details about the call following termination of the call to the URL at Tracker. Following phone call termination at step 724, the URL at Tracker receives a form POST with details about the call such as call recording URL, and associates them with the record identification code. The record and the extension are then deleted from the temporary table, and the extension is available for re-use. Tracker may also initiate a Remote Tracking Request to the Analytics Account, indicating that a phone call from Foreign Domain has occurred. Alternatively, Business may generate a QR code that points to the URL, and feature it on a print advertisement. When scanned with a mobile device, User's browser would be automatically redirected to the URL, creating a "scan-to-call" functionality otherwise identical to the "click-to-call" outlined above.

Figure 18:
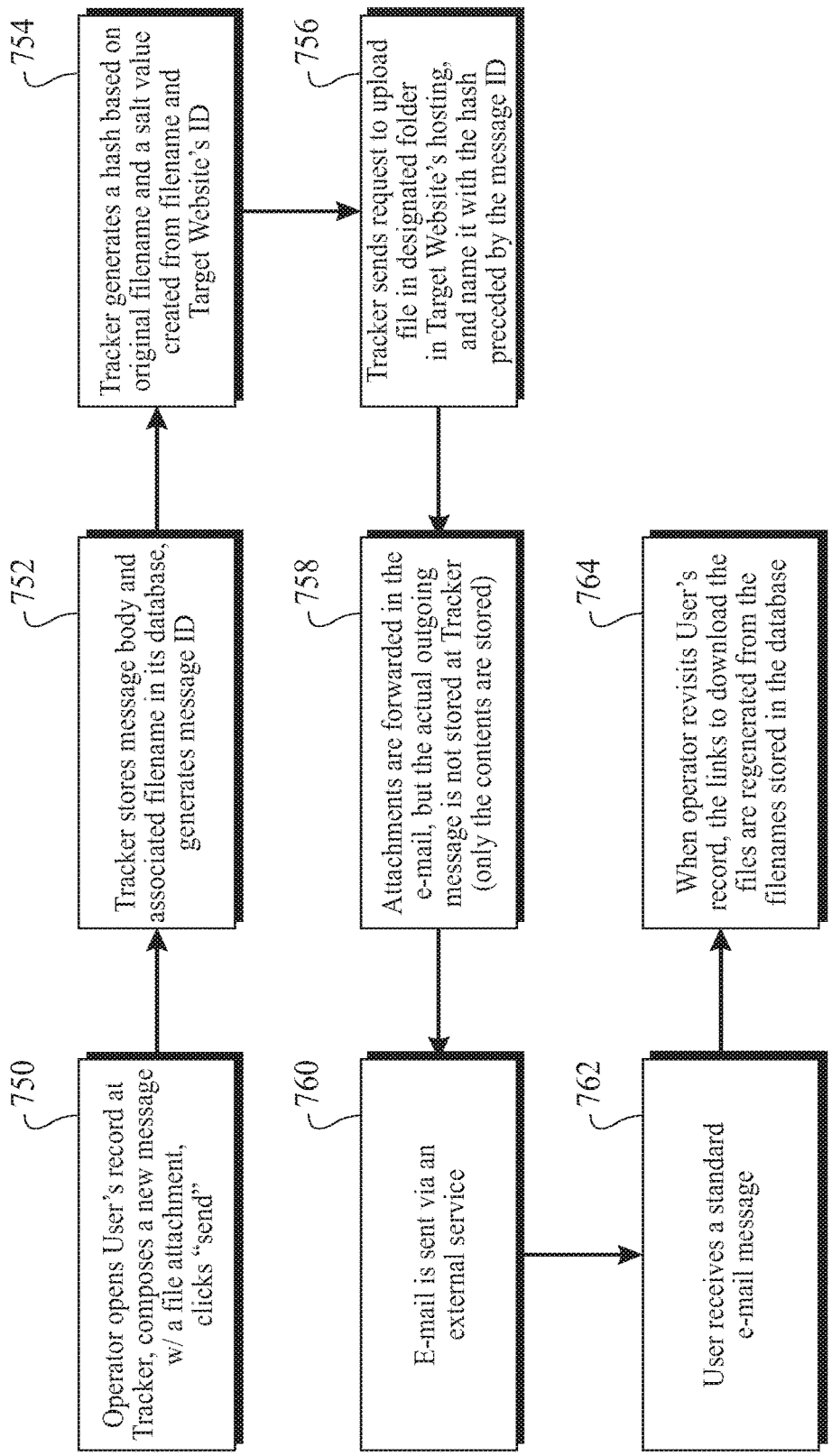
FIG. 18 presents a flowchart illustrating an embodiment of the method with respect to storing file attachments associated with outgoing messages.

FIG. 18 illustrates an example of leveraging Target Website's hosting platform, which usually holds a large amount of unused space, to store file attachments from outgoing messages from Operator to User. The method involves using a hash function, which is used to generate fixed-length output data that acts as a shortened reference to the original data. The method further uses a salt, which in encryption is random data that is added to the original data so as to make the original data harder to decode. The method begins at step 750 with Operator opening up User's record at the Tracker dashboard, composing a new e-mail message with a file attachment and clicking "Send." Tracker stores the body of the message and the associated filename in its database at step 752, and generates a message ID. Tracker then generates a hash based on the original file name and a salt value created from the filename and the Target Website's ID (or another variable, such as the message time). Tracker then sends a request to upload the file in a designated folder at step 756, located on Target Website's hosting platform, and names it with the hash preceded by the message ID. The attachments are then forwarded in the e-mail at step 758, but the actual outgoing message is not stored at Tracker's database, only the text contents of the e-mail, subject, and date are stored in this embodiment. The e-mail is sent via an external service at step 760, such as Amazon's Simple E-mail Service. User receives a standard e-mail message at step 762 from Business, which may be labeled as being mailed by the external email service. When Operator, or anyone at Business with access, revisits User's record and opens the message at step 764, the links to download the files are regenerated from the filenames stored in the database. This methodology results in very secure file attachment storage as an external hacker would have to guess a long, random string in order to view a file or guess the exact name of the file along with the message ID and Target Website's ID.

Figure 19:
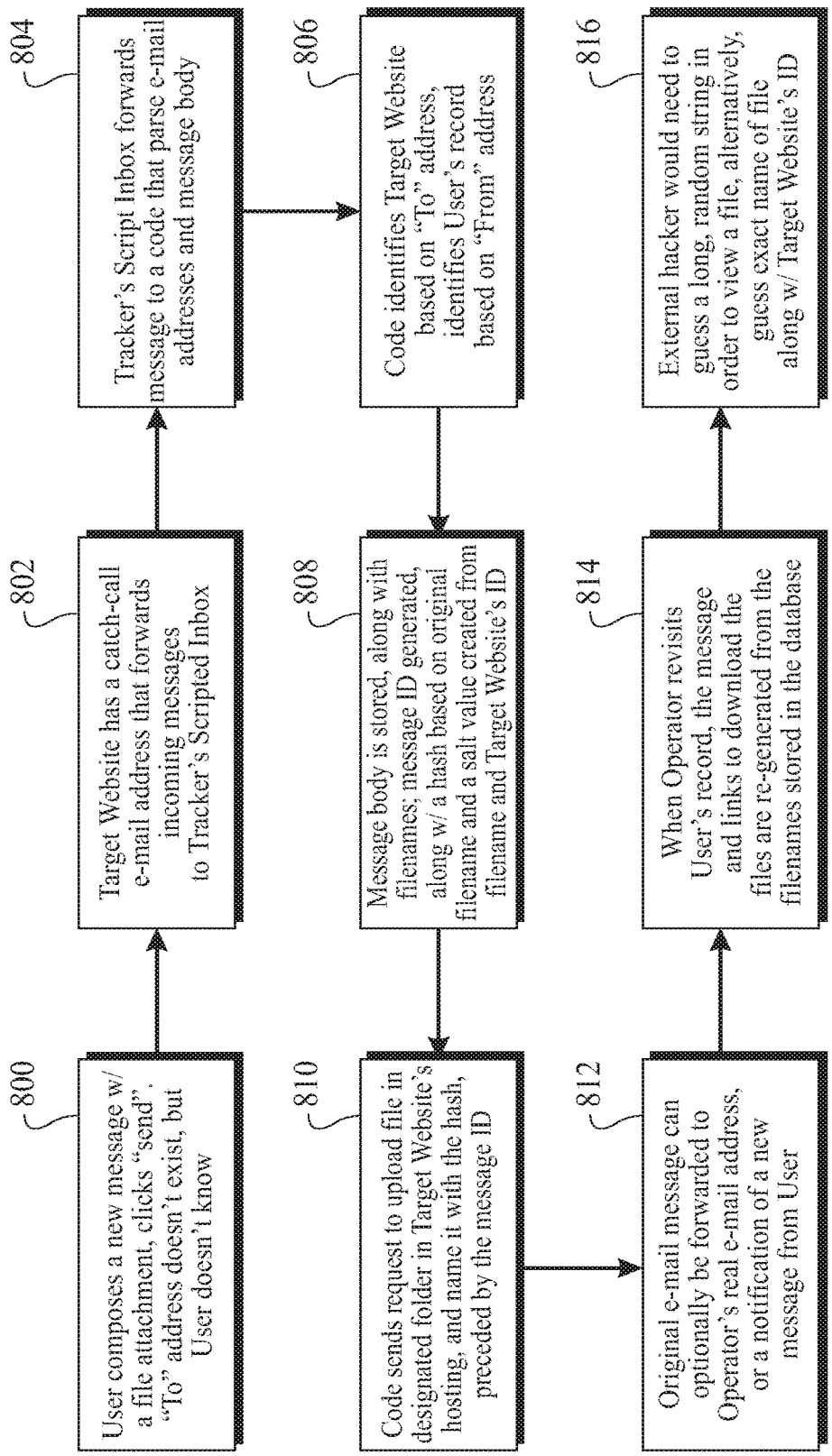
FIG. 19 presents a flowchart illustrating an embodiment of the method with respect to storing file attachments associated with incoming messages.

FIG. 19 illustrates an example of leveraging Target Website's hosting platform to store file attachments from messages sent from User to Business. User composes a new message with a file attachment to Business and clicks "send" at step 800. At this point, the "to" address does not actually exist (e.g., "does-not-exist@domain.com"), but the e-mail address' domain has a catch-all e-mail address (e.g., "catch-all@domain.com"); however, User is unaware of this. Upon sending, the e-mail is forwarded to the catch-all e-mail address, which forwards messages sent to the non-existent e-mail address to Tracker's Scripted Inbox at step 802. The Scripted Inbox forwards the message to a page of code at Tracker that parses the message headers and body at step 804. The code then retrieves the Target Website's username based on the "to" address and identifies User based on the "from" address at step 806. The message body and filename are stored and a message ID is generated, along with a salt value based on the filename and the Target Website's ID, as well as a hash value, at step 808. The code then sends a request to upload the file in a designated folder on Target Website's hosting platform, and names it with the hash, preceded by the message ID at step 810. The original e-mail message can optionally be forwarded to Business' real e-mail address at step 812, or a notification of a new message from User can be sent to Business' real e-mail address. When Operator revisits User's record at the Tracker dashboard and opens the message at step 814, the e-mail and links to download the files are re-generated from the filenames stored in the database. This methodology results in very secure file attachment storage at step 766 as an external hacker would have to guess a long, random string in order to access a file or guess the exact name of the file along with Target Website's ID and message ID.

Figure 20:
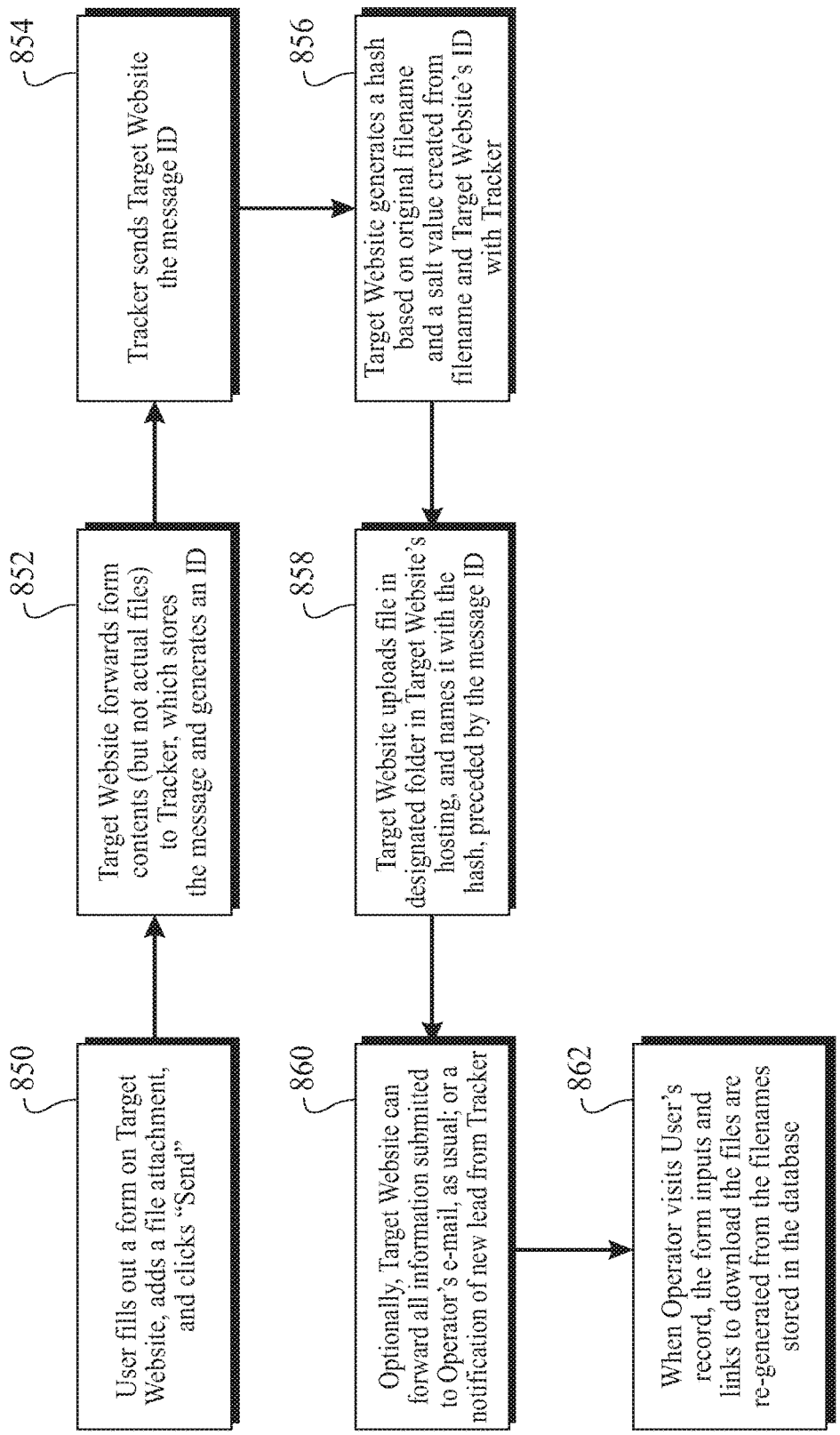
FIG. 20 presents a flowchart illustrating an embodiment of the method with respect to storing file attachments associated with form submissions.

Another embodiment of this method is illustrated in FIG. 20. This embodiment leverages a Target Website's hosting platform, which usually holds a large amount of unused space, to store file attachments from incoming form submissions originating in Target Website. At step 850, User fills out a form on Target Website, which allows uploading file attachment, and clicks "send." Target Website's form processor forwards the form's contents to Tracker, which stores the message and generates a message ID at step 852.

At step 854, Tracker generates a hash and salt value based on the original filename and the Target Website's ID, and sends the message ID and hash back to Target Website's form processor at step 856. Target Website's form processor then uploads the file into a designated folder on the Target Website's hosting platform at step 858, naming it with the hash, preceded by the message ID. Optionally, at step 860, Target Website's form processor can forward all information to the Business' e-mail, or Tracker can send a notification of a new inquiry submission. When Operator revisits User's record in the Tracker dashboard at step 862, the form inputs and links to download the files are re-generated from the filenames stored in the database. This methodology results in very secure file attachment storage as an external hacker would have to guess a long, random string in order to view a file or guess the exact name of the file along with Target Website's ID and message ID.

The method described in FIG. 18-20 may also be adapted to any Lead Manager, provided that custom code can be inserted into such system. Alternatively, the links to download the files may instead point to a server controlled by Tracker and incorporate the message ID and/or Target Website's ID. The code at Tracker may use these to redirect to the file. Additionally, the method may utilize any remote storage space other than Target Website's hosting, such as cloud storage on DROPBOX, for instance.

Figure 21:
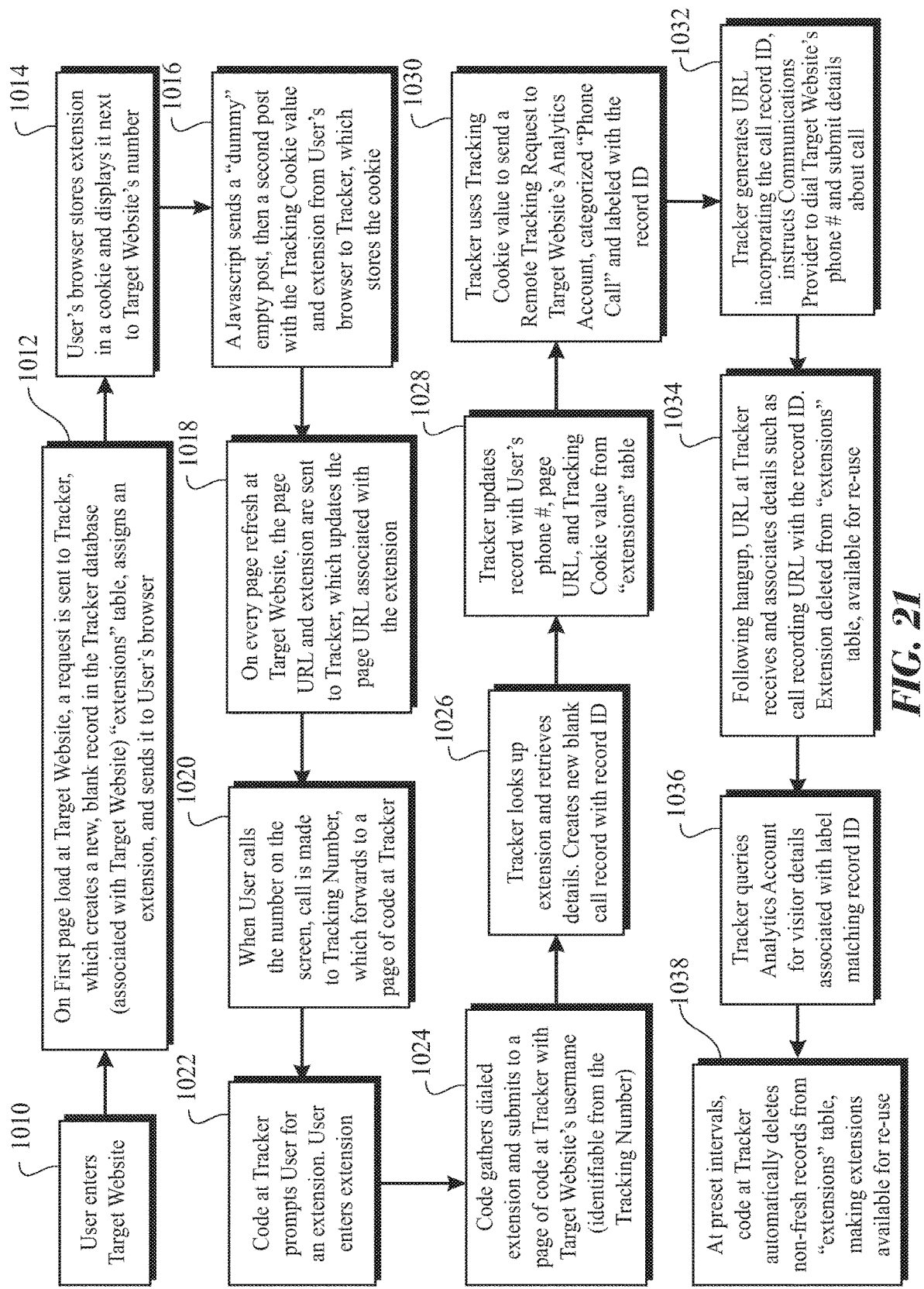
FIG. 21 presents a flowchart illustrating an embodiment of the method with multiple users, where network content is accessed through one device, and the phone call is completed through another device, and call recording is enabled.

Referring to FIG. 21, another embodiment of a leads and/or call tracking system and method will now be described. As shown in FIG. 21, in step 1010, User may take an action that directs User to a Target Website. For example, User may click on an ad, a search link, or on a referring link, etc. to direct User to a Target Website. At step 1012, a request is sent to Tracker, and a new record in Tracker database associated with the Target Website is generated. The request may be sent to Tracker once the Target Website has loaded. Tracker may store a database of collected information, as well as any phone number extension that has been associated with such information.

If Tracker determines that the request referrer (i.e., the Target Website) is valid and authentic, a new record is created in Tracker database, for example, in the extensions table (see FIG. 24) that is dedicated to Target Website. Tracker may verify the referrer to protect Target Website from unauthorized phone calls that might have been initiated by hackers or malicious software.

Each record in the extensions table may be assigned a numeric code, which may be used to match a website visit to a phone call by prompting the caller for an extension. The numeric codes may be consecutive integers starting from the number "1", for example, and may be reused following a phone call or when the visit is determined to have ended, as described in more detail below. Since the caller may be prompted to enter the code during the call, it may be desirable to keep the number of digits contained in these numeric codes to a minimum such that entering the code is relatively user-friendly.

As shown in step 1014, once the extension has been determined, the system may enter the extension into the extensions table and may send it back to User's browser. As shown in step 1016, a JAVASCRIPT (which may reside at, for example, Tracker or Target Website) may be automatically initiated from User's browser following the display of the extension in step 1014. This code may first store the extension in a cookie, and then initiate an empty asynchronous JAVASCRIPT and XML ("AJAX") request to Tracker. Following the first request, a second request may be initiated, sending a POST request with User's assigned extension and the value of a Tracking Cookie.

Tracker may update the record of the extension with the Tracking Cookie value. As shown in step 1018, on each subsequent pageview, the uniform resource locator ("URL") of the page, commonly referred to as a web address, as well as the extension may be sent to Tracker, which may update the extension record with the URL value, as well as record the time of the update.

When User calls the Target Website phone in the URL at step 1020, the call is forwarded to a page of code at Tracker that incorporates the Target Website username, as assigned by Tracker. For example, where Target Website is "ABC.com," Target Website may be incorporated in the URL as follows: "www.tracker.com/call-answering-script.php?username=ABC.com." As shown in step 1022, the code at this page may gather the Target Website name from the URL and prompt the caller for an extension.

When the call is made, User may be prompted to enter the extension, for example, via a query or an audible command. For example, User may hear a phrase such as, "If you have an extension, please enter it now." As shown in step 1024, when User enters the extension shown in his browser window, the code may gather the dialed numbers including the dialed extension, and submit them to a second page of code at Tracker that incorporates the Target Website username in the URL. At step 1026, this second page may use the Target Website username to find the appropriate extensions table, and search this table for the extension or numeric code previously entered to obtain the Tracking Cookie and the last page visited.

The code may use the Tracking Cookie value to search through Target Website's calls and emails database tables for a match. In particular, the code may extract the part of the cookie that constitutes the unique visitor ID and search the tables for records with cookie values that include the same unique visitor ID. In the case of GOOGLE ANALYTICS' __utma cookies, the unique visitor ID is comprised of the first part of the cookie value, from the beginning up to the first dot. To accomplish the search, the system may utilize a database querying language, such as Structured Query Language ("SQL"). If SQL were used, the database query may be structured as, for example, "SELECT leadid FROM 'ABCcom_calls' WHERE ga_cookie LIKE '%$ga_cookie %'." Although SQL is noted, similar queries in other database querying languages may also be used.

If a match is found, the call may be assumed to have originated from a returning User, and the lead ID associated with the existing matched record may be used when creating the new call record. Otherwise, a new, blank record may be created in the Target Website leads table, and the new lead ID may be used when creating the new call record. As shown in step 1026, the call record may receive an ID. As shown in step 1028, the call record may be populated with the page URL and Tracking Cookie value obtained earlier, as well as the phone number of User. As shown in step 1030, the code uses the Tracking Cookie value to send a Remote Tracking Request to Target Website's Analytics Account (for example, a remote trackEvent request in GOOGLE ANALYTICS, categorized "Phone Call" and labeled with the record ID). The Remote Tracking Request may be performed either prior to step 1032, or following termination of the call in step 1034 described below, or at both times.

Following the Remote Tracking Request, at step 1032, the code may generate a URL incorporating the call record ID. Note that in other embodiments, the URL may be generated elsewhere in the process, such as in (or concurrently with)

any of steps 1026, 1028, or 1030. The code then may instruct Communications Provider to dial Business' real phone number (i.e., the number that is not owned, provided, or forwarded to the Communications Provider) and submit details about the call following termination of the phone call to the URL at Tracker. The real phone number may be stored in the database and located or accessed via the Target Website username. At step 1034, following hang-up or termination of the phone call, the URL at Tracker may receive details such as call recording URL and associate those with the call record ID.

The record and the extension that was associated with that particular record may be unassociated from one another (i.e., the extension is deleted from the extensions table) following the hang-up of the call at step 1034 or may be performed at any time following updating of the record with the call record ID such as in step 1028. Deleting or un-associating the extension with recorded data may facilitate re-use of the extension such that a new extension need not be created and the number of digits contained in future associated extensions may be minimized.

At step 1036, Tracker may connect to the Analytics Account and query for all visitor details associated with the label corresponding to the call record ID. In step 1038, Tracker automatically sorts through all records in the Target Website's extensions table at set intervals, deleting records that were not updated within a predetermined amount of time. The intervals and amount of time could range from a certain number of hours to days, and may be set by Business.

The method described above may use a simple extension that corresponds to Tracker's record of a website visit. This extension may also be combined with the existing extension logic utilized by Business by combining or pairing Tracker's extension with the extension already utilized by Business. The modified portion of the logic (i.e., the portion of the logic corresponding to the extension corresponding to Tracker's record of the website visit) may, for example, prepend or append Business' extension. The two extensions may be separated by a predetermined fixed symbol, such as the pound or hash key (e.g., "#") or star key (e.g., "*") ("Special Symbol"). When analyzing the keys entered by User, Tracker may use the part before the Special Symbol to locate the call record, and the part after the Special Symbol to forward the call to an appropriate Operator, or vice versa as may be desired.

In another embodiment, the extension may be generated in response to another type of action taken by User. For instance, Target Website may display a menu with options representing different departments in its organization, and specify to Tracker the phone number within Business related to each department. Before calling Business, Target Website may prompt User to select which department to call. Upon User's selection of a department and clicking "Call", a request may be sent to Tracker with the chosen department. Tracker may populate this information in its database, and respond with an extension. When the extension is later dialed, Tracker may use the department information to determine the specific phone number at Business to which to forward the call.

Figure 22:
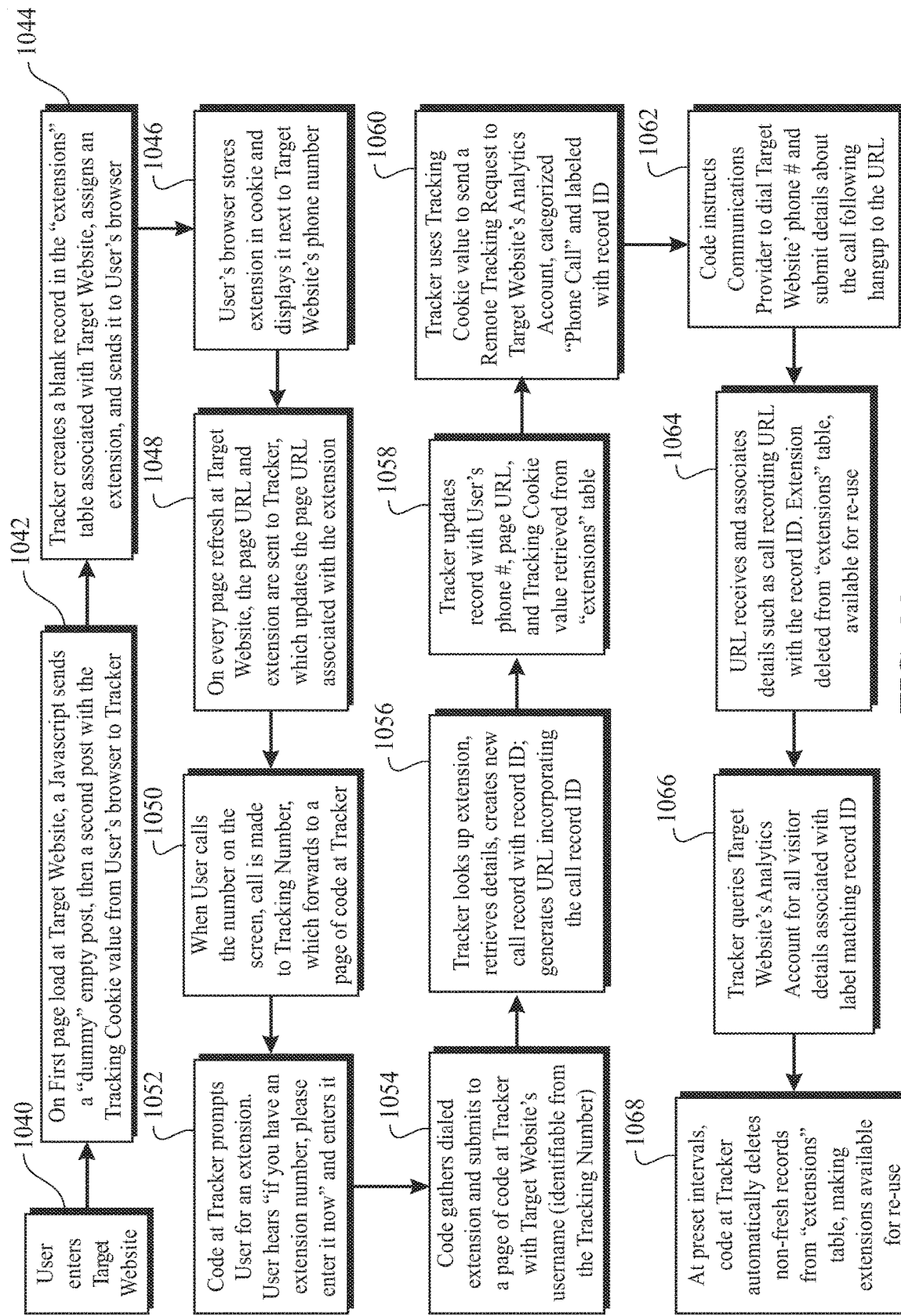
FIG. 22 presents a flowchart illustrating an embodiment of the method with multiple users, where network content is accessed through one device, and the phone call is completed through another device, returning visitors are detected, and call recording is enabled.

Another embodiment, as shown in FIG. 22, utilizes a similar method to the one described above with respect to FIG. 21 except in the following ways. In particular, the method described with respect to FIG. 22 differs from that described in FIG. 21 as it attempts to locate or look for the Tracking Cookie value in the extensions table before sending the extension. Advantageously, this may facilitate detecting returning Users and displaying a consistent extension. At step 1040, User enters or visits Target Website. For example, User may click on an ad, a search link, or on a referring link, etc. that directs User to a Target Website. In step 1042, once Target Website has loaded, a JAVASCRIPT (or the like) automatically initiates an empty AJAX request to Tracker, followed by a second request with the Tracking Cookie value. The Tracking Cookie value may be only available for retrieval following a second page load, thereby necessitating the first "dummy" request. In step 1044, the method uses the Tracking Cookie value when generating the extension. The remaining steps 1046 through 1068 are similar or identical to the corresponding steps in the method described above with respect to FIG. 21.

Figure 23:
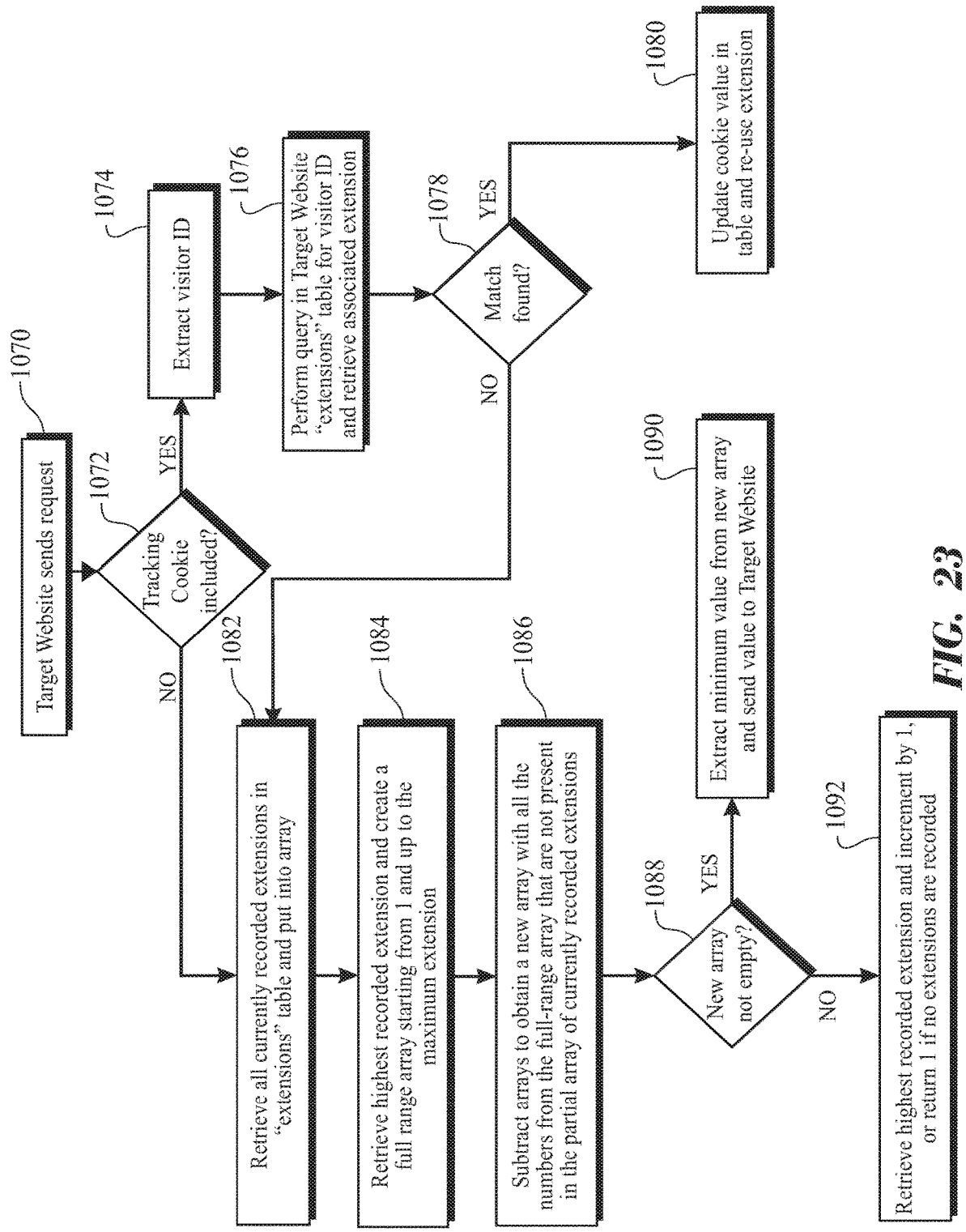
FIG. 23 presents a flowchart illustrating a method for determining an optimal extension according to yet another embodiment.

A method of determining an optimal extension will now be described with reference to FIG. 23. As shown in step 1070, a Target Website may send Tracker a request to generate an extension. At step 1072, a determination is made at Tracker whether the request includes the Tracking Cookie value. As shown in step 1074, if the request includes the Tracking Cookie value, the part of the Tracking Cookie that constitutes the visitor ID (such as the first part of the cookie from the beginning up to the first dot in GOOGLE ANALYTICS' __utma cookie) may be extracted. In step 1076, the extensions table is searched for records with cookie values that include the same visitor ID. To accomplish this, the system may utilize a database querying language. If SQL were used, the database query may be structured as, for example, "SELECT extension FROM 'ABCcom_extensions' WHERE ga_cookie LIKE '%$ga_cookie%'." At step 1078, a determination is made as to whether a match was found. If a match is found, the request is assumed to have originated from a returning User, and as shown in step 1080, the extension previously associated with that record is used and the Tracking Cookie value is updated.

If no match is found or if a Tracking Cookie is not included in the initial request, the method proceeds to step 1082 in which extensions currently recorded in the extensions table are retrieved and placed into a simple array or collection of values. At step 1084, a full array that includes all of the values associated with the extensions is generated (e.g., all integers between the number 1 and the highest recorded extension number). Thus, a sample extensions array may include the numbers {1, 3, 4, 5, 6, 9, 10} while a corresponding full range array would include the numbers {1, 2, 3, 4, 5, 6, 7, 8, 9, 10}, for example. In step 1086, the method may subtract the extensions array from the full array, extracting all the values that appear in the full array but do not appear in the extensions array, and may place those into a new array. To accomplish this, the method may use a pre-built computer programming language function, such as the "array_diff" function of the Hypertext: Preprocessor computer programming language ("PHP"). In the example above, the new array would include the numbers {2, 7, 8}.

At step 1088, the method may determine whether the new array contains at least one value. If the new array is not empty, the system may select the smallest value from the new array at step 1090. To accomplish this, the method may use a pre-built computer programming language function, such as the "min" PHP function, which obtains the minimum value from a set of values, or the "array_shift" PHP function, which obtains the first value from a set of values. Although PHP functions are noted, similar functions in other programming languages may also be used. If the new array is empty, the method may return to the extensions table and attempt to obtain the highest recorded extension at step 1092. If the method obtains a value, the method may increment the value by 1 and return the result. If the method obtains no value, then the method may determine that no extensions have been recorded, and may return "1".

Figure 24:
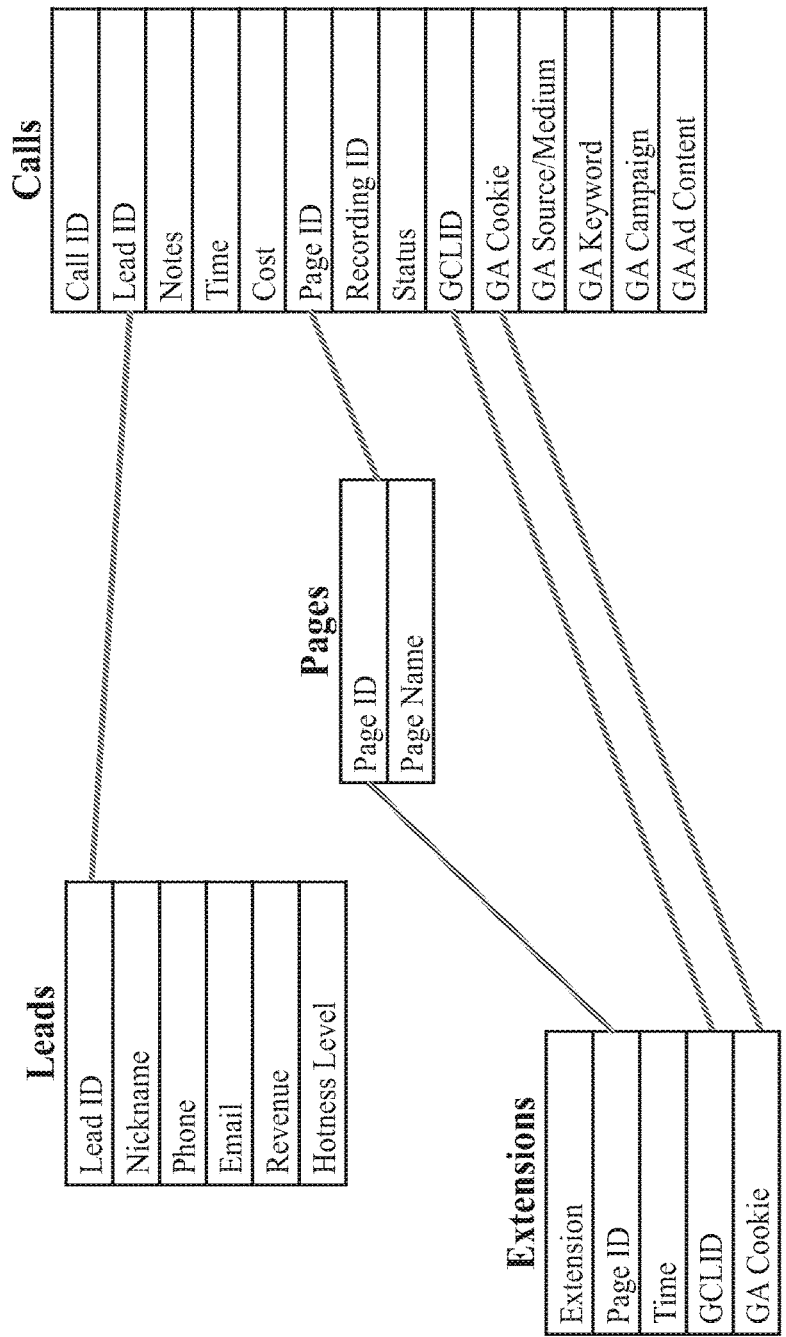
FIG. 24 presents a chart of tables illustrating a database structure according to an embodiment of the technology introduced here.

An illustrative database structure, in which the method may be implemented, with the interconnections between calls, leads, pages, and extensions, is shown in FIG. 24.

Figure 25:
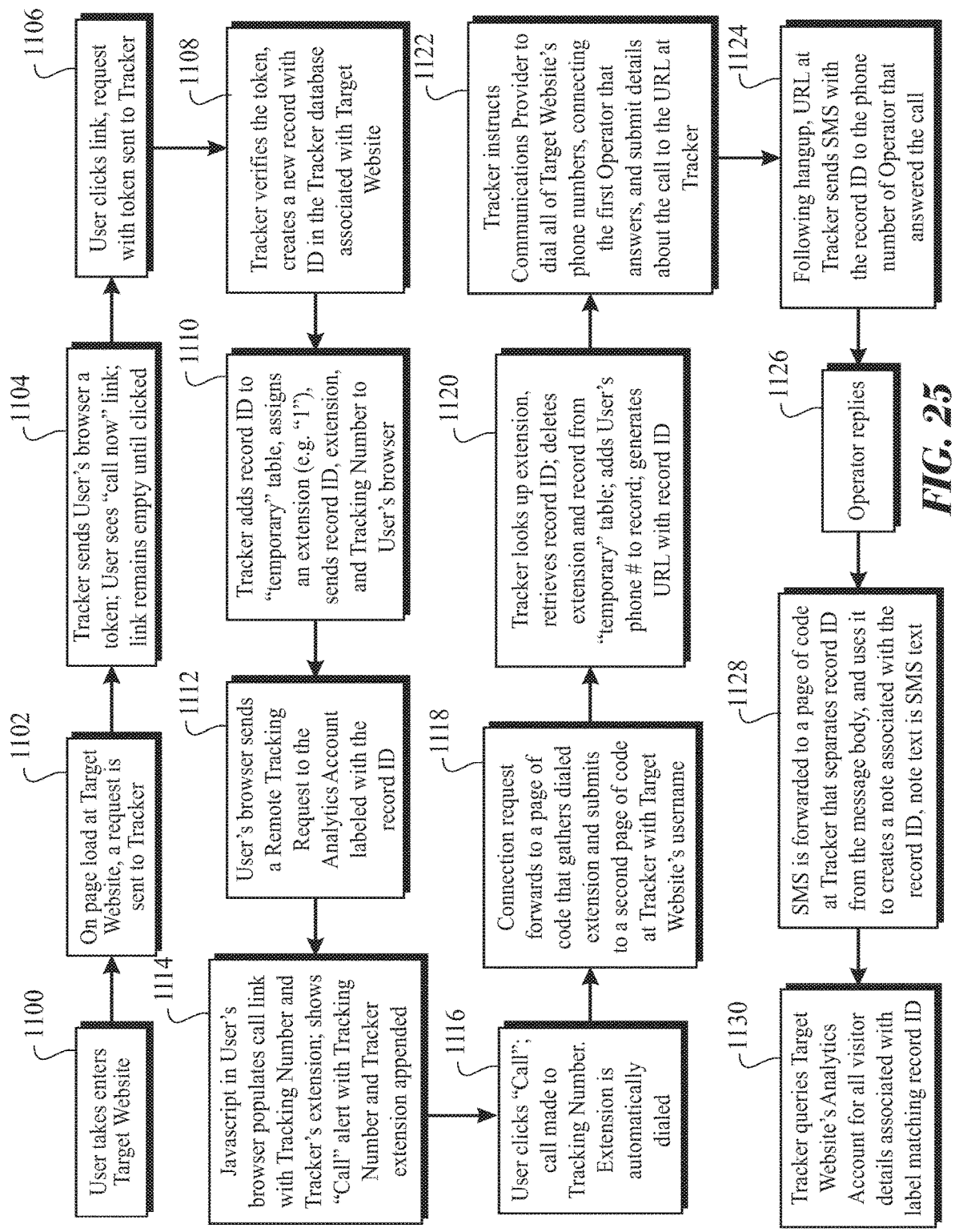
FIG. 25 presents a flowchart illustrating an embodiment of the method with multiple users, where a phone call is completed through a mobile device or softphone, the call being forwarded to multiple phone numbers, and SMS as a way of connecting the phone call content to other data.

Another embodiment, as shown in FIG. 25, utilizes a similar method to the one described above with respect to FIG. 21 except in the following ways. In particular, the method described with respect to FIG. 25 differs from that described in FIG. 21 as it allows Operator to associate phone call information with visitor data by communicating with Tracker using SMS. At step 1100, a User may visit Target Website. For example, User may click on an ad, a search link, or on a referring link, etc. to direct User to a Target Website. Next a request may be sent to Tracker once the Target Website has loaded at step 1102. Tracker may send User's browser a token, and User may see a "Call" link that remains empty at step 1104. When User clicks "Call" at step 1106, a JAVASCRIPT may execute, sending the token to Tracker. Tracker may verify the token and create a new blank record in its database, associated with Target Website, and may generate a record ID at step 1108. Tracker may then use the record ID to create a new extension record, and may send the Tracking Number, record ID, and extension to User's browser at step 1110.

At step 1112, the JAVASCRIPT may send a tracking request to the Analytics Account. The tracking request may be labeled with a label corresponding to the record ID. The JAVASCRIPT may then populate the "Call" link in User's browser with the Tracking Number and extension at step 1114, prompting a "Call" alert to pop up on User's phone. At step 1116, User clicks the "Call" button on the alert, calling the Tracking Number, and automatically dialing the extension.

At step 1118, the call may be forwarded to a page of code at Tracker that gathers the Target Website's username from the URL and the dialed extension, submitting both to a second page of code at Tracker. At step 1120, the second page of code may look up the extension in Tracker's extensions table dedicated to Target Website and retrieve the record ID. The code may then use the record ID to update the record with User's phone number, delete the extension and record ID from the extensions table (making the extension available for re-use) and generate a URL incorporating the record ID.

Tracker may then instruct Communications Provider to dial all of the phone numbers associated with Target Website and to submit details about the call following hang-up to the URL at Tracker. Tracker may collect the phone number of the first Operator that answers and connect the Operator with User at step 1122. To accomplish this, Tracker may bridge the calls as described in more detail below with reference to FIG. 26.

At step 1124, following phone call termination, the URL at Tracker may instruct Communications Provider to send a SMS to the Operator with the record ID. If the record ID is JD123, such SMS may read, for example, "reply with JD123 in beginning of SMS to add notes". At step 1126, Operator may reply with another SMS, such as continuing the sample referenced above, "JD123 John Doe, JD Corp, johndoe@gmail.com, 212-555-7889, Brokerage Firm, Wants 500SF office, 3 months, Call back tomorrow to confirm appointment."

At step 1128, the SMS may be forwarded to a page of code at Tracker that incorporates Target Website's username in the URL. The code may gather the username and message body, separate the first word from the remainder of the message body, and use the username to locate the appropriate database table associated with Target Website. The code may then search the table for the record ID that matches the separated first word to validate the record ID, and may use the record ID to add a note associated with the record ID, with the remaining text message body comprising the note text. At step 1130, Tracker may query the Analytics Account for all visitor details associated with the label corresponding to the record ID.

As shown, the method described in FIG. 25 may utilize fewer extensions than the method described in FIGS. 21 and 22, since extensions may only be generated when a "CALL" button is clicked, rather than with every page view. Thus, in the former method, the generated extensions have the potential to remain significantly shorter. A Target Website that implements the method described with respect to FIG. 21 in conjunction with that of FIG. 25 may store all extensions in a single table. Alternatively, Tracker may create two tables. For example, Tracker may create one table for desktop extensions and another for mobile extensions of Target Website. To differentiate calls, Tracker may assign a Tracking Number for each device type.

Alternatively, Tracker may append or prepend a key or Special Symbol (e.g., one or more symbols, characters, or digits) to a generated extension. Thus, for example with respect to the method described in FIG. 25, mobile extensions may be appended a designated Special Symbol, while desktop extensions (as described, for example in FIGS. 21 and 22) may be appended a different designated Special Symbol, or no symbol (or vice versa). When analyzing the Special Symbol inputted by User, Tracker may, for example, read the Special Symbol, and may use the Special Symbol to determine the appropriate table to search for the extension.

Figure 26:
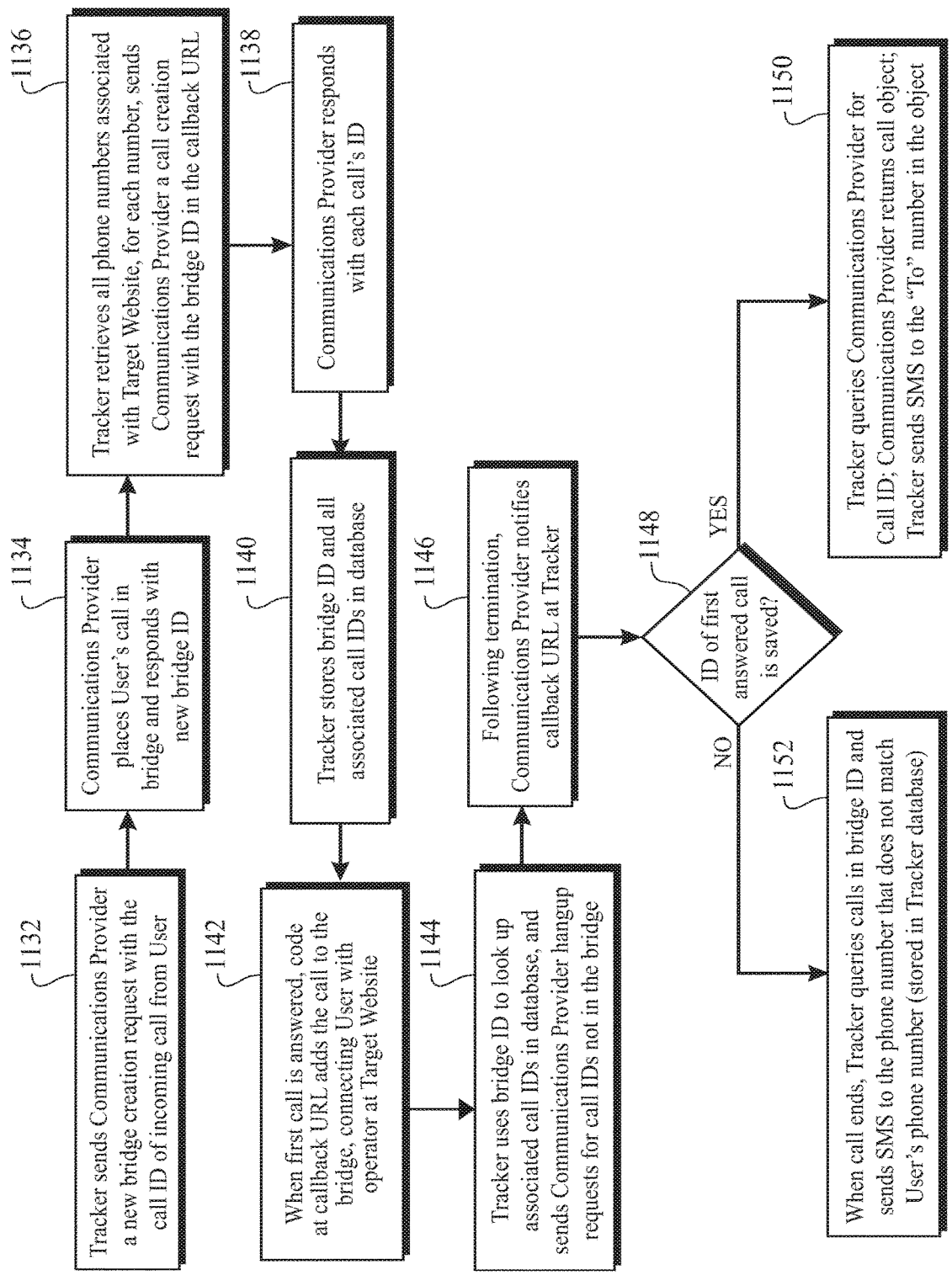
FIG. 26 is a flowchart illustrating a method for identifying from a group of phone numbers the first party to answer a phone call and saving the information for future reference according to another embodiment of the present disclosure.

A method of both forwarding the incoming call from User to multiple Operators and connecting User with the first Operator that answers will now be described with reference to FIG. 26. The forwarding of a call to multiple Operators may be performed simultaneously. As shown in step 1132, when User calls the Tracking Number, Tracker may send Communications Provider a request to create a new bridge, or a connection between two phone calls. The bridge request may be populated with the call ID of the incoming call from User. At step 1134, Communications Provider may create the bridge, may place the call from User in the bridge, and may send Tracker the new bridge ID. At step 1136, Tracker may retrieve from its database the phone numbers associated with Target Website, and may facilitate a phone call to each phone number by sending a request to Communications Provider. The request may include a callback URL that incorporates the bridge ID. The callback URL receives notifications about the call progress, such as when the call is answered or completed.

At step 1138, the Communications Provider may initiate the phone calls, sending to Tracker the call ID of each call. At step 1140, Tracker may store the bridge ID and associated call IDs in its database. At step 1142, when the first Operator answers the call ("First Answered Call"), the callback URL may receive a notification from Communications Provider. The code at the callback URL may collect the bridge ID from the URL, and search Tracker database for the call ID of the First Answered Call. If the bridge ID associated with the call ID in the database matches the bridge ID gathered from the URL, the code may add the First Answered Call to the bridge, connecting User with Operator. Tracker may also store the call ID of the First Answered Call in its database as the answered call. At step 1144, the code may retrieve the remaining call IDs associated with the bridge, and may send Communications Provider a disconnect request for each call ID.

At step 1146, following phone call termination, Communications Provider may send the callback URL at Tracker a notification. At step 1148, a determination is made whether Tracker stored the First Answered Call ID in its database. If the First Answered Call ID was stored, Tracker may use the call ID to query Communications Provider for the dialed phone number associated with Operator, thereby determining the number to which to send a SMS at step 1150. If the First Answered Call ID was not stored, Tracker may use the bridge ID to query Communications Provider for the phone calls associated with the bridge at step 1152. Tracker may compare each phone number from the phone call information returned by Communications Provider to User's number stored in Tracker's database, and determine that the number that does not match User's number belongs to Operator. Although the SMS communications feature is illustrated with one method, it can be adapted to work with other call tracking methods, including the method described in FIGS. 21 and 22.

Figure 27:
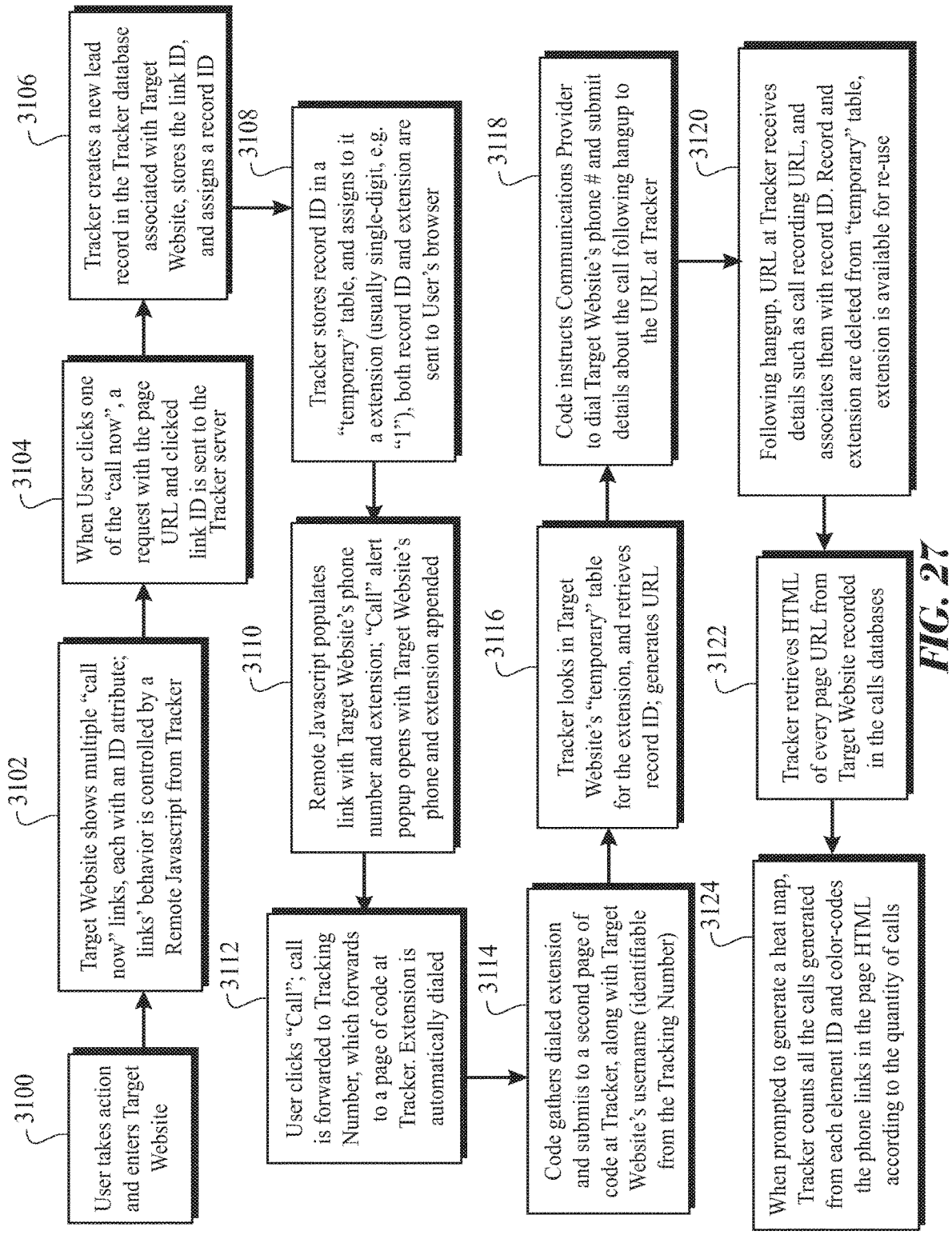
FIG. 27 presents a flowchart illustrating an embodiment of the method with multiple users, where a phone call is completed through a mobile device or softphone, and data about call-prompting elements being collected and processed into visual reports.

Referring to FIG. 27, an embodiment of a leads and/or call tracking system and method will now be described. As shown in FIG. 27, in step 3100, User may take an action that takes User to a Target Website. For example, User may click on an ad, a search link, or on a referring link, etc. to direct User to a Target Website. Several "call" links, buttons, or a combination thereof may be loaded on the page at Target Website at step 3102. Each such "call" button or link element may have an Element ID, for instance, by altering the ID attribute of the <a> HTML link tag. This Element ID attribute may be defined in the HTML or attached dynamically through JAVASCRIPT code.

When User clicks "Call" at step 3104, a JAVASCRIPT may execute, collecting the clicked link or button Element ID as well as the current page URL and sending it to Tracker. Tracker may create a new blank record in its database, associated with Target Website, populate it with the Element ID and page URL, and may generate a record ID at step 3106. Tracker may then use the record ID to create a new extension record, for example, in the extensions table dedicated to Target Website.

As shown in step 3108, the system may send the Tracking Number, record ID, and extension to User's browser. As shown in step 3110, the JAVASCRIPT may then populate the "Call" link in User's browser with the Tracking Number and extension, prompting a "Call" alert to pop up on User's phone. At step 3112, User clicks the "Call" button on the alert, calling the Tracking Number, and automatically dialing the extension.

When User calls the Target Website phone, the call may be forwarded to a page of code at Tracker that incorporates the Target Website username, as assigned by Tracker. As shown in step 3114, the code at this page may gather the Target Website name from the URL and the dialed numbers including the dialed extension, and submit them to a second page of code at Tracker that incorporates the Target Website username in the URL. At step 3116, this second page may use the Target Website username to find the appropriate extensions table, and search this table for the extension or numeric code previously entered to obtain the ID of the call record, and may generate a URL incorporating the call record ID.

At step 3118, the code may instruct Communications Provider to dial Business' phone number and submit details about the call following termination of the phone call to the URL at Tracker. The phone number may be stored in the database and located or accessed via the Target Website username. At step 3120, following hang-up or termination of the phone call, the URL at Tracker may receive details such as call recording URL and associate those with the call record ID.

The record and the extension that was associated with that particular record may be unassociated from one another (i.e., the extension is deleted from the extensions table) following the hang-up of the call at step 3120 or may be performed at any time following updating retrieval of the call record ID such as in step 3116. Deleting or un-associating the extension with recorded data may facilitate re-use of the extension such that a new extension need not be created and the number of digits contained in future associated extensions may be minimized.

In step 3122, Tracker retrieves the HTML code of each page URL that is associated with at least one call record in its database. This may be achieved by querying the call records for unique values of page URLs, provided that these have been standardized (e.g., cleaned of prefixes such as http, https, or www, as well as webpage filenames, GET variables, and the like). To retrieve the HTML code, Tracker may initiate a cURL request to the appropriate URL at Target Website.

As described in step 3124, Tracker may use the HTML code retrieved in step 3122 to display a simulated version of the webpage, with an overlay visualizing the click popularity of each "call" element. This would be calculated by summing the number of phone call records associated with each Element ID over a specified time period. Tracker may then utilize a color scale to visually indicate the popularity of each Element ID in triggering phone calls. For instance, the scale may vary from red to blue, with the most frequently clicked elements colored in red, and the least frequently clicked elements colored in blue.

Figure 28:
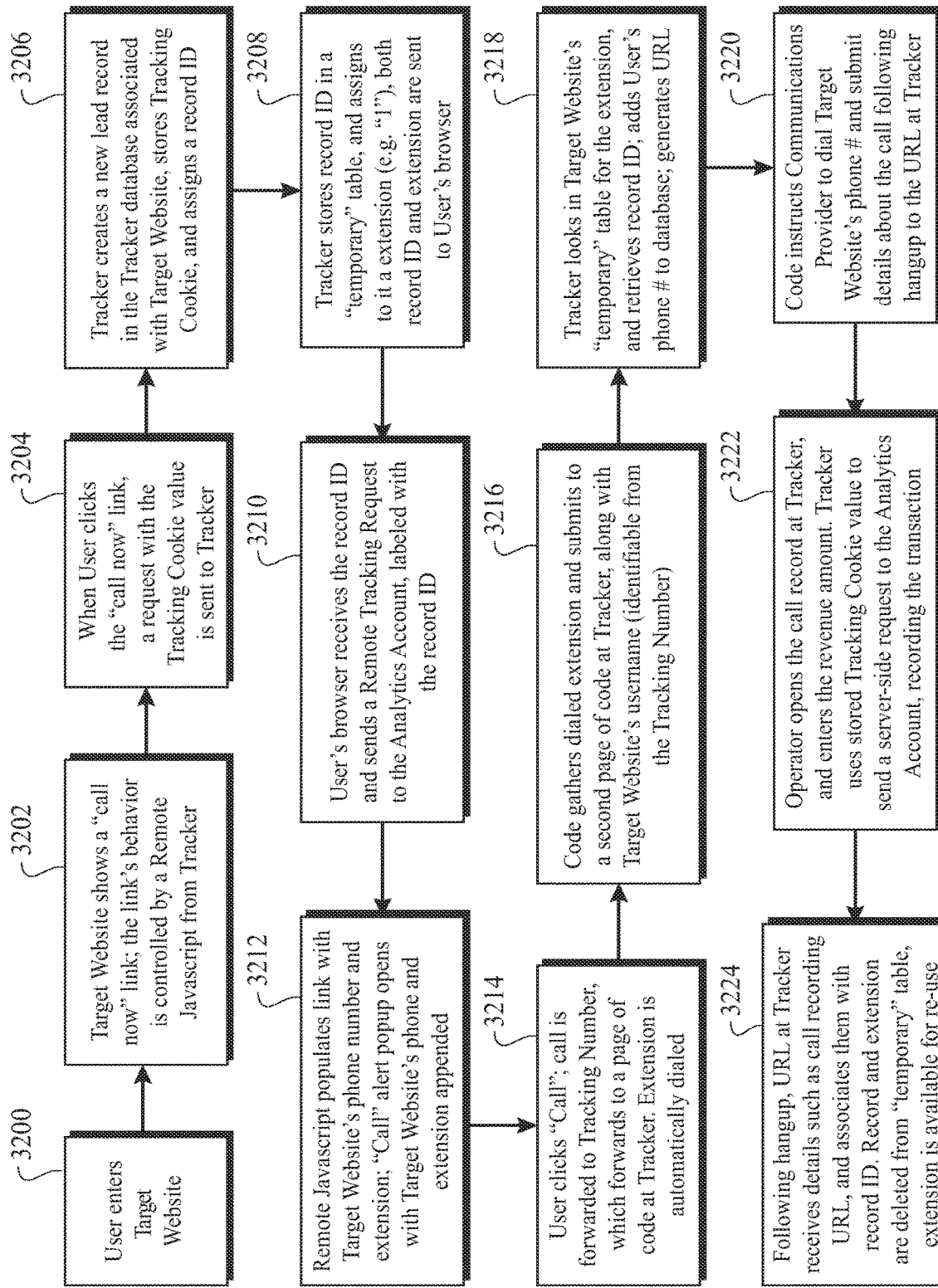
FIG. 28 presents a flowchart illustrating an embodiment of the method with multiple users, where a phone call is completed through a mobile device or softphone, and recording data about financial transactions occurring during and/or after the call.

Another embodiment, as shown in FIG. 28, utilizes a method similar to the one described above with respect to FIG. 27 except in the following ways. In particular, the method described with respect to FIG. 28 differs from that described in FIG. 27 as it allows Operator to associate phone call information, including financial transactions, with visitor information. This is accomplished by entering information in a system that interprets the data into a format suitable for sending to a website analytics system, where such data is associated with the visitor information.

As shown in FIG. 28, in step 3200, User may take an action that takes User to a Target Website. For example, User may click on an ad, a search link, or on a referring link, etc. to direct User to a Target Website. A "call" link or buttons may be loaded on the page at Target Website at step 3202. When User clicks "Call" at step 3204, a JAVASCRIPT may execute, collecting the value of a Tracking Cookie. At step 3206, Tracker may create a new blank record in its database, associated with Target Website, populate it with the Tracking Cookie value obtained earlier, and may generate a record ID. Tracker may then use the record ID to create a new extension record, for example, in the extensions table dedicated to Target Website.

The system may send the Tracking Number, record ID, and extension to User's browser at step 3208. As shown in step 3210, the code uses the Tracking Cookie value and the ID associated with the Analytics Account, which may be stored in the database of Tracker. A Remote Tracking Request is sent to Target Website's Analytics Account (such as a remote trackEvent request in GOOGLE ANALYTICS). The Remote Tracking Request may be categorized as a phone call and may be labeled with an ID corresponding to the call ID assigned to the new call record. As shown in step 3212, the JAVASCRIPT may then populate the "Call" link in User's browser with the Tracking Number and extension, prompting a "Call" alert to pop up on User's phone.

At step 3214, User clicks the "Call" button on the alert, calling the Tracking Number, and automatically dialing the extension. As shown in step 3216, the call forwards to a page of code at Tracker that may gather the Target Website name from the URL and the dialed numbers including the dialed extension, and submit them to a second page of code at Tracker. At step 3218, this second page may use the Target Website username to find the appropriate extensions table, and search this table for the extension or numeric code previously entered to obtain the ID of the call record, and may generate a URL incorporating the call record ID.

At step 3220, the code may instruct Communications Provider to dial the real phone number of Target Website and submit details about the call following termination of the phone call to the URL at Tracker. At step 3222, following hang-up or termination of the phone call, the URL at Tracker may receive details such as call recording URL, call duration, etc., and associate them with the call record ID. The record and the extension that was associated with that particular record may be unassociated from one another (i.e., the extension is deleted from the extensions table) following the hang-up of the call at step 3222 or may be performed at any time following retrieval of the call record ID such as in step 3218.

During the call, or following call disconnection, the system may display the call record to an Operator in a UI. The Operator may use the UI to enter information obtained during the call, for instance, the amount of sale revenue generated during the call. To help Operator distinguish the correct record to update during the call, the system may automatically update the status of all current calls to "IN CALL" and may display such records in a separate list. To further distinguish among multiple concurrent calls, prior to connecting the call, the system may announce to the Operator the call record ID, which Operator may enter into a search box in the system to locate the correct call record. Operator may then enter information about the call record in real time, while on the phone with the caller.

Alternatively, Operator may return to the call record at a later date to enter a sale amount, when such a transaction actually closed. To locate the correct call record, the Operator may listen to the original call recording, refer to information automatically entered by Tracker (such as the caller's phone number), or consult information manually entered by Operator during the original call or at a later date, such as the caller's name and any relevant notes.

When Operator enters the sale revenue, Tracker may use the Tracking Cookie value to send a Remote Tracking Request associating a transaction with the original visitor data that triggered the phone call. The Remote Tracking Request may incorporate the sale revenue entered by Operator, as well as additional variables, such as a cost-of-sale amount. Such variables may be numeric or subjective attributes of the caller, sale, or any other aspect of the phone call and resulting transaction. Such data may be manually entered by Operator, such as the number and level of agents involved in the call. Numeric figures may also be automatically calculated by Tracker based on predefined constants. For instance, Tracker may use the original call duration, multiplied by a preset cost-per-time configured by the Operator, to calculate the cost of sale. Furthermore, Tracker may subtract the cost from revenues to arrive at a profit figure, and send such figure as the revenue, if desired.

Figure 29:
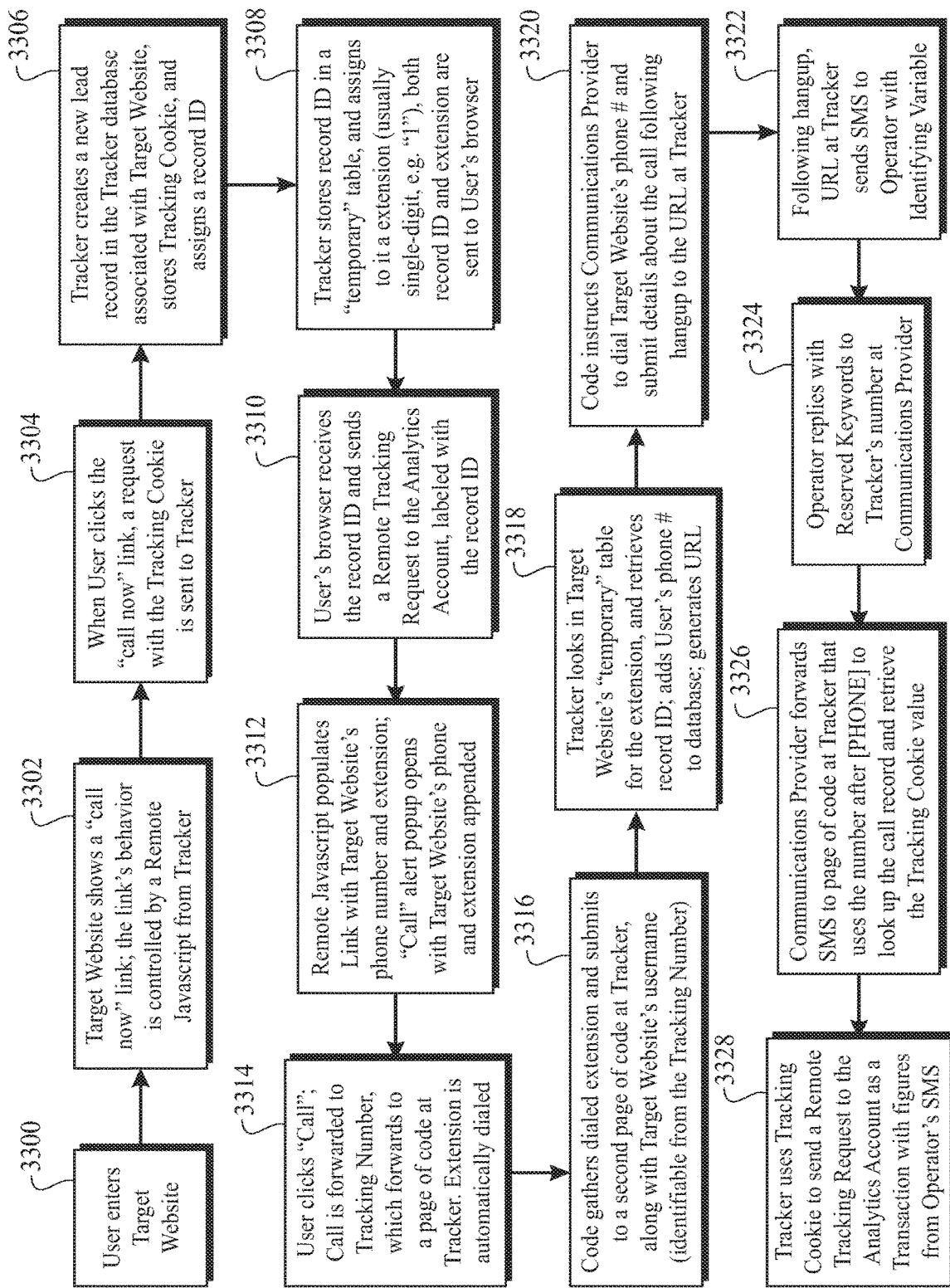
FIG. 29 presents a flowchart illustrating an embodiment of the method with multiple users, where a phone call is completed through a mobile device or softphone, and using SMS as an alternate way of recording data about financial transactions occurring during and/or after the call.

Another embodiment, as shown in FIG. 29, utilizes a similar method to the one described above with respect to FIG. 28 except in the following ways. In particular, the method described with respect to FIG. 29 differs from that described in FIG. 28 as Operator is given the option to update the call record with financial transactions by communicating with Tracker using SMS. Steps 3300 through 3320 are similar or identical to those described in the method described above with respect to FIG. 28. At step 3322, following a disconnection of the call, Tracker may initiate a SMS to Operator's phone number with instructions on replying to Tracker (e.g. "Reply with [PHONE] 202-555-0169 in beginning of SMS") in such a way that Tracker can interpret the Operator's reply and trigger a Remote Tracking Request as in FIG. 28.

Specifically, Operator's SMS may be sent to a phone number at the Communications Provider, which may forward to a page of code at Tracker. In the original text message body, Tracker may include an identifying variable, such as the call record ID or the caller's phone number. When replying to Tracker's SMS, Operator may include the identifying variable, sale revenue, and similar pertinent information formatted according to a predetermined standard, which may allow Tracker to utilize such data to search for the correct call record, retrieve the Tracking Cookie, and initiate the Remote Tracking Request.

For instance, Tracker may assign reserved keywords, such as PHONE, SALE, PROFIT, ID, or similar. These keywords may be formatted in a distinguishing manner, for example, enclosed in brackets, e.g. [PHONE], [SALE], [PROFIT], and [ID]. Tracker may search the SMS for the reserved keywords, separate the text between such keywords, and use the data to populate the relevant information for the Remote Tracking Request. For example, at step 3324, Operator may reply, "[PHONE] 202-555-0169 [REVENUE] $1,000 [PROFIT] $500".

At step 3326, the code at Tracker may receive the SMS, may discern that the text between [PHONE] and [REVENUE], or 202-555-0169, is User's phone number, and may use this value to search the call records and obtain the associated Tracking Cookie. Using a similar method for the remaining text message body, Tracker may interpret the SMS as a need by Operator to record a $1,000 revenue transaction with $500 profit for the Tracking Cookie associated with 202-555-0169. Tracker then may proceed to send to the Analytics Account a Remote Tracking Request with the financial transaction in step 3326. Tracker may also combine information from Operator's SMS with figures automatically calculated by Tracker based on predefined constants. For instance, Operator may enter the revenue, while Tracker may use the original call duration to calculate the cost, as described earlier.

Figure 30:
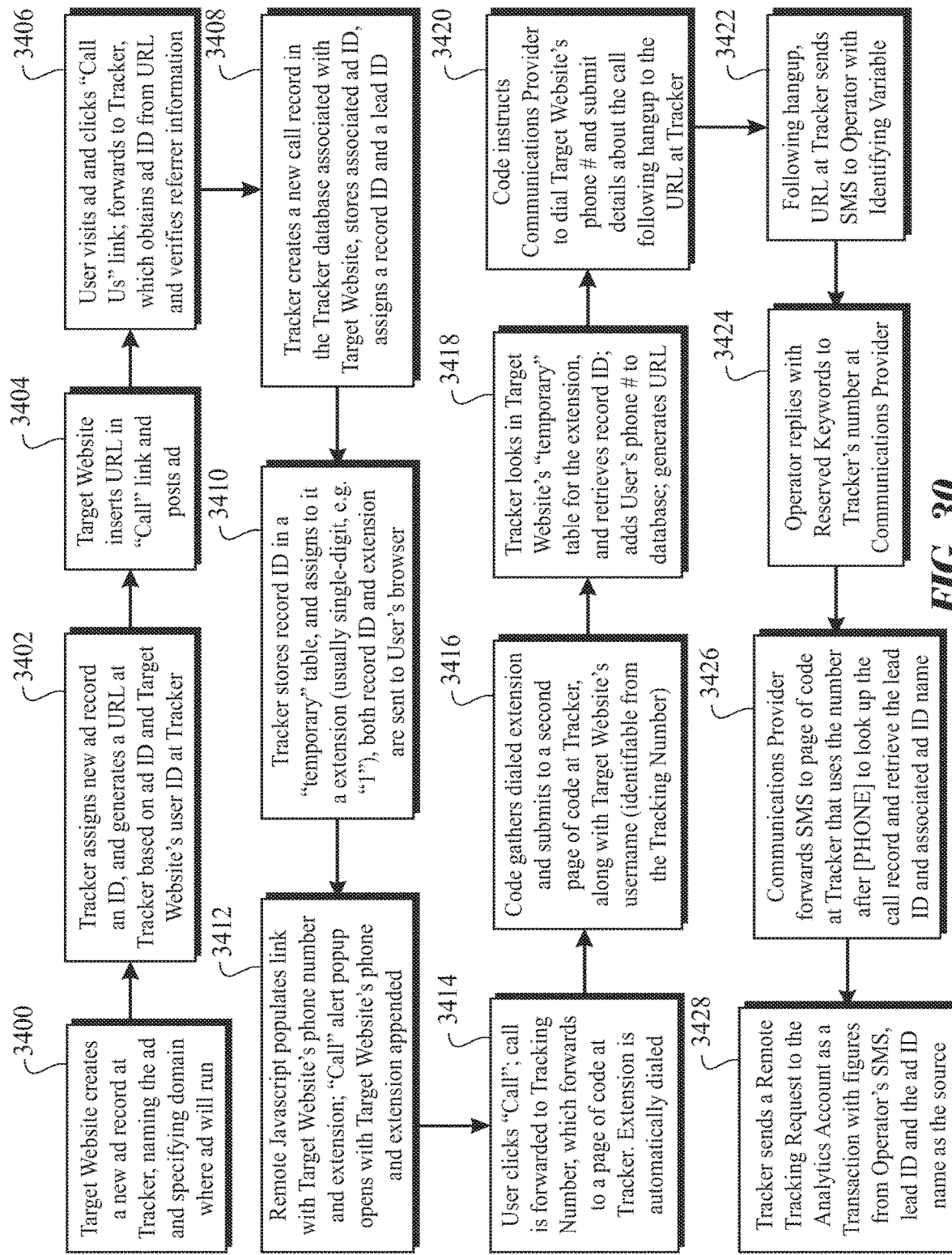
FIG. 30 presents a flowchart illustrating an embodiment of the method with multiple users, where a phone call originates in network content other than a business' website, the call being completed through a mobile device or softphone, and using SMS as an alternate way of recording data about financial transactions occurring during and/or after the call.

Another embodiment, as shown in FIG. 30, utilizes a similar method to the one described above with respect to FIG. 28 and FIG. 29 except in the following ways. In particular, the method described with respect to FIG. 30 differs from that described in FIG. 28 and FIG. 29 as calls are connected to activities on marketing channels other than a website, for example, e-mail campaigns or classified ads on a website such as Craig's List.

To accomplish this, at step 3400 Operator may create an ad record at Tracker for a marketing channel or activity, such as an e-mail campaign. Operator may enter a name for the record that matches the desired name of the source to show when analyzing the source of financial transactions. For instance, Operator may name a May e-mail campaign "May E-Blast". At step 3402, Tracker may store the new ad record, may assign an ad record ID, and may use the ID to generate a URL that incorporates Target Website's username and the ad ID. For example, where Target Website is ABC.com and the ad ID is 23, the corresponding URL may be: "www.tracker.com/call-answering-script.php?username=ABC.com&sourceid=23."

Operator may copy and insert the URL into the "href" attribute of the HTML "a" link tag at step 3404, creating a "call" link that, when clicked, triggers a request to Tracker's server. Steps 3406 through 3424 are similar to those in the method described above with respect to FIG. 29, with no intermediate Remote Tracking Request (step 3310). When creating a call record, Tracker may generate a lead ID, an additional variable that may later substitute for the Tracking Cookie. In step 3426, Tracker may retrieve the lead ID associated with the call record, as well as the ad ID and related information. At step 3428, Tracker may initiate a Remote Tracking Request as a financial transaction, and may use Tracker's lead ID record in lieu of the Tracking Cookie and the ad name entered by Operator as the source. Furthermore, step 3222 in FIG. 28 may be substituted as well, allowing financial transactions from off-site sources to be recorded.

Although a name field corresponding to each source at Tracker is described, additional fields may be added to fully describe the source. For instance, GOOGLE ANALYTICS may record the Document Referrer, Campaign Name, Campaign Source, Campaign Medium, Campaign Keyword, Campaign Content, and Campaign ID, among other variables. Tracker may allow Operator to describe each off-site marketing activity in detail, and may populate this information when sending Remote Tracking Requests related to the call that was triggered by each marketing activity.

Figure 31:
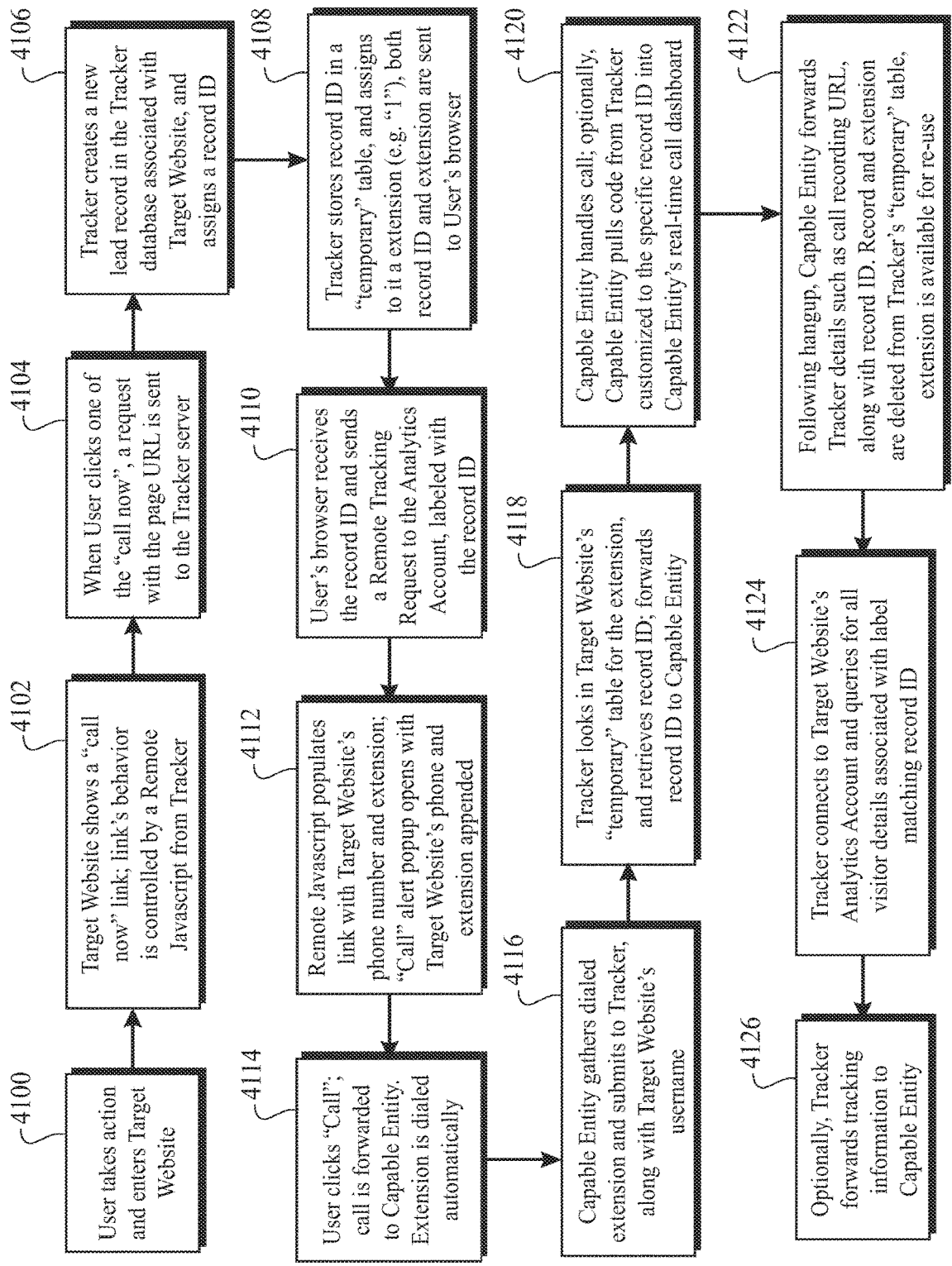
FIG. 31 presents a flowchart illustrating an embodiment of the method using remote communication, with multiple users, where a phone call is completed through a mobile device or softphone.

Referring to FIG. 31, an embodiment of a leads and/or call tracking system and method will now be described. As shown in FIG. 31, in step 4100, User may take an action that takes User to a Target Website. For example, User may click on an ad, a search link, or on a referring link, etc. to direct User to a Target Website. Several "call" links, buttons, or a combination thereof may be loaded on the page at Target Website at step 4102. When User clicks "Call" at step 4104, a JAVASCRIPT may execute, which may collect the current page URL and send it to Tracker. Tracker may create a new blank record in its database, associated with Target Website, may populate it with the page URL, and may generate a record ID at step 4106. Tracker may then use the record ID to create a new extension record, for example, in the extensions table dedicated to Target Website.

The system may send the phone number belonging to Capable Entity, record ID, and extension to User's browser at step 4108. At step 4110, User's browser may use the record ID to send a tracking request to the Analytics Account, such as a remote trackEvent request in GOOGLE ANALYTICS. The tracking request may be categorized as a phone call and may be labeled with an ID corresponding to the record ID. As shown in step 4112, the JAVASCRIPT may then populate the "Call" link in User's browser with the phone number and extension, prompting a "Call" alert to pop up on User's phone. At step 4114, User clicks the "Call" button on the alert, calling the Capable Entity, and automatically dialing the extension.

When User calls the Target Website phone, the call may forward to Capable Entity. As shown in step 4116, the system at Capable Entity may gather the dialed numbers including the dialed extension, and submit them to a predetermined URL at Tracker, along with Target Website's username. At step 4118, the code at Tracker URL may use the Target Website username to find the appropriate extensions table, and search this table for the extension or numeric code previously entered to obtain the ID of the call record, and may respond to Capable Entity with the call record ID. Alternatively, Capable Entity may generate its own ID, and may communicate the ID to Tracker together with the extension. Tracker would store this ID as associated with its own record ID. Thus, the systems may communicate using an ID generated by either party.

At step 4120, Capable Entity handles the call as usual. Optionally, Capable Entity may use the call record ID to source a section, or module, of Capable Entity's call handling dashboard from Tracker. Using the call record ID may customize the code of such a module to the specific call. For instance, such a module may provide the option of applying tags, or nicknames, to a call record. When submitted, the tags may be sent to Tracker together with the call record ID, which would be used to apply the tags to the correct call record, and may be included in communications with the Analytics Account, as detailed below. At step 4122, following hang-up or termination of the phone call, Capable Entity may send to Tracker details such as call recording URL along with the call record ID, which Tracker may use to identify the correct record in its database and update it with such details.

The record and the extension that was associated with that particular record may be unassociated from one another (i.e., the extension is deleted from the extensions table) following the hang-up of the call at step 4122 or may be performed at any time following updating retrieval of the call record ID such as in step 4118. In step 4124, Tracker may connect to the Analytics Account and query for all visitor details associated with the label corresponding to the call record ID. At step 4126, Tracker may optionally forward such details together with the call record ID to Capable Entity, which may choose to store them in its database.

Alternatively, the value of a Tracking Cookie may be included in the request to Tracker at step 4104. Tracker may store the Tracking Cookie as associated with the new call record ID in step 4106, and may use it together with the ID associated with the Analytics Account to send a Remote Tracking Request to Target Website's Analytics Account (such as a remote trackEvent request in GOOGLE ANALYTICS) when Capable Entity communicates the related extension. This Remote Tracking Request may replace the browser-based request from step 4112. The Analytics Account ID, a fixed variable, may be stored in Tracker's database.

Figure 32:
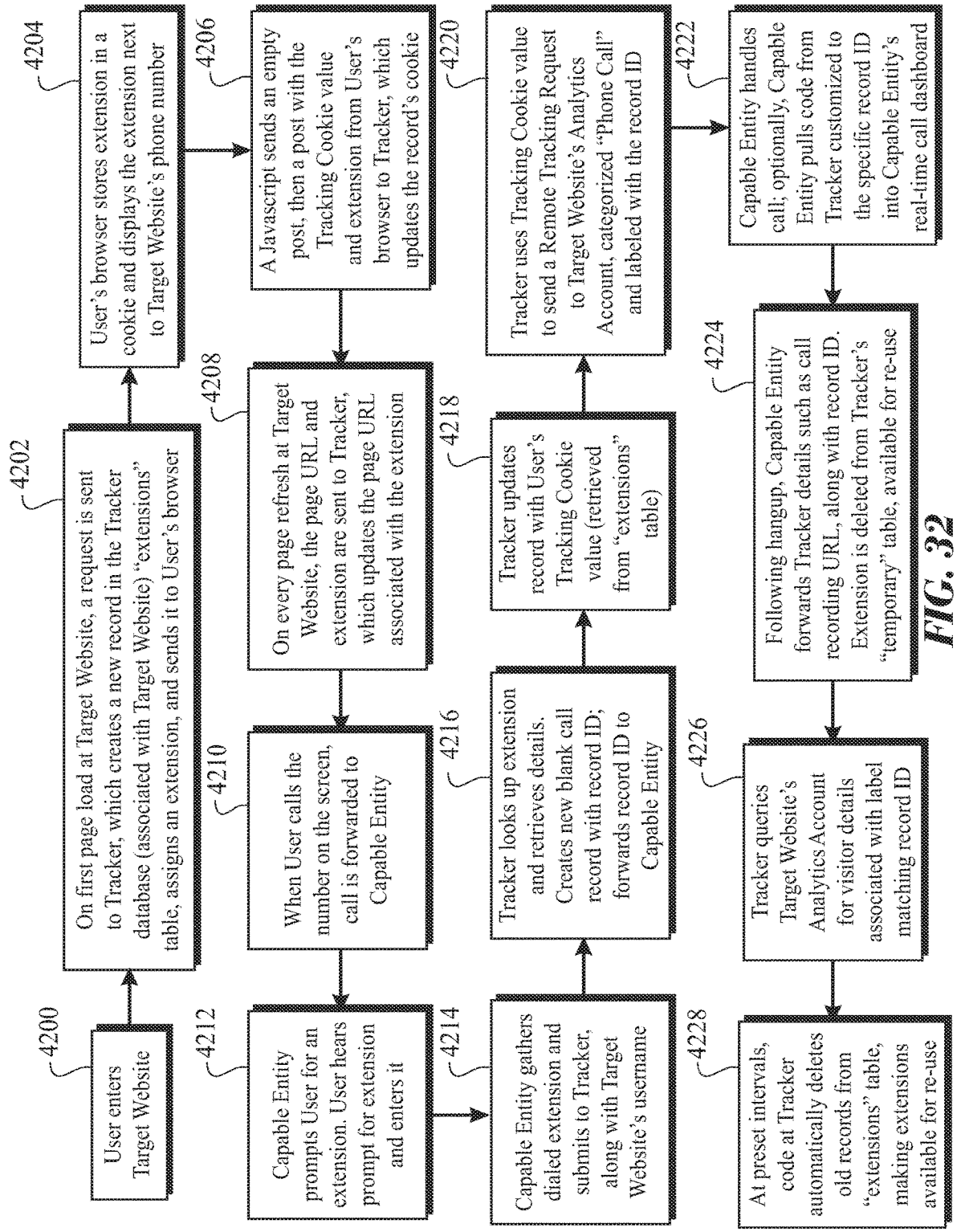
FIG. 32 presents a flowchart illustrating an embodiment of the method using remote communication, with multiple users, where network content is accessed through one device, and the phone call is completed through another device.

Another embodiment, as shown in FIG. 32, utilizes a similar method to the one described above with respect to FIG. 31 except in the following ways. In particular, the method described with respect to FIG. 32 differs from that described in FIG. 31 as it displays an extension on page load, rather than when a link is clicked. This enables tracking of calls that occur when a User sees a phone number on one device (e.g., a laptop computer), but initiates a call from another device (e.g., a cell phone).

As shown in FIG. 32, in step 4200, User may take an action that takes User to a Target Website. For example, User may click on an ad, a search link, or on a referring link, etc. to direct User to a Target Website. At step 4202, a request may be sent to Tracker, and a new record in Tracker database associated with the Target Website may be generated. The request may be sent to Tracker once the Target Website has loaded. Tracker may store a database of collected information, as well as any phone number extension that has been associated with such information. Tracker may create a new record in Tracker database, for example, in the extensions table that is dedicated to Target Website.

As shown in step 4204, once the extension has been determined, the system may enter the extension into the extensions table and may send it back to User's browser. As shown in step 4206, a JAVASCRIPT may be automatically initiated following the display of the extension in step 4204. This code may first store the extension in a cookie, then may initiate an empty ("dummy") asynchronous JAVASCRIPT and XML ("AJAX") request (e.g., post) to Tracker. Following the first request, a second request may be initiated, sending a POST request with User's assigned extension and the value of a Tracking Cookie.

The Tracking Cookie value may be only available for retrieval following a second loading of the webpage, thereby necessitating the first "dummy" request. The Tracking Cookie may be associated with a web analytics tool, such as that provided by GOOGLE ANALYTICS or the like. Tracker may update the record of the extension with the Tracking Cookie value. As shown in step 4208, on each subsequent page load, the uniform resource locator ("URL") of the page, commonly referred to as a web address, as well as the extension may be sent to Tracker, which may update the extension record with the URL value, as well as the time of the update.

When the call is made to Capable Entity at step 4210, User may be prompted to enter the extension, for example, via a query or an audible command. For example, at step 4212, User may hear the phrase, "if you have an extension, please enter it now." As shown in step 4214, when User enters the extension shown in his browser window, Capable Entity may gather the dialed numbers including the dialed extension, and submit them to Tracker along with Target Website's username. At step 4216, Tracker may use the Target Website username to find the appropriate extensions table, and search this table for the extension or numeric code previously entered to obtain the Tracking Cookie and the last page visited. Tracker may use the obtained value to create a blank record in the Target Website calls table, which may be assigned an ID. Tracker may then communicate the record ID to Capable Entity. The remaining steps 4218 through 4228 are similar or identical to the corresponding steps in the method described above with respect to FIG. 31.

Figure 33:
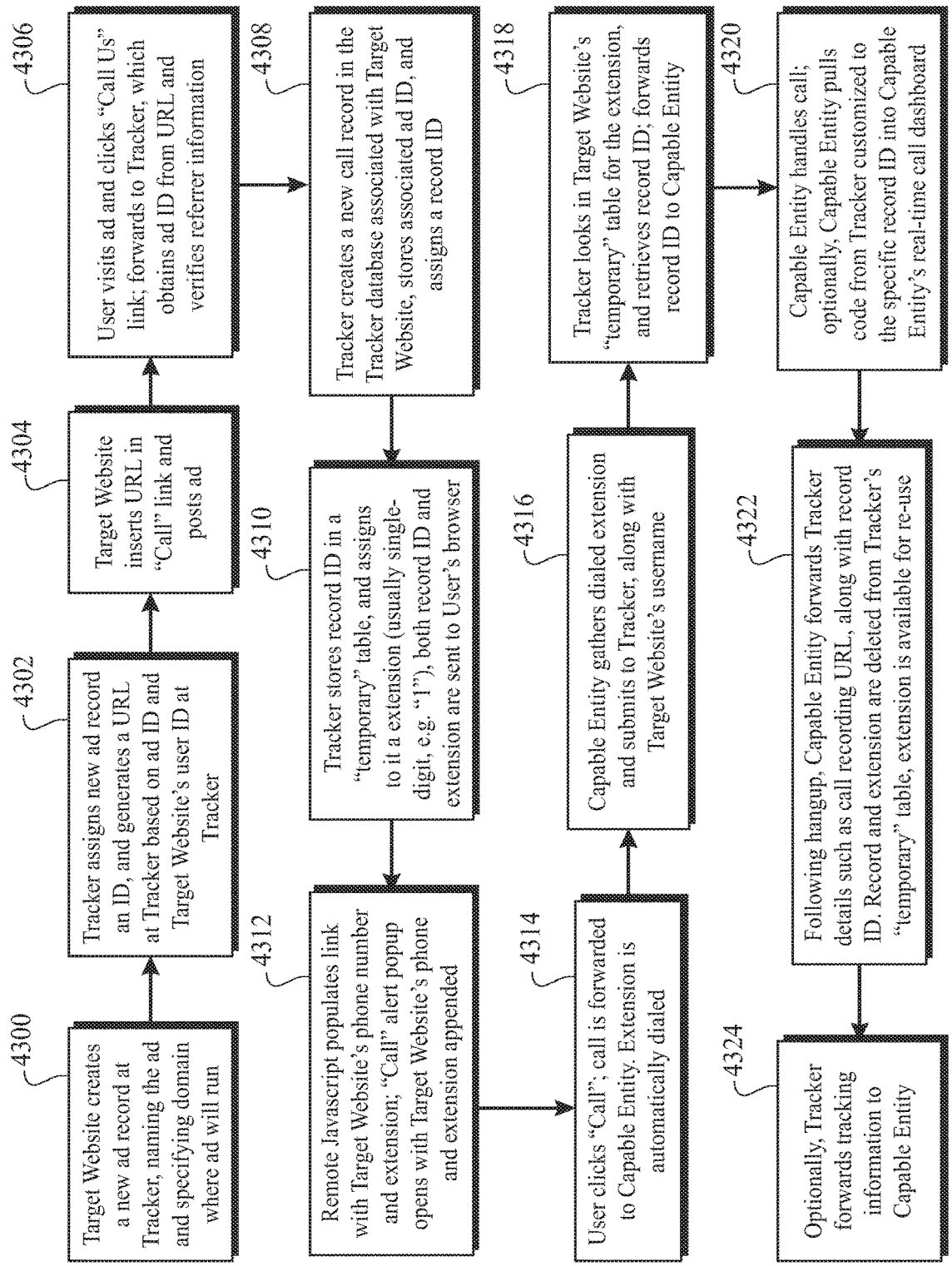
FIG. 33 presents a flowchart illustrating an embodiment of the method using remote communication, with multiple users, where a phone call originates in network content other than a business' website, the call being completed through a mobile device or softphone.

Another embodiment, as shown in FIG. 33, utilizes a similar method to the one described above with respect to FIG. 31 except in the following ways. In particular, the method described with respect to FIG. 33 differs from that described in FIG. 31 as it enables tracking phone calls that originate on properties other than Target Website. For instance, the method may be used to track phone calls that originate in e-mail campaigns, social media, and other similar off-site online entities managed by Business.

To accomplish this, at step 4300 Operator may create an ad record at Tracker for a marketing channel or activity, such as an e-mail campaign. The Operator may enter a name for the record that matches the desired name of the source to show when viewing call summary reports. For instance, Operator may name a May e-mail campaign "May E-Blast". At step 4302, Tracker may store the new ad record, may assign an ad record ID, and may use the ID to generate a URL that incorporates Target Website's username and the ad ID. For example, where the Target Website is ABC.com and the ad ID is 23, the corresponding URL may be: "www.tracker.com/call-answering-script.php?username=ABC.com&sourceid=23."

Operator may copy and insert the URL into the ad, for instance, in the "href" attribute of the HTML "a" link tag at step 4304, creating a "call" link that, when clicked, triggers a request to Tracker's server. Steps 306-324 are similar to those in the method described above with respect to FIG. 31, with no intermediate Remote Tracking Request (step 4110). Alternatively, when creating a call record, Tracker may generate a lead ID. Tracker may later use this lead ID in lieu of the Tracking Cookie to send a Remote Tracking Request with the ad name entered by Operator as the visit source, allowing phone calls from off-site sources to be sent to the Analytics Account.

Note also that although the method is described here with embodiments that track phone calls using a single phone number, the same method can be deployed with systems that utilize multiple tracking numbers. Thus, Tracker displays a phone number on a User's screen that forwards to Capable Entity. When User dials the phone number, which is operated by Capable Entity, Capable Entity sends Tracker a notification that a User dialed the phone number. The remaining steps would be similar or identical to the method described above.

Figure 34:
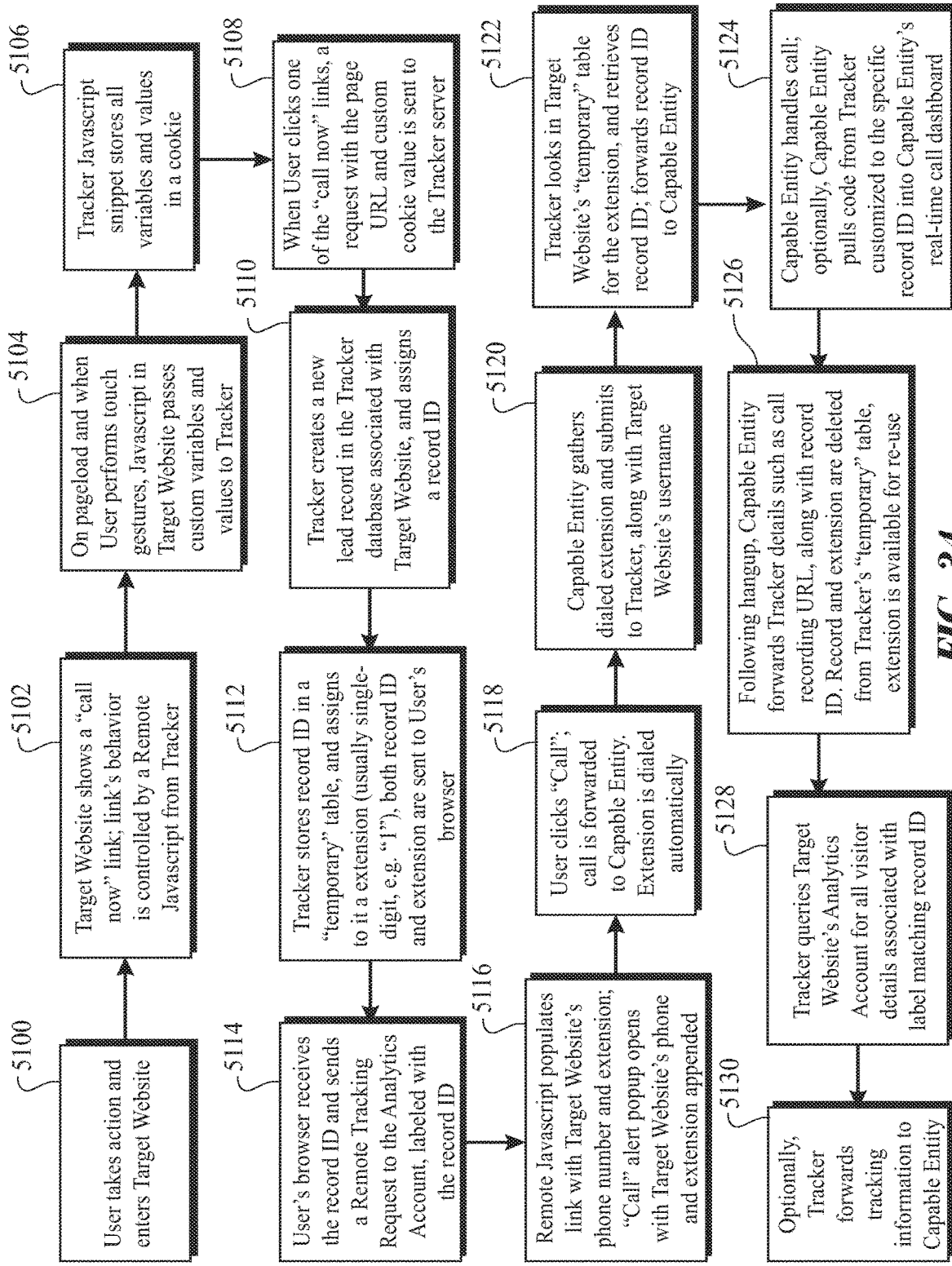
FIG. 34 presents a flowchart illustrating an embodiment of the method using remote communication, with multiple users, where custom information collected about the visitor attached to the call, the call being completed through a mobile device or softphone.

Another embodiment, as shown in FIG. 34, utilizes a similar method to the one described above with respect to FIG. 4 except in the following ways. In particular, the method described with respect to FIG. 34 differs from that described in FIG. 4 as it allows Business to track custom information about each prospective caller. Such information may be related and/or inferred from User's actions on Target Website, including a selected language, view customization, product selection, etc. This information may then be shown to the Operator answering the call, and displayed in call reports. Optionally, this information can also be used to verify the caller's identity and/or infer the caller's intentions, eliminating the need for User to navigate voice menus when calling. Thus, Capable Entity may use the information to automatically route the call to the appropriate Operator.

As shown in FIG. 34, in step 5100, User may take an action that takes User to a Target Website. For example, User may click on an ad, a search link, or on a referring link, etc. to direct User to a Target Website. Several "call" links, buttons, or a combination thereof may be loaded on the page at Target Website at step 5102. At step 5104, on page load at Target Website, and following any subsequent touch gestures User performs (or at preset intervals), Target Website may send custom information to Tracker through a JAVASCRIPT function. For instance, User may see a Language drop-down. When User selects Spanish, Target Website may pass to Tracker a variable-value pair such as, "language=Spanish".

Multiple variable-value pairs may be passed in an associative array. Values may be obtained from the array, cookies established by Target Website, or a URL, among other sources. When passing the variables, Target Website may instruct Tracker to replace all previously stored custom information, add to existing information, or overwrite the old variables while keeping the other variables intact. In step 5106, Tracker may receive the information and may store, or may update, its value in a cookie. Variable-value pairs may be separated by a predetermined delimiter, such as a "|" or "-" character. For instance, a cookie value for language=Spanish and product=cellphone may be stored as "language=Spanish|product=cellphone".

When User clicks "Call" at step 5108, a JAVASCRIPT may execute, which may collect the latest custom cookie value and send it to Tracker. Tracker may create a new blank record in its database, associated with Target Website, may populate it with the custom information, and may generate a record ID at step 5110. Tracker may then use the record ID to create a new extension record, for example, in the extensions table dedicated to Target Website. The remaining steps 5112 through 5130 are similar or identical to the corresponding steps in the method described above with respect to FIG. 4.

Figure 35:
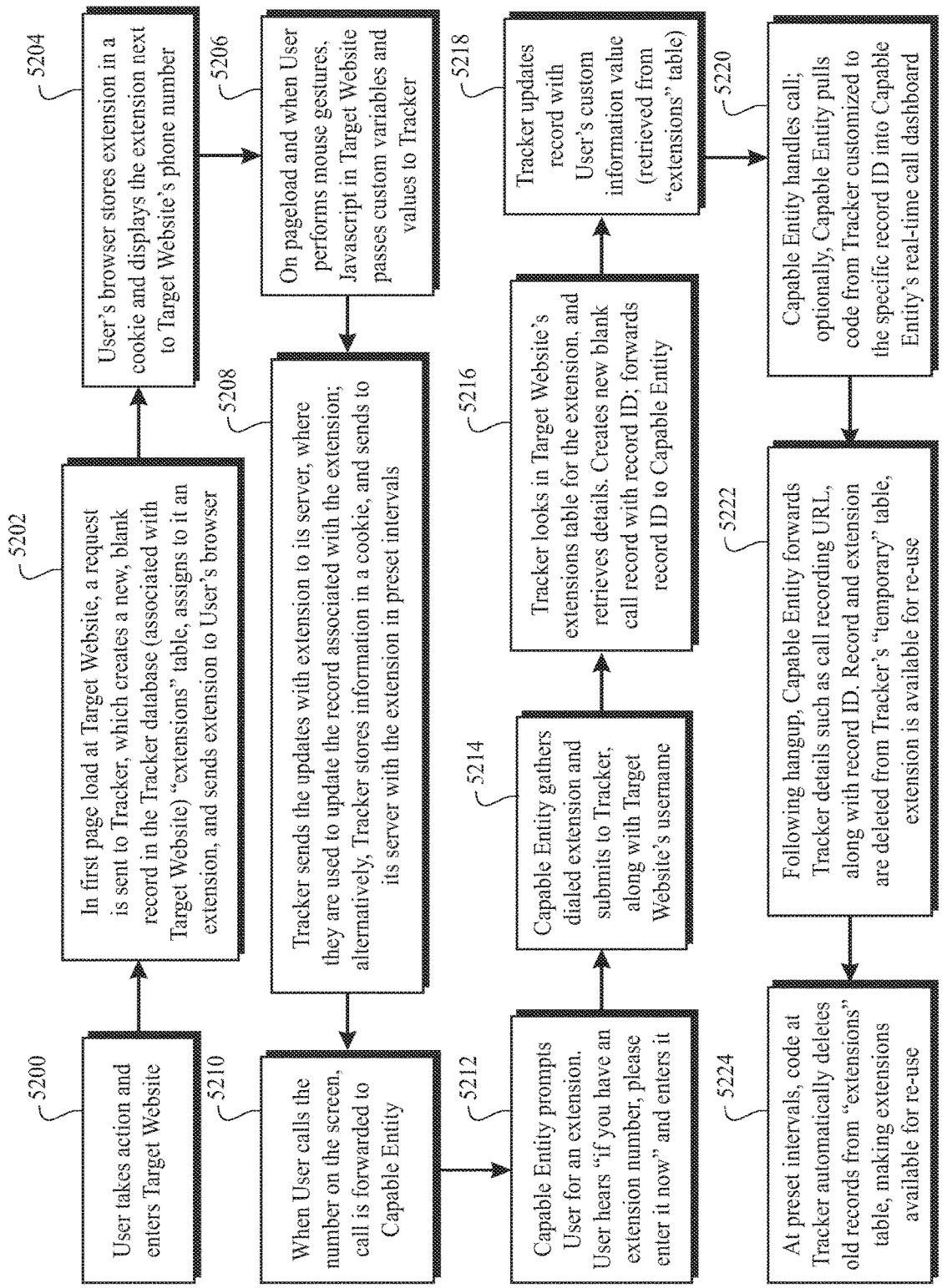
FIG. 35 presents a flowchart illustrating an embodiment of the method using remote communication, with multiple users, where custom information collected about the visitor attached to the call, and network content is accessed through one device, while the phone call is completed through another device.

Another embodiment, as shown in FIG. 35, utilizes a similar method to the one described above with respect to FIG. 21 and FIG. 34 except in the following ways. In particular, the method described with respect to FIG. 35 adapts the method described in FIG. 34 to a scenario described in FIG. 21, where a numeric code is displayed on page load, rather than when a link is clicked. This enables tracking of calls that occur when a User sees a phone number on one device (e.g., a laptop computer), but initiates a call from another device (e.g., a cell phone).

As shown in FIG. 35, in step 5200, User may take an action that takes User to a Target Website. For example, User may click on an ad, a search link, or on a referring link, etc. that directs User to a Target Website. At step 1202, a request may be sent to Tracker, and a new record in Tracker database associated with the Target Website may be generated. The request may be sent to Tracker once the Target Website has loaded. Tracker may create a new record in Tracker database, for example, in the extensions table that is dedicated to Target Website.

As shown in step 5204, once the code has been determined, the system may enter the code into the extensions table and may send it back to User's browser. As shown in step 5206, on page load at Target Website, and following any subsequent mouse gestures—such as clicks, hovers, or movements—that User performs (or at preset intervals), Target Website may send custom information to Tracker through a JAVASCRIPT function. For instance, User may see a Language drop-down. When User selects Spanish, Target Website may pass to Tracker a variable-value pair such as, "language=Spanish".

In step 5208, Tracker may receive the information and may send it to its database, together with the numeric code associated with User. Tracker may then update the custom information associated with the numeric code value. Alternatively, when receiving the information, Tracker may store, or may update, its value in a cookie. At preset intervals, a JAVASCRIPT may automatically collect the latest custom cookie value and send it to Tracker, together with the numeric code associated with User. Tracker may then update the custom information associated with the numeric code value, as well as the time of the update. The remaining steps 5210 through 5224 are similar or identical to the corresponding steps in the method described above with respect to FIG. 21 and/or FIG. 34.

In summary, the method enables phone calls to be tracked in the same manner as on-website events, such as file downloads or form submissions. This allows the system to capture valuable data from the analytics system, such as visitor source information. Incorporating an ID throughout the method allows Business to "drill down" into phone calls data, attributing each phone call to a specific marketing channel, geographic location, device, etc. The described features are not mutually exclusive; each Business can select as few or as many of the options to fit its needs and/or preferences.

The above-described methods can be implemented in a system that may include one or more non-transitory computer readable storage mediums with instructions stored thereon that when executed by a computing system cause the computing system to perform the above-described operations.

Each of the methods described herein with reference to the accompanying figures may be implemented as a system including one or more servers providing data related to the website and the database, wherein each server comprises at least one computing system having at least one data processor. The above-described methods according to the technology introduced here can be implemented as devices and/or systems including multiple devices.

For example, the methods described herein may be implemented in hardware, firmware, or as software or computer code that can be stored in a recording medium such as a CD-ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Figure 37:
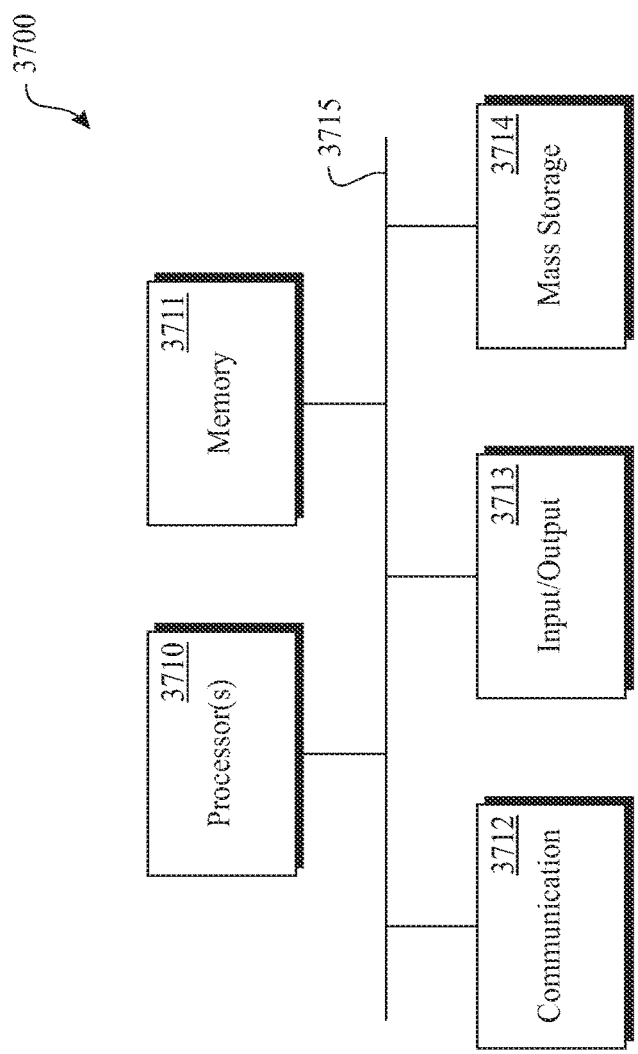
FIG. 37 is a high-level block diagram of a computer system representative of any of the various computing devices described herein.

FIG. 37 illustrates at a high-level, exemplary hardware architecture for a processing system that can be used to implement any computer system or other processing devices mentioned above, such as a Tracker, for example. Any of these devices each can include multiple instances of an architecture such as shown in FIG. 37 (e.g., multiple computers), particularly server-based systems such as the Tracker's computer system, and such multiple instances can be coupled to each other via one or more networks.

In the illustrated embodiment, the architecture 3700 includes one or more processors 3710, memory 3711, one or more communication device(s) 3712, one or more input/output (I/O) devices 3713, and one or more mass storage devices 3714, all coupled to each other through an interconnect 3715. The interconnect 3715 may be or include one or more conductive traces, buses, point-to-point connections, controllers, adapters and/or other conventional connection devices. The processor(s) 3710 control the overall operation of the processing device 3700 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Memory 3711 can be or include one or more physical storage devices, which may be in the form of random access memory (RAM), read-only memory (ROM) (which may be erasable and programmable), flash memory, miniature hard disk drive, or other suitable type of digital storage device, or a combination of such devices, each of which are collectively described as a computer readable storage media. The mass storage device (s) 3714 can be or include one or more hard drives, digital versatile disks (DVDs), flash memories, or the like. Memory 3711 and/or mass storage 3714 can store (individually or collectively) data and instructions that configure the processor(s) 3710 to execute operations to implement the techniques described above. Each communication device 3712 can be or include, for example, a wired Ethernet adapter, cable modem, DSL modem, cellular telecommunications transceiver (e.g., 3G or 4G/LTE), Wi-Fi transceiver, baseband processor, Bluetooth or BLE transceiver, or the like, or a combination thereof. Depending on the specific nature and purpose of the processing device 3700, the I/O devices 3713 can include devices such as a display (which may be a touch screen display), audio speaker, keyboard, mouse or other pointing device, microphone, camera, etc. Note, however, that such I/O devices may be unnecessary if the processing device 3700 is embodied solely as a server computer.

Figure 38:
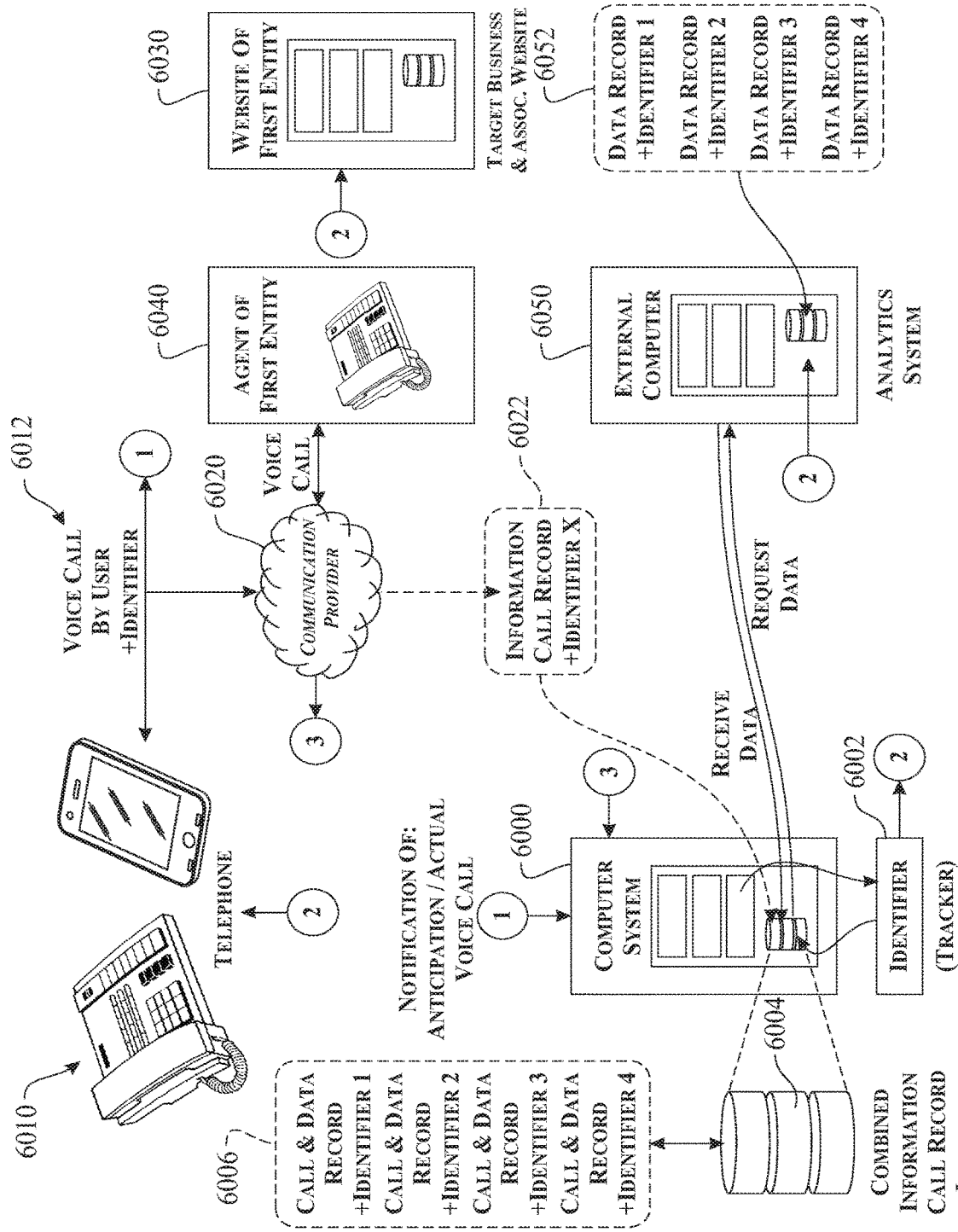
FIG. 38 presents a schematic diagram of an exemplary network environment employing an identifier for collection of call records and/or other activities of a user.

One embodiment of the present invention, illustrated in FIG. 38, can be summarized in a schematic diagram of an exemplary network environment employing an identifier 6002 for collection of call records 6022 and/or other data records 6052 of a user.

In an initial step (1), a computer system 6000 receives one of the following: (a) a message that the user has accessed a website 6030 associated with a first entity or (b) a message that the user has initiated a voice call 6012 to an agent 6040 associated with the first entity.

In a second step (2), the computer system 6000 generates the identifier 6002 based upon one of: (a) the message that the user has accessed the website 6030 associated with the first entity (defined as anticipating a voice call 6012 to the agent 6040 of the first entity) or (b) the message that the user has initiated the voice call 6012 to the agent 6040 associated with the first entity. The computer system 6000 forwards the identifier 6002 to at least one of: (a) a telephone 6010, (b) the website 6030 associated with the first entity, and (c) an external computer 6050.

The system associates the voice call 6012 and all data 6052 associated with activities of the user by the identifier 6002 by appending the identifier 6002 to the associated record as shown.

In a third step (3), the communication provider 6020 forwards a call record 6022 (which includes the identifier 6002) to the computer system 6000, which stores the information in a database located on a digital storage device 6004. The computer system 6000 collects all of the call records 6022 (each call record includes the associated identifier 6002). The external computer 6050 tracks history of the user and records the activities in data records 6052 (wherein each of the data records 6052 includes the identifier 6002).

Once all of the data has been recorded at the various locations, the computer system 6000 can collect data 6006 from the external computer 6050 by sending a request to receive all information that includes the identifier 6002. This process enables collection of both call records 6022 and activities 6052 made by the user that are associated with the first entity for data mining, lead generation, and other marketing purposes. The collected information 6006 is stored on the digital storage device 6004. The call data records (CDRs) 6022 are normally collected and stored in a predefined format. The data records 6050 are also collected and stored in a predefined format. The unique identifier 6002 is appended to each record of the set of records associated with calls 6012 and activities of the same user.

Figure 39:
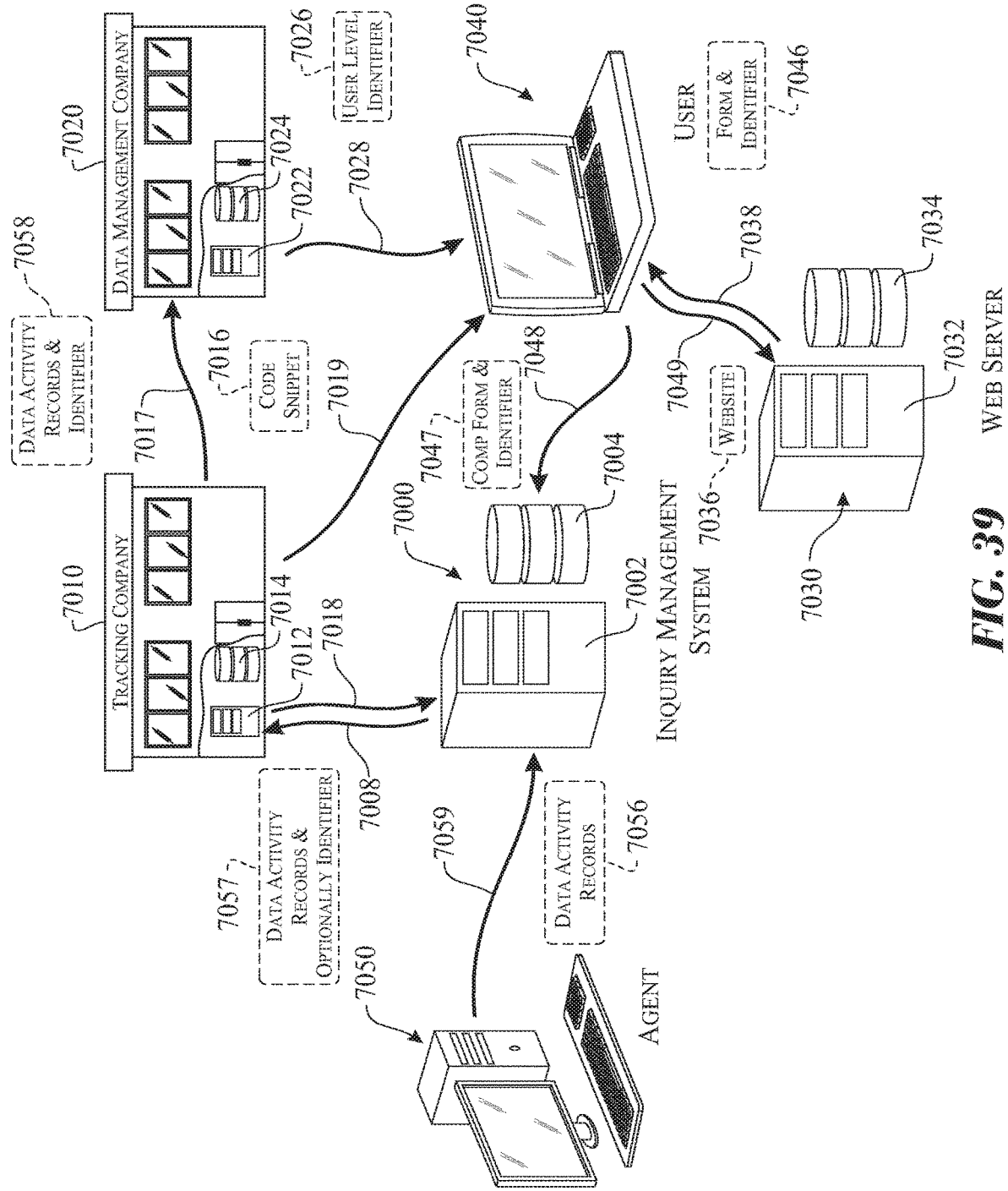
FIG. 39 presents an exemplary high-level schematic diagram of a computer system representative of any of the various computing devices described herein.

A second embodiment of the present invention, illustrated in FIG. 39, can be summarized in a schematic diagram detailing interactions between users 7040 and providers. The user 7040 is representative of a user and a browser enabled computing device, such as a computer, a portable computing tablet, a Smartphone, and the like. The general concept of the present invention is to provide a mechanism for identifying a user or visitor to a website 7036 presented through a web server 7030 and retaining the association between a plurality of entities. The web server 7030 includes a network connected server 7032 in communication with an associated web server digital data storage device 7034. The web server digital data storage device 7034 stores and manages one or more websites 7036 and any associated data.

The user 7040 requests to view a webpage in accordance with a request 7038 from a web server 7030. The web server 7030 returns source information to the user 7040 via a source transfer communication 7049. A data management company server 7022 operated by a data management company 7020 establishes a user level identifier 7026 and forwards the user level identifier 7026 to the user 7040 via a communication link 7028. Information would be stored on a data management company digital storage device 7024, wherein the data management company digital storage device 7024 is in signal communication with the data management company server 7022.

The requested webpage includes at least one form 7046. The form 7046 is appended (combining the user level identifier 7026 with the form 7046 by a tracking company 7010. This is accomplished by placing a code snippet 7016 on at least one website 7036 on the web server 7030 at any reasonable point in time. The transfer is accomplished using a source transfer communication 7049 (block 650 of FIG. 12). The code snippet 7016 can be introduced prior to, during, or after the transfer of the source code of the website 7036. The code snippet 7016 can be transferred to the web server 7032, the user 7040, or any other suitable location to provide the desired solution. In the exemplary embodiment, the code snippet 7016 is transferred to the user 7040 via a snippet communication link 7019.

In one exemplary solution, the user level identifier 7026 is appended to the form by the code snippet 7016 after the form is served to the user 7040. In one variant of the process, the process can append a permanent or temporary tracking identifier to the form 7046. If a temporary identifier is used, the temporary identifier is exchanged with a permanent identifier when the completed form 7047 is transferred to an inquiry management server 7002. The combination including the appended permanent identifier would be stored as the record.

The user 7040 completes and submits the form. The completed form 7046, including the associated user level identifier 7026 are submitted to the inquiry management server 7002 operated by an inquiry management provider 7000. The received information is stored on an inquiry management digital storage device 7004, wherein the inquiry management digital storage device 7004 is in signal communication with the inquiry management server 7002.

In one practice, the user 7040 is subsequently connected to an agent 7050 by any suitable communication link (not shown). Examples of communication links can include e-mail, in-person, a telephone call, transfer to a different website, or any other communication link. In one variant, the communication between parties is accomplished using an offline communication process. The records 7056 would be generated by the agent, an automated record generation process, or any other suitable process. The agent 7050 forwards the collected data activity records 7056 of follow up activities to the inquiry management provider 7000, referenced as a user-agent activities records transfer 7059.

A tracking company server 7012, operated by a tracking company 7010, would transmit an application programming interface ("API") request to the inquiry management provider 7000 in accordance with a request communication 7018. The tracking company 7010 subsequently responds by forwarding the data collected from the agent 7050 to the tracking company server 7012 in accordance with a data request response or data transfer communication 7008. The tracking company 7010 collects and stores the received records 7057 on a tracking company digital data storage device 7014. The stored records 7058, including the associated user level identifier 7026, are forwarded to the data management company 7020 for future use, wherein the conveyance of the stored records 7058 is accomplished via a data transfer communication link 7017. If a permanent tracking identifier is used, the user level identifier associated with the tracking identifier is first located, and then used to forward the stored records 7058 to the data management company 7020.

Although the invention herein has been described with reference to particular embodiments, it is to be understood that these embodiments are merely illustrative of the principles and applications of the technology introduced here. For example, the term "business" is not limited to a business but can include any entity having an online or Internet presence in the form of a website. It is to be understood that unless otherwise indicated herein, the order in which the steps of the figures are described is not intended to require that such steps be performed in the order in which they are described. It is therefore to be understood that numerous modifications may be made to the illustrative embodiments and that other arrangements may be devised without departing from the spirit and scope of the present invention as defined by the appended claims. It is understood, therefore, that this invention is not limited to the particular embodiments disclosed, but it is intended to cover modifications that are within the spirit and scope of the invention. Furthermore, material appearing in the background section of the specification is not an admission that such material is prior art to the invention.

I claim:

1. A user activity tracking system comprising:
a tracker server computer system in communication with the Internet; and
tracker software running on the tracker server computer system configured to perform operations comprising:
    providing an application-level interface that can receive:
        (1) a user-level identifier, the user-level identifier being a unique, anonymous, digital identifier; and
        (2) data submitted from a digital form supplied to a user's computer system during a website visit;
    creating a user activity record comprising the user-level identifier and the data submitted in the digital form;
    obtaining additional information concerning the user from at least one additional source, wherein the at least one additional source is not a cookie from the website visit;
    wherein the obtaining of the additional information comprises enriching the user activity record from the at least one additional source;
    translating at least one of the additional information into a format that can be parsed by a recipient computer system to enrich an activity record;
    enabling the communication of the user-level identifier and the parsed additional information to a recipient computer system; and
    wherein the enabling the communication comprises an interface to manage which information is communicated and how the communicated information is formatted.

2. The user activity tracking system as recited in claim 1, where the application-level interface receives a user-level identifier issued by at least one of:
    (a) a web activity tracking system,
    (b) an online advertising platform, and
    (c) an online data management platform.

3. The user activity tracking system as recited in claim 1, where the recipient computer system is at least one of:
    (a) a web activity tracking system,
    (b) an online advertising platform, and
    (c) an online data management platform.

4. The user activity tracking system as recited in claim 1, where the additional information is retrieved from at least one offline source in accordance with at least one of the following:
    (a) at least one agent enters the information into a computer system;
    (b) the user activity tracking system and/or the application-level interface acquires and appends the information; and
    (c) the user activity tracking system and/or the application-level interface receives and appends the information.

5. The user activity tracking system as recited in claim 1, wherein enabling the communication of the additional information provides data about any of the following:
    A. conversions, defined as the user completing a desired action, for example, a purchase and the associated sales amount;
    B. non-conversions, defined as one or more of the following:
        (a) the user not completing a desired action; and
        (b) the user being marked as unlikely to complete a desired action.

6. The user activity tracking system as recited in claim 1, wherein enabling the communication of the additional information provides non-personally identifiable user characterization data, including at least the user's interests, lifestyle, affinities, and industries.

7. The user activity tracking system as recited in claim 1, wherein the enabling the communication of the additional information enables the grouping of specific users, for example, all users that purchased.

8. The user activity tracking system as recited in claim 1, wherein the enabling the communication of the additional information is used to target the user's subsequent online experience, for example, by enabling the serving of a relevant online ad and/or higher bidding on the serving of a relevant online ad.

9. The user activity tracking system as recited in claim 1, wherein the enabling the communication comprises enabling more than one communication request.

10. The user activity tracking system as recited in claim 1, wherein the digital form and/or the application-level interface is supplied by the tracking system.

11. A user activity tracking system comprising:
a tracker server computer system in communication with the Internet; and tracker software running on the tracker server computer system configured to perform operations comprising:
- providing an application-level interface through which to receive:
  - (1) a user-level identifier, the user-level identifier being a unique, anonymous, digital identifier; and
  - (2) data submitted from a digital form supplied to a user's computer system during a website visit;
- creating a user activity record comprising the user-level identifier and the data submitted from the digital form;
- generating a record ID and associating the record ID with the user activity record;
- obtaining additional information concerning the user from at least one additional source, wherein the at least one additional source is not a cookie from the website visit;
- wherein the obtaining of the additional information comprises enriching the user activity record from the at least one additional source;
- translating at least one of the additional information into a format that can be parsed by a recipient computer system to enrich an activity record;
- enabling the communication of the user-level identifier, and at least one of the record ID and the parsed additional information to a recipient computer system; and
- wherein the enabling the communication comprises an interface to manage which information is communicated and how the communicated information is formatted.

12. The user activity tracking system as recited in claim 11, where the user-level identifier and/or the record ID is issued by at least one of:
   (a) a web activity tracking system,
   (b) an online advertising platform, and
   (c) an online data management platform.

13. The user activity tracking system as recited in claim 11, where the record ID is communicated to the recipient computer system, and the recipient computer system is at least one of:
   (a) a web activity tracking system,
   (b) an online advertising platform, and
   (c) an online data management platform.

14. The user activity tracking system as recited in claim 11, where the additional information is associated with the record ID, and the additional information is retrieved from at least one offline source in accordance with at least one of the following:
   (a) at least one agent enters the information into a computer system;
   (b) the user activity tracking system and/or the application-level interface acquires and appends the information; and
   (c) the user activity tracking system and/or the application-level interface receives and appends the information.

15. The user activity tracking system as recited in claim 11, where the enabling the communication of the additional information provides data about any of the following:
   A. the record ID;
   B. conversions, defined as the user completing a desired action, for example, a purchase and the associated sales amount;
   C. non-conversions, defined as one or more of the following:
      (a) the user not completing a desired action; and
      (b) the user being marked as unlikely to complete a desired action.

16. The user activity tracking system as recited in claim 11, where the record ID and/or enabling the communication of the additional information provides user characterization data which is non-personally-identifiable, including at least the user's interests, lifestyle, affinities, and industries.

17. The user activity tracking system as recited in claim 11, wherein the record ID and/or enabling the communication of the additional information enables the grouping of specific users, for example, all users that purchased.

18. The user activity tracking system as recited in claim 11, wherein the record ID and/or enabling the communication of the additional information is used to target the user's subsequent online experience by one of the following:
   enabling the serving of a relevant online ad;
   higher bidding on the serving of a relevant online ad.

19. The user activity tracking system as recited in claim 11, wherein the enabling the communication comprises enabling more than one communication request.

20. The user activity tracking system as recited in claim 11, wherein the digital form and/or the record ID is supplied by the tracking system.

21. A user activity tracking system comprising:
a tracker server computer system in communication with the Internet; and
tracker software running on the tracker server computer system configured to perform operations comprising:
- providing an application-level interface through which to receive:
  - (1) a user-level identifier, the user-level identifier being a unique, anonymous, digital identifier; and
  - (2) data submitted from a digital form supplied to a user's computer system during a website visit;
- creating a user activity record comprising the user-level identifier and the data submitted from the digital form;
- generating a record ID and associating the record ID with the user activity record;
- obtaining additional information concerning the user from at least one additional source, wherein the at least one additional source is not a cookie from the website visit;
- wherein the obtaining of the additional information comprises enriching the user activity record from the at least one additional source;
- translating at least one of the additional information into a format that can be parsed by a recipient computer system to enrich an activity record;
- providing an application-level interface that enables the communication of each of the user-level identifier and at least one of the record ID and the parsed additional information to a recipient computer system; and
- wherein the application-level interface comprises an interface to manage which information is communicated and how the communicated information is formatted.

22. The user activity tracking system as recited in claim 21, where the user-level identifier and/or the record ID and/or the application-level interface is issued by at least one of:
   (a) a web activity tracking system,
   (b) an online advertising platform, and
   (c) an online data management platform.

23. The user activity tracking system as recited in claim 21, where the record ID is communicated through the application-level interface and the recipient computer system is at least one of:
   (a) a web activity tracking system,
   (b) an online advertising platform, and
   (c) an online data management platform.

24. The user activity tracking system as recited in claim 21, where the record ID is associated with the additional information within the application-level interface, and the additional information is retrieved from at least one offline source in accordance with at least one of the following:
(a) at least one agent enters the information into a computer system;
(b) the user activity tracking system and/or the application-level interface acquires and appends the information; and
(c) the user activity tracking system and/or the application-level interface receives and appends the information.

25. The user activity tracking system as recited in claim 21, where the application-level interface enables the communication of the additional information about any of the following:
A. the record ID;
B. conversions, defined as the user completing a desired action, for example, a purchase and the associated sales amount;
C. non-conversions, defined as one or more of the following:
(a) the user not completing a desired action; and
(b) the user being marked as unlikely to complete a desired action.

26. The user activity tracking system as recited in claim 21, where the application-level interface enables the communication of user characterization data, such as the user's interests, lifestyle, affinities, and industries.

27. The user activity tracking system as recited in claim 21, where the application-level interface enables, through the communication of the additional information, the grouping of specific users within the third-party system, for example, all users that purchased.

28. The user activity tracking system as recited in claim 21, where the application-level interface enables, through the communication of the additional information, the targeting of the user's subsequent online experience, for example, by enabling the serving of a relevant online ad and/or higher bidding on the serving of a relevant online ad.

29. The user activity tracking system as recited in claim 21, where the application-level interface enables more than one communication request.

30. The user activity tracking system as recited in claim 21, where the tracking system supplies at least one of:
(1) the digital form;
(2) the application-level interface; and
(3) the record ID.

* * * * *

UNITED STATES PATENT AND TRADEMARK OFFICE
CERTIFICATE OF CORRECTION

| | | Page 1 of 2 |
|---|---|---|
| PATENT NO. | : 12,413,547 B2 | |
| APPLICATION NO. | : 18/620415 | |
| DATED | : September 9, 2025 | |
| INVENTOR(S) | : Dorin Rosenshine | |

It is certified that error appears in the above-identified patent and that said Letters Patent is hereby corrected as shown below:

On the Title Page

For item (60), under Related U.S. Application Data, continued on Page 2, Line 6, please delete:
"division"
And replace with:
--continuation--

For item (60), under Related U.S. Application Data, continued on Page 2, Line 10, please delete:
"9,762,529."
And replace with:
--9,762,529, which is a division of application No. 14/973,639, filed on Dec. 17, 2015, now Pat. No. 9,491,249, which is a continuation-in-part of application No. 14/854,204, filed on Sep. 15, 2015, now Pat. No. 9,342,843, which is a division of application No. 14/524,949, filed on Oct. 27, 2014, now Pat. No. 9,137,360, which claims benefit of provisional application No. 62/041,779, filed on Aug. 26, 2014, which also claims benefit of provisional application No. 62/008,031, filed on Jun. 5, 2014, which also claims benefit of provisional application No. 61/974,600, filed on Apr. 3, 2014, which also claims benefit of provisional application No. 61/895,544, Oct. 25, 2013, and application No. 14/973,639, filed on Dec. 17, 2015, now Pat. No. 9,491,249, claims benefit of provisional application No. 62/094,259, filed on Dec. 19, 2014.--

In the Specification

At Column 1, Line 9:
Please insert after (A):
--a Continuation Patent Application claiming the benefit of U.S. Non-Provisional Utility application Ser. No. 18/330,179, filed on June 6, 2023 (now issued as U.S. Pat. No. 12,363,061 on Jul. 15, 2025), wherein U.S. Non-Provisional Utility application Ser. No. 18/330,179 is a Continuation Patent Application claiming the benefit of U.S. Non-Provisional Utility application Ser. No. 17/064,394, filed on Oct. 6, 2020 (now issued as U.S. Pat. No. 11,671,397 on Jun. 6, 2023), wherein U.S. Non-Provisional Utility application Ser. No. 17/064,394 is--

Signed and Sealed this
Sixteenth Day of December, 2025

John A. Squires
*Director of the United States Patent and Trademark Office*

CERTIFICATE OF CORRECTION (continued)
U.S. Pat. No. 12,413,547 B2

At Column 1, Lines 13-14, please delete:
"scheduled to issue"
And replace with:
--now issued--

At Column 1, Line 21, please delete:
"Divisional"
And replace with:
--Continuation--